United States Patent
Yorimitsu et al.

[11] Patent Number: 5,835,940
[45] Date of Patent: Nov. 10, 1998

[54] DISK APPARATUS WITH MULTIPLE RAID OPERATING MODES

[75] Inventors: Keiichi Yorimitsu; Sawao Iwatani, both of Kawasaki, Japan

[73] Assignee: Fujitsu Limited, Kawasaki, Japan

[21] Appl. No.: 606,081

[22] Filed: Feb. 23, 1996

Related U.S. Application Data

[62] Division of Ser. No. 266,737, Jun. 27, 1994.

[30] Foreign Application Priority Data

Oct. 14, 1993 [JP] Japan ................................. 5-256216

[51] Int. Cl.⁶ ............................ G06F 12/08; G06F 13/00
[52] U.S. Cl. .......................... 711/112; 711/113; 711/114; 711/136; 711/159; 711/160
[58] Field of Search ...................... 364/DIG. 1, DIG. 2, 364/243.4, 243.41, 246.12, 248.1, 236.2, 439, 440, 441, 463, 486, 487; 711/112, 113, 114, 136, 159, 160

[56] References Cited

U.S. PATENT DOCUMENTS

| | | | |
|---|---|---|---|
| 4,593,354 | 6/1986 | Ushiro | 364/200 |
| 4,800,483 | 1/1989 | Yamamoto et al. | 364/200 |
| 4,819,203 | 4/1989 | Shiroyanagi et al. | 364/900 |
| 4,870,565 | 9/1989 | Yamamoto et al. | 364/200 |
| 5,222,217 | 6/1993 | Blount et al. | 395/325 |
| 5,287,473 | 2/1994 | Mohan et al. | 395/425 |
| 5,313,612 | 5/1994 | Satoh et al. | 395/425 |
| 5,369,751 | 11/1994 | Kambayashi et al. | 395/425 |
| 5,459,856 | 10/1995 | Inoue | 395/440 |
| 5,475,859 | 12/1995 | Kamabayashi et al. | 395/825 |

FOREIGN PATENT DOCUMENTS

| | | |
|---|---|---|
| 62-63351 | 3/1987 | Japan . |
| 62-191947 | 8/1987 | Japan . |
| 3-129515 | 6/1991 | Japan . |
| 4-296926 | 10/1992 | Japan . |

*Primary Examiner*—Tod R. Swann
*Assistant Examiner*—Tuan V. Thai
*Attorney, Agent, or Firm*—Greer, Burns & Crain, Ltd.

[57] ABSTRACT

A disk cache operation which was optimized so as to adapted to an operation form of the user and a disk array is executed. A cache mechanism is provided for each of two sets of controllers and can be made operative in either one of the reliability significance mode for storing the same data into each system, the performance significance mode for independently storing data every system, and the average mode of both of said modes. A cache process in which a disk array which operates in RAID0, RAID1, RAID3, or RAID5 is set to a target is efficiently executed. Effective data is prepared on a cache block so as to enable an access like RAID3 such that a parity can be calculated without needing to read the disk even in the operation of RAID5.

22 Claims, 44 Drawing Sheets

F I G. 2 0
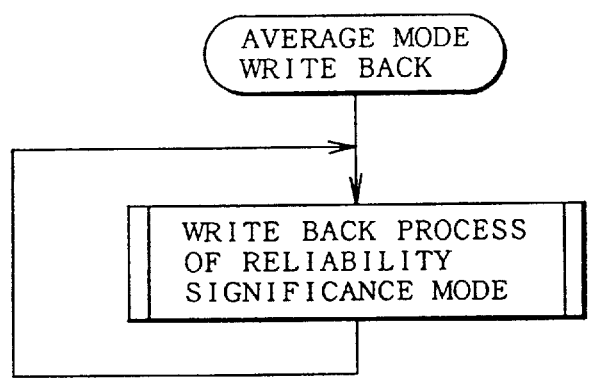

| | 00 | 01 | 02 | 03 | 04 | 05 | 06 | 07 |
|---|---|---|---|---|---|---|---|---|
| 00 | R | R | W | R | R | R | R | R |
| 01 | R | W | W | W | W | W | W | W |
| 02 | R | EMPTY | EMPTY | R | R | R | R | R |
| 03 | R | EMPTY | R | R | R | R | R | R |
| 04 | EMPTY | R | R | R | R | R | R | R |
| ⋮ | ⋮ | ⋮ | ⋮ | ⋮ | ⋮ | ⋮ | ⋮ | ⋮ |
| n-3 | R | R | R | R | W | W | W | W |
| n-2 | EMPTY | EMPTY | EMPTY | R | R | R | R | R |
| n-1 | EMPTY | EMPTY | EMPTY | EMPTY | EMPTY | EMPTY | EMPTY | EMPTY |
| n | EMPTY | EMPTY | EMPTY | EMPTY | EMPTY | EMPTY | EMPTY | EMPTY |

R : CACHE BLOCK IN WHICH EFFECTIVE DATA EXISTS

W : CACHE BLOCK IN WHICH DIRTY DATA EXISTS

EMPTY : EMPTY CACHE BLOCK

| ENTRY | HEAD BLOCK | CONTENTS |
|---|---|---|
| 1 | CB0203<br>CB0004 | THERE IS A SPACE OF 1 CACHE BLOCK |
| 2 | CB0102 | THERE IS A SPACE OF 2 CACHE BLOCKS |
| 3 | CB00n-2 | THERE IS A SPACE OF 3 CACHE BLOCKS |
| ------ | ------ | ------ |
| N | CB00n-1 | THERE IS A SPACE OF (N) CACHE BLOCKS |

64

DISK APPARATUS WITH MULTIPLE RAID OPERATING MODES

This is a divisional of copending application Ser. No. 08/266,737 filed on Jun. 27, 1994.

BACKGROUND OF THE INVENTION

The present invention relates to a disk cache apparatus for executing the reading and writing operations of a magnetic disk subsystem by using a cache memory by an instruction from a host computer and, more particularly, to a disk cache apparatus using a disk array in a magnetic disk subsystem.

In recent years, in association with an improvement of the performance of a computer main body, it is demanded to also improve the performance of input/output subsystems using a disk unit in which a magnetic disk is used as a recording medium. For this purpose, there has been proposed a disk cache apparatus using a semiconductor memory which can be accessed at a high speed as a cache memory although the bit costs are higher than those of the magnetic disk apparatus. That is, such a disk cache apparatus uses a method whereby a part of data of the magnetic disk subsystem is stored into the cache memory and the data is read out from or written into the cache memory, thereby realizing a high accessing speed.

The initial disk cache apparatus uses a volatile memory device and there is a possibility such that data is extinguished due to the occurrence of a fault of a power source or the like. However, so long as the data has been stored in the cache memory (cache hit), the reading process can be executed at a high speed. However, the writing process cannot be performed at a high speed because both the disk unit and the cache memory must be simultaneously updated. After that, a disk cache apparatus using a non-volatile memory device has been proposed. In the writing process in such a disk cache apparatus, the write data is updated in only the cache memory and a write back process to write the data from the cache memory to the disk unit after completion of the writing process can be performed. The writing process is executed at a high speed due to the realization of such a write back process. However, there are many apparatuses which utilized both non-volatile memory and volatile memory in order to maintain a non-volatile performance of the memory because of the problems associated with battery capacity and costs or the like, thereby optimizing the costs to performance (C/P) ratio. In such a disk cache apparatus in which the non-volatile memory and the volatile memory mixedly exist, in the user environment in which the number of write requests is extremely larger than the number of read requests, there is not enough time to execute the write back process and, in many cases, the request of the user cannot be satisfied. Accordingly, an apparatus which is more general and which achieves both high speed and reliability is demanded. In recent years, further, an apparatus in which a plurality of magnetic disks constructing a disk array are combined and which has an operation form that is known as RAID is being widespread. It is also demanded to apply the disk cache apparatus to those RAID type disk arrays and to optimize. FIG. 1 shows a conventional disk cache apparatus which is constructed by only a volatile cache memory. Two controllers 102-1 and 102-2 are connected from a host computer 100 to channels 104-1 and 104-2. The controllers 102-1 and 102-2 connect disk units 110-1, 110-2, and 110-3 as drives through adapters 108-1 and 10-82 by a lower-order drive interface. A cache memory 106 using a non-volatile memory device which is commonly used through a lower-order cache interface is connected to the controllers 102-1 and 102-2.

FIG. 2 shows the operation in the case where request data exists in the cache memory. For example, when there is a read request (1) from the host computer 100 to the controller 102-1, the controller 102-1 executes a hit judgment (2) to discriminate whether request data exists in the cache memory 106 with reference to a hash table. Namely, in the judgment of the cache hit, generally, a hash address (hash entry) is calculated from hash parameters such as cylinder, track, block, and the like as an access unit of the disk unit and a check is made to see if the request data that is designated by the calculated hash address has been registered in the hash table. When the result of the hit judgment indicative of the presence of the request data is obtained, data (3) is read out from the cache memory 106 and is transferred to the host computer 100.

On the other hand, since there is a limitation of a capacity of the cache memory 106, a cache management using an LRU table (Least Recent Use table) is executed. In the LRU table, a cache block (unit of data which is handled in the cache memory) which was used latest is registered to the head position of the table, so that the oldest cache block is located at the last position in the table. When the LRU table is filled with the registered cache blocks, the oldest block is abandoned and a new block is registered. The cache block which is not accessed for a predetermined period of time is abandoned in order to raise a use efficiency of the cache memory. Such a process for abandoning the registration of the cache block and for assuring its space is called a cache invalidation. The cache invalidation can be realized by deleting the registration of the hash table.

FIG. 3 shows the operation in the case where no request data exists in the cache memory. When there occurs a mis-hit such that no data exists as a result of the hit judgment (2) for the read request (1) from the host computer 100, a staging (3) for reading out the request data from a disk unit 110 and for writing into the cache memory 106 is executed. Since the staging (3) is accompanied with mechanical operations such as seeking operation to position the head to a target cylinder of the disk unit 110, on-track operation to move the head to a target track based on the head selection after completion of the seeking operation, and the like, so that it takes a longer time as compared with the accessing time of the cache memory 106. After completion of the staging (3) of the cache memory 106, the controller 102-1 transfers data (4) to the host computer 100 and registers the existence of data in the hash table (hit state).

FIG. 4 shows the processing operation of the conventional apparatus of FIG. 1 for a write request. When the controller 102-1 receives a write instruction (1) from the host computer 100, a write through (2) to write data into both of the cache memory 106 and the disk unit 110 is executed. This is because the cache memory 106 is a volatile memory and there is a possibility such that extinction of data, data change, or the like occurs due to a fault of a power source or the like. In consideration of the reliability, the controller 102 writes data into the cache memory 106 and, at the same time, also writes the data into the disk unit 110. The data which was subjected to the write through process certainly causes a cache hit in the subsequent reading operation. That is, as a time which is required for the writing process, the same time as that in case of no cache is necessary and there is no effect due to the introduction of the cache.

The writing process in the conventional apparatus in FIG. 1 cannot be executed at a high speed because the simultaneous updating of both of the disk unit and the cache memory must be executed. Therefore, an apparatus using both of a volatile cache memory and a non-volatile cache memory as shown in FIG. 5 has been proposed. Two controllers 202-1 and 202-2 connected to a host computer 200 through channels 204-1 and 204-2 connect the lower-order device interface side to a common bus 206 which enables a communication or the like among all of modules. The common bus 206 is provided with a volatile cache memory 208 and a non-volatile cache memory 210 which are commonly used by the controllers 202-1 and 202-2. A plurality of disk units 216-1 and 216-2 are further connected to the common bus 206 through controllers 212-1 and 212-2 and adapters 214-1 and 214-2. By using a multicontroller construction in which a plurality of controllers are provided for every system and each controller is allowed to have a particular processing function, a load is reduced as compared with the case of using a single controller and a whole throughput is improved. The volatile cache memory 208 is similar to the memory used in the conventional apparatus of FIG. 1. The non-volatile cache memory 210 is provided in order to raise a data writing speed to the disk units 216-1 and 216-2. The same data as write data 218 in the volatile cache memory 208 is written. The data written in the non-volatile cache memory 210 is written into the disk unit by a write back process after completion of the writing process.

FIG. 6 shows the staging of the apparatus of FIG. 5 when the read request causes a mis-hit. When receiving the read request (1) from the host computer 200, the controller 202-1 executes the hit judgment (2) of the volatile memory 208. In case of the mis-hit, the staging (3) to read the request data from a disk unit 216 is executed. After the data was registered into the cache management table, a data transfer (4) is performed to the host computer 200.

FIG. 7 shows the writing process of the apparatus of FIG. 5. When there is a write instruction (1) from the host computer 200, the controller 202-1 performs a writing (2) of write data into both of the volatile cache memory 208 and the non-volatile cache memory 210 and updates a cache management table and reports the completion of the writing operation to the host computer. When predetermined write back processing conditions are satisfied, for example, in the case where the data is not read or written for a predetermined period of time, the data written in the non-volatile cache memory 210 is subjected to a write back (3) such that the data is extracted as write back target data and written into the disk unit. After completion of the write back (3), the non-volatile cache memory 210 is invalidated with respect to the data which was subjected to the write back and the data is abandoned. On the other hand, the data which was subjected to the write back is in a hit state for the read request because the volatile cache memory 208 is effective.

In the conventional disk cache apparatus in which both the volatile cache memory and the non-volatile cache memory mixedly exist, the write processing time which causes a problem in case of only the volatile cache memory is improved to the same time as the time which is required in case of performing a cache hit by the reading process. However, since the capacity of the non-volatile cache memory is smaller than that of the volatile cache memory, the number of write back times increases. When the number of write back times increases, there is a problem such that use efficiencies of the controller and disk unit on the disk side rise and a throughput of the system deteriorates. That is, since the capacity of the non-volatile cache memory is small, in order to store new write data, the processes for writing back the old data to the disk unit and opening the non-volatile cache memory often occur. Therefore, there is a case where a new process from the host computer cannot be executed for such a period of time due to the write back process. In the case where some fault occurs in the non-volatile cache memory itself, there is a problem such that the write back cannot be performed and the function of the disk cache is lost.

On the other hand, in recent years, as an external memory device of a computer system, a disk unit such as magnetic disk unit, optical disk unit, or the like having features such that non-volatile performance of recording data, large capacity, high data transfer speed, and the like is widely used. As requirements for the disk unit, there are a high speed data transfer, a significance of the reliability, a large capacity, and a low price. Attention is paid to a disk array as a device which satisfies those requirements. The disk array is an apparatus such that a few or tens of small disk units are arranged and data is distributed and recorded to a plurality of disk units and the disk units are accessed in parallel. When the data is transferred in parallel to a plurality of disk units by the disk array, the high speed data transfer can be executed at a speed higher than the speed in case of one disk unit by the number of times as many as the number of disks. On the other hand, by recording redundancy information such as parity data or the like in addition to data, a data error which occurs due to a causes such as a failure of the disk unit or the like can be detected and corrected. A reliability of a degree similar to that in case of a method whereby two disk units are used and data is recorded can be realized by costs lower than the case of using two disk units.

Hitherto, David A. Patterson et al. of the University of California at Berkeley have proposed a paper such that a disk array in which a large amount of data is accessed to many disks at a high speed and a redundancy of the data in case of a disk failure is realized is classified into levels 1 to 5, thereby evaluating the disk array (ACM SIGMOD Conference, Chicago, Ill., pages 109–116, Jun. 1–3, 1988). The levels 1 to 5 to classify the disk array which have been proposed by David A. Patterson et al. are simply referred to as RAID (Redundant Arrays of Inexpensive Disks) 1 to 5. The RAID 1 to 5 will now be simply explained hereinbelow.

RAID0 indicates a disk array apparatus which does not have a redundancy of data. Although such an apparatus is not included in the classification by David A. Patterson et al., it is temporarily called RAID0.

RAID1 indicates a mirror disk unit to write the same data into two disk units as one set. Although a use efficiency of the disk unit is low, it has a redundancy and can be realized by a simple control. Therefore, use of RAID1 is widespread.

According to RAID2, data is striped (divided) on a bit or byte unit basis and the striped data is read out from or written into each disk unit in parallel. The striped data is physically recorded to the same sector by all of the disk units. In addition to the disk unit for data, the disk array has a disk unit to record a Hamming code and specifies the failed disk unit from the Hamming code and reconstructs the data. However, such a disk array is not put into practical use yet.

In RAID3, data is striped on a bit or byte unit basis and a parity is calculated. The data and parity are written in parallel into the disk unit. Although RAID3 is effective in case of continuously handling a large amount of data, in case of a transaction process such that a small amount of data is accessed at random, a high data transfer speed cannot be utilized and an efficiency deteriorates.

In RAID4, one data is striped on a sector unit basis and written into the same disk unit. A parity is stored in a fixedly decided disk unit. In data writing, the data and parity before writing are read out and a new parity is calculated and written. Therefore, accesses totaling four times are needed with respect to one writing operation. When writing, since an access to the disk unit for parity certainly occurs, the writing operations into a plurality of disk units cannot be simultaneously executed. Although RAID4 has been defined as mentioned above, since an advantage is small, there is hardly a plan to put RAID4 into practical use at present.

In RAID5, since the disk unit for parity is not fixed, the reading and writing operations can be executed in parallel. That is, the disk unit to which a parity is set differs every sector. Unless the parity disk overlaps, sector data can be written in parallel into different disk units. Since a plurality of disk units can be asynchronously accessed and the reading or writing operation can be executed as mentioned above, RAID5 is suitable for the transaction process such that a small amount of data is accessed at random.

In the disk array which is classified by such a RAID type, an operation form of the RAID is selected in accordance with a use form of the system. In recent years, however, a disk array such that the operating modes of RAID0, RAID1, RAID3, and RAID5 are allocated to different disk units in one disk array and the host computer can select and designate as a logic device has been proposed. Even in such a RAID type disk array, the processing performance can be further improved by using the disk cache apparatus. However, it is necessary to optimize the function of the disk cache suitable for the operating form of the RAID.

SUMMARY OF THE INVENTION

According to the invention, a disk cache apparatus which can adapt the cache function to a state of use of a magnetic disk subsystem is provided. The disk cache apparatus of the invention has a pair of disk control units for reading or writing data from/into disk units in response to an access request from a host computer as an upper apparatus. A cache memory for storing part of the data stored in the disk unit and a cache control unit are provided for each of the disk control units. The disk control units are mutually connected through a common bus for transmitting or receiving information such as an access request or the like and data.

The cache control unit comprises: a reliability significance mode cache control section; a performance significance mode cache control section; and an average mode cache control section. Cache control is executed according to the operating mode set by an operating mode setting section when the apparatus is activated. The operating modes will now be described hereinbelow.

I. Reliability Significance Mode

In the case where the reliability significance mode is set by the operating mode setting section, each of the reliability significance mode cache control sections, provided for the pair of cache control units, stores the same data into each of the cache memories of the pair of disk control units. Specifically, in response to a read request from the host computer, when the relevant data doesn't exist in the self cache memory (mis-hit), the relevant data is read out from the disk unit and is staged and the data is transferred to the host computer. At the same time, the data is transferred to another disk control unit (remote disk control unit) through the common bus, thereby allowing the same data to be staged. In response to a write request from the host computer, the data is written into the self cache memory (local cache memory). At the same time, the data is transferred to another disk control unit (remote disk control unit) through a common bus, thereby allowing the same data to be also written into the cache memory. Further, as a write back process after completion of the process of the write request, when the write back conditions are satisfied, the data (hereinafter, referred to as a "dirty data") which is not yet written into the disk unit from the self cache memory is extracted and rewritten into the disk unit. Further, a cache invalidation of the rewritten data is instructed to another disk control unit through the common bus.

In the case where the reliability significance mode is set as mentioned above, the cache operation is performed so as to always make the data in the cache memories of both systems coincident. That is, the double cache memories are not independently used but the data on one side is considered to be data for backup. As an advantage in this case, the data is always set as double data and, if the data on one side is lost, the data is assured and a high reliability is obtained. There is a disadvantage such that half of the capacity of the cache memory is used for backup and the use efficiency is low.

II. Performance Significance Mode

In the case where the performance significance mode is set by the operating mode setting section, each of the performance significance mode cache control sections provided for the pair of disk control units individually stores only the data such that there is an access request to the self unit into each of the cache memories provided for the pair of disk control units. Specifically speaking, in the case where the relevant data does not exist in the self cache memory for the read request from the host computer, a process is requested to another disk control unit through the common bus. When receiving a response indicative of the absence of the data from another disk control unit in response to such a request, the relevant data is read out from the disk unit and staged into the self cache memory and the data is transferred to the host computer. In response to a write request from the host computer, the data is written into only the self cache memory. In the write back process, when the rewriting conditions are satisfied, the dirty data which is not yet written into the disk unit is extracted from the self cache memory and is rewritten to the disk unit.

In the case where the performance significance mode is set as mentioned above, the data in each cache memory is independent and the cache memory can be used as a cache memory of a capacity of up to two times as large as a capacity in the reliability mode. In this case, there is an advantage such that the cache memories of both systems independently operate and the data in one of the cache memories can be referred and updated from another cache memory, so that a cache capacity increases. There is a disadvantage such that a probability of the occurrence of a fault such as data extinction, data change, or the like due to a memory fault or a power source fault is high. When a hit such that the cache process is requested to another system occurs, the reading operation is performed to the cache on the remote side, so that the performance deteriorates.

III. Average Mode

In the case where the average mode is set by the operating mode setting section, each of the average mode cache control sections provided for the pair of disk control units executes the staging from the disk unit in association with the read request from the host computer to only the self cache memory. The data writing operation in association with a write request from the host computer is executed to each of the cache memories of the pair of disk control units, thereby forming a mixture type in which the same data is stored. Specifically speaking, in the case where the relevant data does not exist in the self cache memory for the read request from the host computer, a process is requested to another disk control unit through the common bus. When a response indicative of no data is received from another disk control unit after the process was requested, the relevant data is read out from the disk unit and is staged into the self cache memory and, after that, the staged data is transferred to the host computer. In response to the write request from the host computer, the data is written into the self cache memory. At the same time, the data is transferred to another disk control unit through the common bus, thereby allowing the same data to be also written into another cache memory. Such a point is substantially the same as in the reliability mode. Further, in the write back process, when the rewriting conditions are satisfied, the dirty data which is not yet written into the disk unit is extracted from the self cache memory and is rewritten into the disk unit. At the same time, the cache invalidation of the rewritten data is instructed to another disk control unit through the common bus. This point is substantially the same as in the performance significance mode.

In the case where the average mode is set as mentioned above, a mixture type of the reliability significance mode and the performance significance mode is formed fundamentally. That is, the staging at the time of mis-hit of the read request is executed to only the self cache memory and the writing of data is performed to the cache memories of both systems. Due to this, in an environment in which the number of writing processes is small, the cache capacity is two times as large as the ordinary one in a manner similar to the case of the performance significance mode. In an environment in which the number of writing processes is large, such a mixture type is strong for a fault in a manner similar to the reliability significance mode. In this case, there are an advantage and a disadvantage such that either one of the merit and demerit of the reliability significance mode and the performance significance mode strongly appears in accordance with the use environment, namely, a ratio of the number of read requests and the number of write requests which are generated.

IV. Memory Construction

Further, with respect to any of the reliability significance mode, performance significance mode, and average mode, each of the cache memories provided for the pair of disk control units is set to a non-volatile memory. In the reliability significance mode, volatile memories can be also used as cache memories provided for both of the pair of disk control units. A disk array apparatus can be also used as a disk unit.

According to the invention, there is provided a disk cache apparatus which optimizes the disk cache function to a disk array in which the operation form is classified by the RAID type as a target. The disk cache apparatus has a cache memory for storing a part of the data stored in the disk array and for reading or writing data in response to the access request from the host computer. A storing state of the cache memory is managed on the basis of the hash table and LRU table of the cache management section. A read cache control section and a write cache control section are provided.

When receiving the read request from the host computer, the read cache control section refers to the hash table of the cache management section and, in the case where the requested data exists, reads out the requested data from the cache memory and transfers to the host computer. When the requested data does not exist, after the data was staged from the disk array, it is transferred to the host computer. When receiving the write request from the host computer, the write cache control section registers information indicative of the writing into the hash table of the cache management section and writes the data into the cache memory and links the written cache block to the head of the LRU table. A write back control section is provided and when predetermined write back conditions are satisfied, the data which is not yet stored into the disk array is extracted from the cache memory and is rewritten.

A disk array control section is further provided and when the disk array is accessed by the read cache control section and write cache control section, the accesses of one or a plurality of disk units 30 are controlled in accordance with a predetermined RAID operating mode of the disk array.

I. RAID Operating Mode

In the disk array, one rank is constructed by connecting a disk unit to each of the input/output ports arranged in parallel and disk unit groups each having such a rank construction of the number as many as a plurality of ranks are provided. The disk array control section sets either one of the first to fourth operating modes corresponding to RAID0, RAID1, RAID3, and RAID5. When the first operating mode corresponding to RAID0 is set, the disk units in a special rank are allocated to logic devices which are handled by the host computer in a one-to-one corresponding manner and the reading and writing operations are executed to each disk unit 30. When the second operating mode corresponding to RAID1 is set, two disk units in a special rank are constructed as one set and a plurality of such sets are allocated to the logic devices which are handled by the host computer in a one-to-one corresponding manner. A mirror disk such that the same data is written into two disk units and the data is read out from either one of the disk units is formed. When the third operating mode corresponding to RAID3 is set, (n) disk units constructing a special rank are fixedly allocated to the disk units for data and the disk unit for parity. When the write request is generated from the host computer, the write data is divided into (n–1) data on a bit or byte unit basis and parity data is calculated for every divided unit. The resultant (n–1) divided data and parity data are written into (n) disk units in parallel. When the fourth operating mode corresponding to RAID5 is set, (n) disk units constructing a special rank are constructed to one set and a plurality of such sets are allocated so that the parity position changes with every access. When the write request is generated from the host computer, the write data is divided at least on a sector unit basis, the old data and the old parity data are read out from the disk unit on the destination side into which the write data is to be written and from the disk unit for parity and a new parity is calculated. The write data and new parity data are written into the write destination disk unit and the disk unit for parity in parallel.

II. Assurance of Empty Space of Cache Memory

The cache management section has an empty space management table to manage an empty state of the cache memory. The write cache control section refers to the empty space management table when reporting a completion of the cache writing process based on the host computer. When the empty space is equal to or less than a predetermined threshold value, the data written in the disk is invalidated and is deleted from the cache memory. At the same time, a processing operation by the write back section is prepared with respect to the dirty data which is not yet written into the disk.

Due to this, an empty space of a predetermined amount is always assured in the cache memory and the writing operation can be performed at a high speed. Position information of the head block is stored into the empty space management table by setting the number of empty blocks among the continuous cache blocks in the cache memory into an entry (index).

III. Staging Operation

The cache block has a size that is integer times as large as the size of data block which is handled by the host computer. When the data block (host request block) to which the reading operation was requested by the host computer does not exist in the cache block as a storing unit in the cache memory, the read cache control section executes the staging of a new data block from the disk array in accordance with a state of the effective data block existing on the cache block, thereby forming one continuous data region. After completion of the staging, the effective data block subsequent to the read request data block is prefetched onto the cache block from the disk array. When the second operating mode corresponding to RAID1 is set, an amount of data to be prefetched is set to a preset number of effective data blocks. When the third operating mode corresponding to RAID3 is set or when the fourth operating mode corresponding to RAID5 is set, such a data amount to be prefetched is set to the effective data block of up to the last block among the cache blocks. When the fourth operating mode corresponding to RAID5 is set, the data amount to be prefetched can be also set to the effective data blocks of up to the last block in the parity group including the data block whose reading operation was requested. Such a construction is used in the case where the cache block size coincides with the block size of the parity group. When the fourth operating mode corresponding to RAID5 is set, the read cache control section also stages the parity data into the cache memory by an optional designation. In this case, the write back section calculates a new parity by using parity data of the cache memory. Due to this, the reading operations of the old data and old parity from the disk at the time of write back can be made unnecessary.

IV. LRU Management of Sequential Data

In the case where the staging is performed in response to the read request of a large amount of sequential data from the host computer, the read cache control section refers to the LRU table in the cache memory and invalidates a part of the storage data serving as a predetermined number of cache blocks from the last one. At the same time, a large amount of sequential data is registered to the end side in the LRU table without registering to the head thereof. Due to this, a large amount of sequential data can be swept out from the cache memory in a relatively short period of time.

V. Write Back Process

When the fourth operating mode corresponding to RAID5 is set, the write back section extracts the effective data block as a target of the write back in the cache blocks on a parity group unit basis and calculates the parity data. After that, the effective data blocks and parity data which were extracted in a day are written into a plurality of disk units of the disk array in parallel. That is, even in RAID5, the apparatus is made operative in a manner similar to the case of RAID3, thereby efficiently executing the write back. In the case where the number of lacking effective data blocks serving as targets of the write back among the cache blocks for the parity group is equal to or less than a predetermined number, for example, when it is equal to or less than one block, the lacking data is read out from the corresponding disk unit. After that, the effective data blocks as many as the number of parity groups and the calculated parity data are written into a plurality of disk units of the disk array in parallel, thereby enabling the operation like RAID3 to be executed. Further, when predetermined write back conditions are satisfied, the write back section designates a predetermined number of cache blocks from the end of the LRU table as write back targets and rearranges the cache blocks in a designated range so that the host data blocks are continuous, thereby enabling the write back like RAID3 to be performed.

VI. Automatic Setting of Cache Block Size

Further, according to the invention, while the apparatus is being used, the data block size which is used by the access request from the host computer is collected as statistics information. When the apparatus is activated next, the average value of the collected statistics information is automatically set as a cache block size of the cache memory.

The disk cache apparatus using a disk array as a target uses an empty space management table for management of a cache memory. That is, in the case where the staging or writing is instructed for data which doesn't exist on the cache memory, the controller allocates a new cache block from an unused space on the cache memory and receives the data due to the staging from the disk unit or the write data from the host computer. In this case, the cache memory is managed by using the empty space management table so that a predetermined amount of empty space remains in the cache memory. Namely, when a situation such that the remaining capacity of the cache memory is equal to or less than a specified value occurs, the sweep-out of the effective data on the cache memory is scheduled. The data which has been written to the disk is invalidated so as to delete the registration of the LRU table that is designated by the hash entry. As for the dirty data which is not yet written to the disk, the rewriting to the disk is scheduled. Due to this, an empty space is always prepared in the cache memory for the read or write request from a new upper-order apparatus and the process can be immediately started.

The staging from the disk array when the cache memory causes a mis-hit for the read request is executed so that an effect which is obtained by using the cache memory can be made the most of. After the data as much as the requested host blocks was staged from the disk unit onto the cache block, the data corresponding to the subsequent host block is prefetched from the disk unit, so that such a staging can be realized. By performing the pre-reading operation to the block subsequent to the host block which was subjected to the staging, the cache effect can be made the most of for a successive read request from the host computer. A prefetch amount in this case differs in dependence on RAID0, RAID1, RAID3, and RAID5. First, in RAID3, one host block is distributed and stored into each disk unit on a unit basis of a predetermined number of bytes and there are many cases where the staging is executed at a high speed and a large amount of data is requested. In consideration of such a situation, in RAID3, the data corresponding to the host blocks of up to the last block among the cache blocks including the staged effective block is prefetched. In RAID5, the read transfer speed is fundamentally slower than the speed of the disk unit and the staging speed is slower than that of RAID3 and the reading process is mainly performed for a small amount of data. Therefore, in RAID5, the blocks of up to the next parity group (group in which the disk unit for parity is the same) subsequent to the staged block are processed as targets. If the striping is executed so that the cache block size and the block size of the parity group are equalized, a data amount of up to the last block among the cache blocks is set to a prefetch amount, thereby enabling the high speed staging like RAID3. Further, in the case where there is an empty space in the continuous effective blocks on the cache block after completion of the prefetch and the data is distributed, the internal staging is executed to the empty block and the effective data on the cache block is set into a continuous block region, thereby enabling the data management to be easily performed.

The disk cache apparatus manages the cache memories so as to sweep out data as fast as possible for the staging of a large amount of sequential data. Generally, in the disk cache apparatus, by frequently reading the same data, an effect is obtained. When the host computer generates a read request of a large amount of data which does not exist in the cache memory, the data is staged from the disk unit and is transferred to the host computer. In spite of the fact that such data is referred only once, it remains on the cache memory as it is and the cache space is not effectively used. However, such data also cannot be immediately invalidated. Therefore, when the host computer requests the data of a predetermined amount or more, namely, for example, the data corresponding to 100 cache blocks, although the data should inherently be registered to the head position of the LRU table after completion of the staging, it is registered to a position near the end of the LRU table. Consequently, a large amount of sequential data becomes the old data which is not falsely mostly used in a relatively short time and can be swept out by the cache invalidation.

Further, by the optional designation, the data can be staged from the disk array into the cache memory while including the parity data at RAID5. By such a staging including the parity data, there is no need to read the old data and old parity data from the disk array by the write back process. A write penalty which RAID5 has can be reduced. Specifically speaking, in the case where the staging of the parity is not executed, it takes a time corresponding to the rotation of 2.5 times of the disk unit. However, in the case where the parity is staged, it takes a time corresponding to the rotation of 1.5 times. However, the capacity of cache memory is reduced by only the amount corresponding to the execution of the staging.

Further, in the operating state of RAID5, the disk cache apparatus optimizes the write back process for the disk array that is performed after completion of the writing process. In RAID5, in the case where the continuous data blocks exist on the cache block over all of the disk units constructing the parity group, a parity is calculated from the continuous data blocks in a manner like RAID3 and both of the data block and the parity are simultaneously transferred, so that they can be written in parallel. On the other hand, in the case where only the data block of a part of the disk units constructing the parity group exists on the cache block, old parity and old data block are read and a parity is calculated. After that, the ordinary read modification writing operation to write the data block and parity in parallel is executed. In this case, when an empty space of the continuous data blocks on the cache block is equal to or less than a predetermined value, for example, when it is equal to one disk unit, the effective data block is staged in a space portion and the continuous data blocks is formed. After that, the write back for simultaneously updating like RAID3 is performed.

Further, when the empty space of the cache memory is equal to or less than a specified value and the write back process is scheduled, the cache blocks in a predetermined range from the end of the LRU table are designated as targets for write back. The cache blocks designated as write back targets are rearranged so that the host blocks are continuous, thereby enabling the high speed write back process like RAID3 to be executed.

Further, the disk cache apparatus can automatically set a cache block size in accordance with the use form of the user. Generally, in the user system, a parameter which needs to be certainly set by the user is a host block size (logical block size). The cache block size is set as a size in which a plurality of host block sizes are collected. When the system is first activated, the system is initialized by the cache block size of default. However, when the system is activated next, the cache block size is automatically changed in accordance with the use environment of the user. That is, statistics of the host block sizes at which the cache system was accessed during the use by the user are obtained and the average host block size is derived. When the system is activated due to the next turn-on of the power source, the cache system is made operative by the novel cache block size obtained in the use of the preceding time. The cache block size is optimized without needing the judgment by the user.

The above and other objects, features, and advantages of the present invention will become more apparent from the following detailed description with reference to the drawings.

BRIEF DESCRIPTION OF THE DRAWINGS

FIG. 20 is a flowchart showing a write back process in the average mode in FIG. 10;

FIG. 26 is an explanatory diagram showing an example of a use state of a cache memory in FIG. 21;

DETAILED DESCRIPTION OF THE PREFERRED EMBODIMENT

[Hardware Construction of System]

Figure 1:
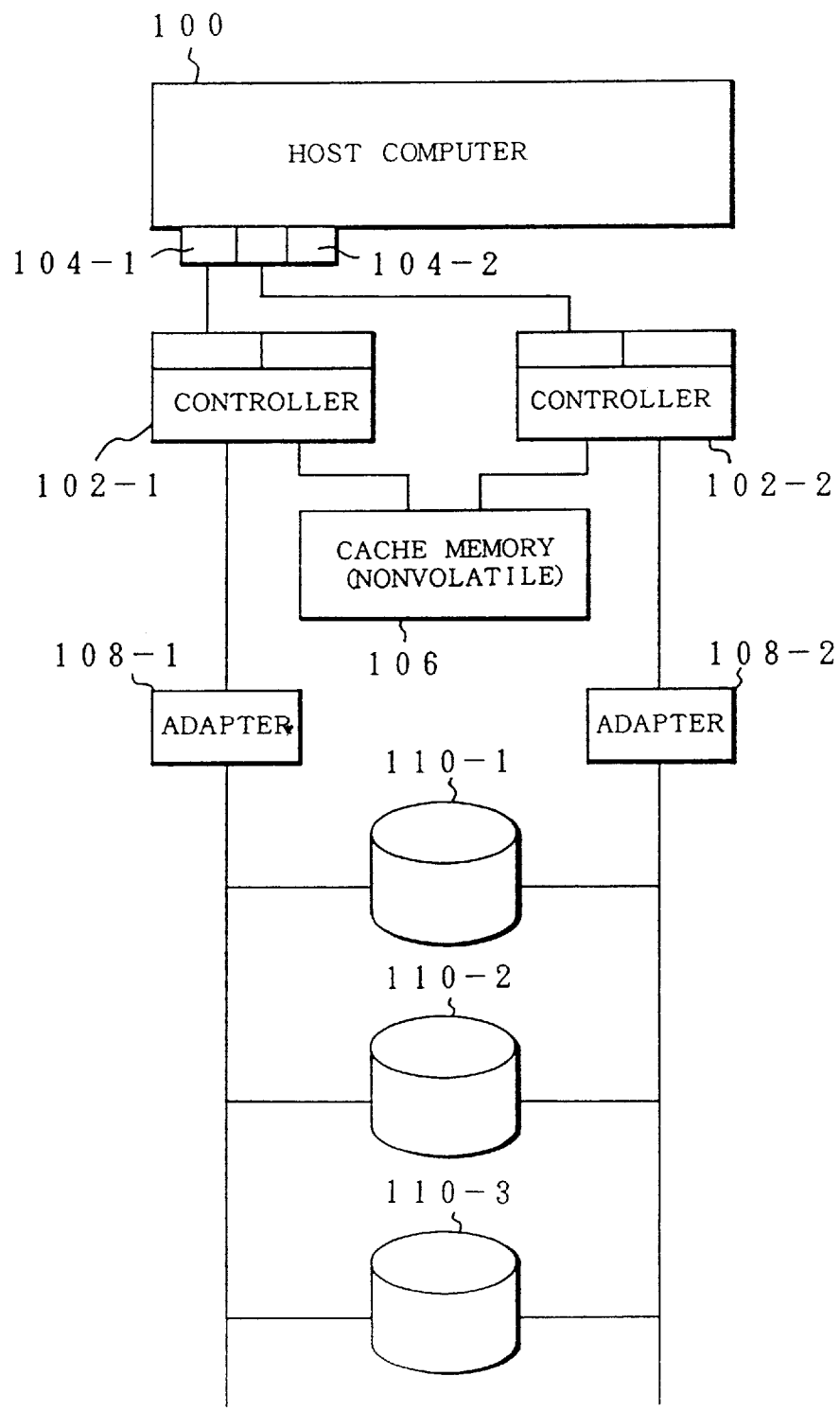
FIG. 1 is a block diagram of a conventional disk cache apparatus using a volatile memory.
Figure 2:
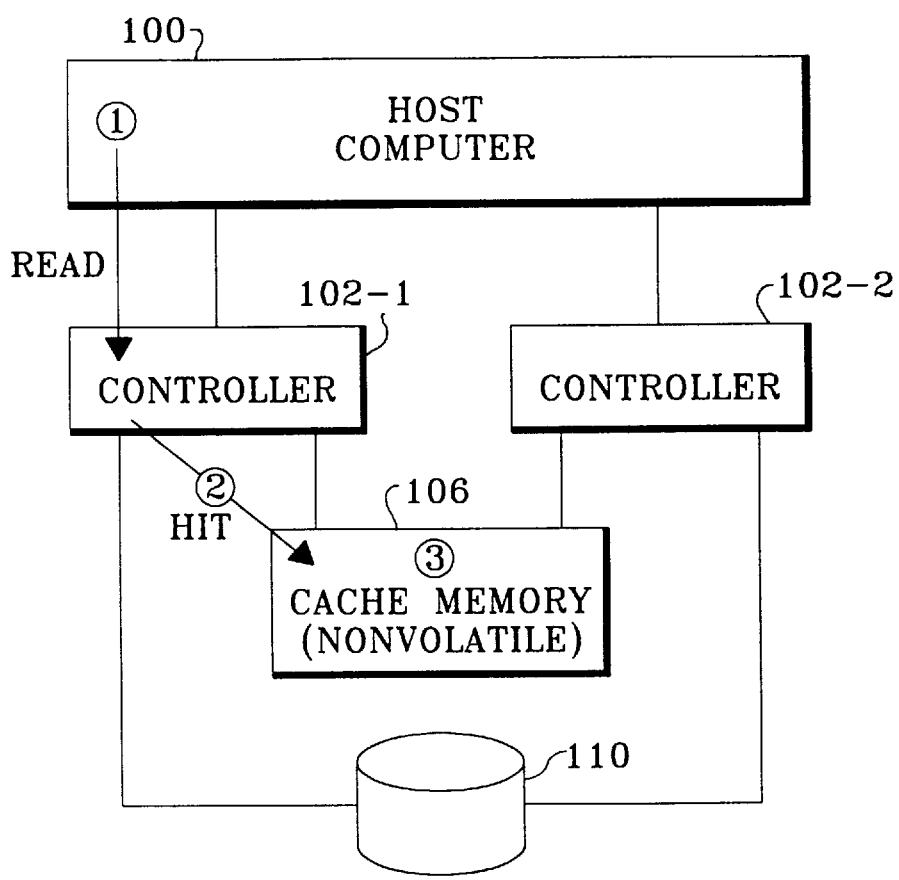
FIG. 2 is an explanatory diagram showing a reading process at the time of a cache hit of the conventional apparatus of FIG. 1.
Figure 3:
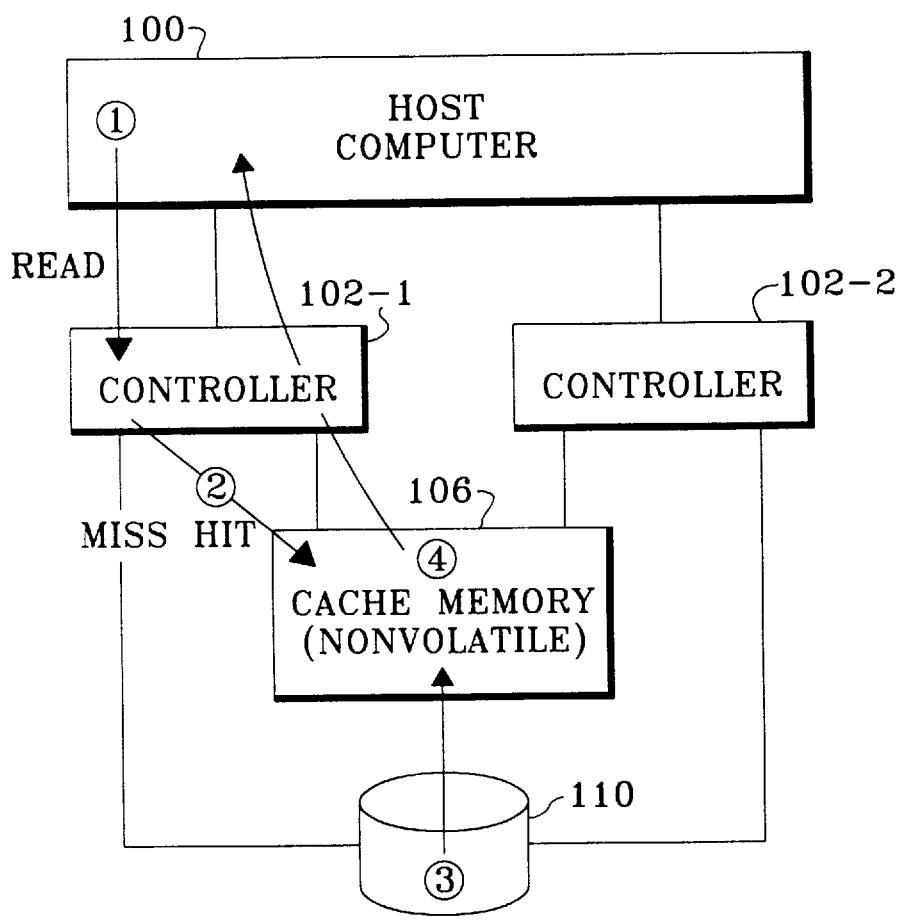
FIG. 3 is an explanatory diagram showing the reading operation at the time of a cache mis-hit of the conventional apparatus of FIG. 1.
Figure 4:
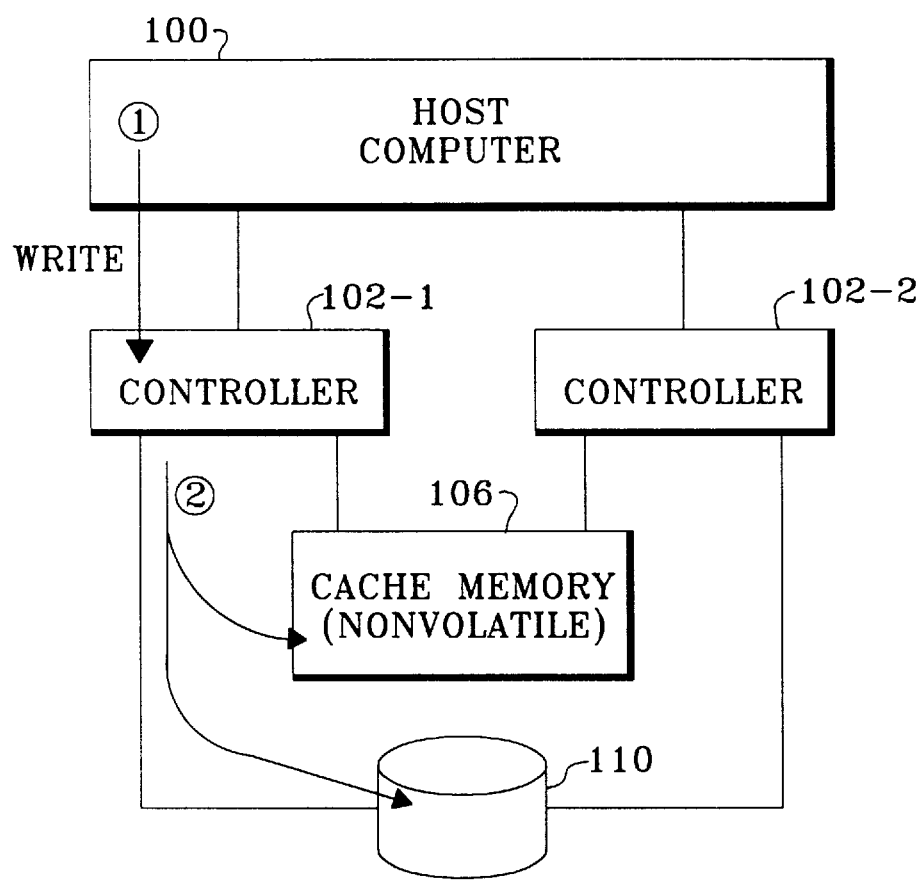
FIG. 4 is an explanatory diagram showing the writing process of the conventional apparatus of FIG. 1.
Figure 5:
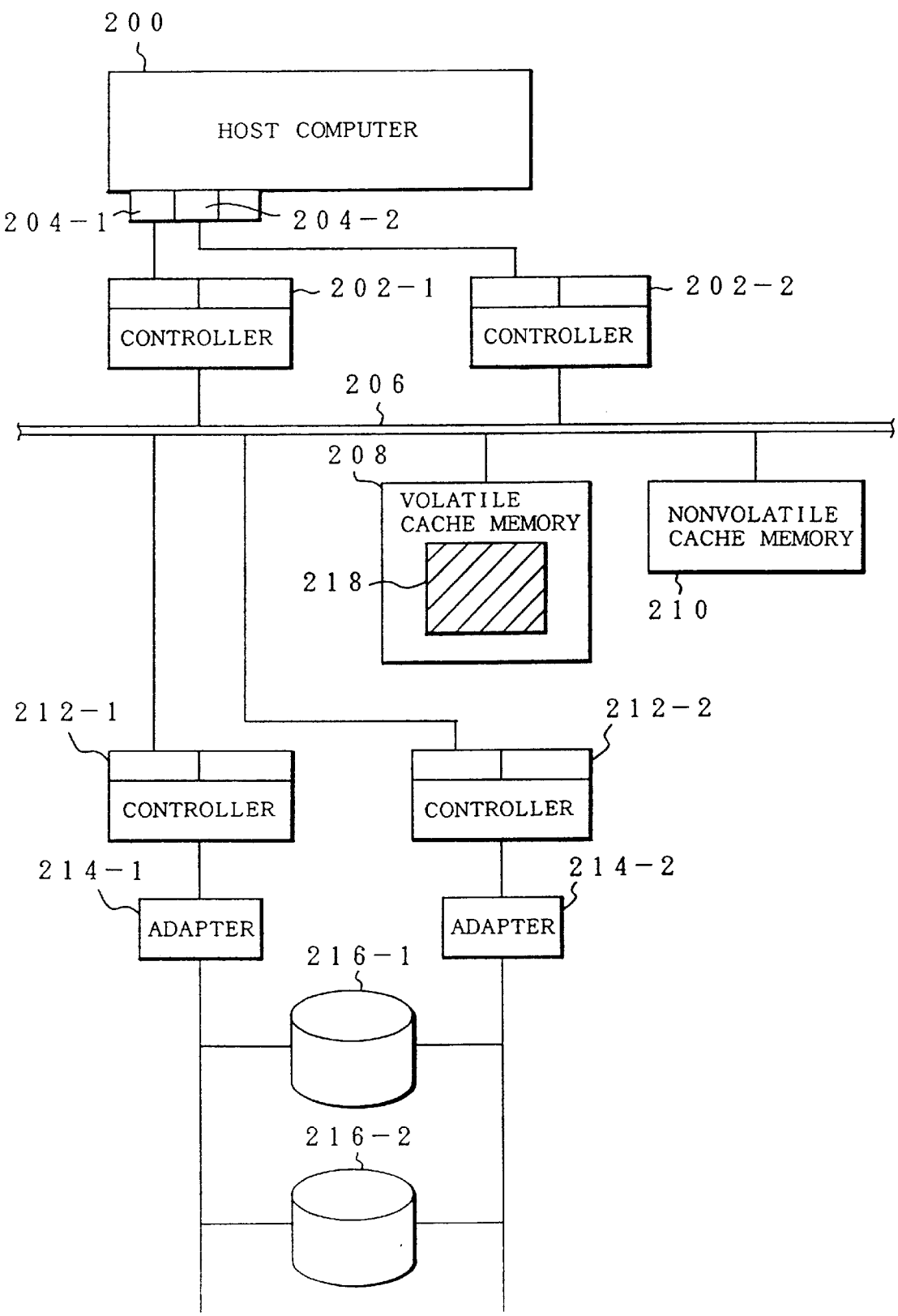
FIG. 5 is a block diagram of a conventional apparatus in which a volatile memory and a non-volatile memory mixedly exist.
Figure 6:
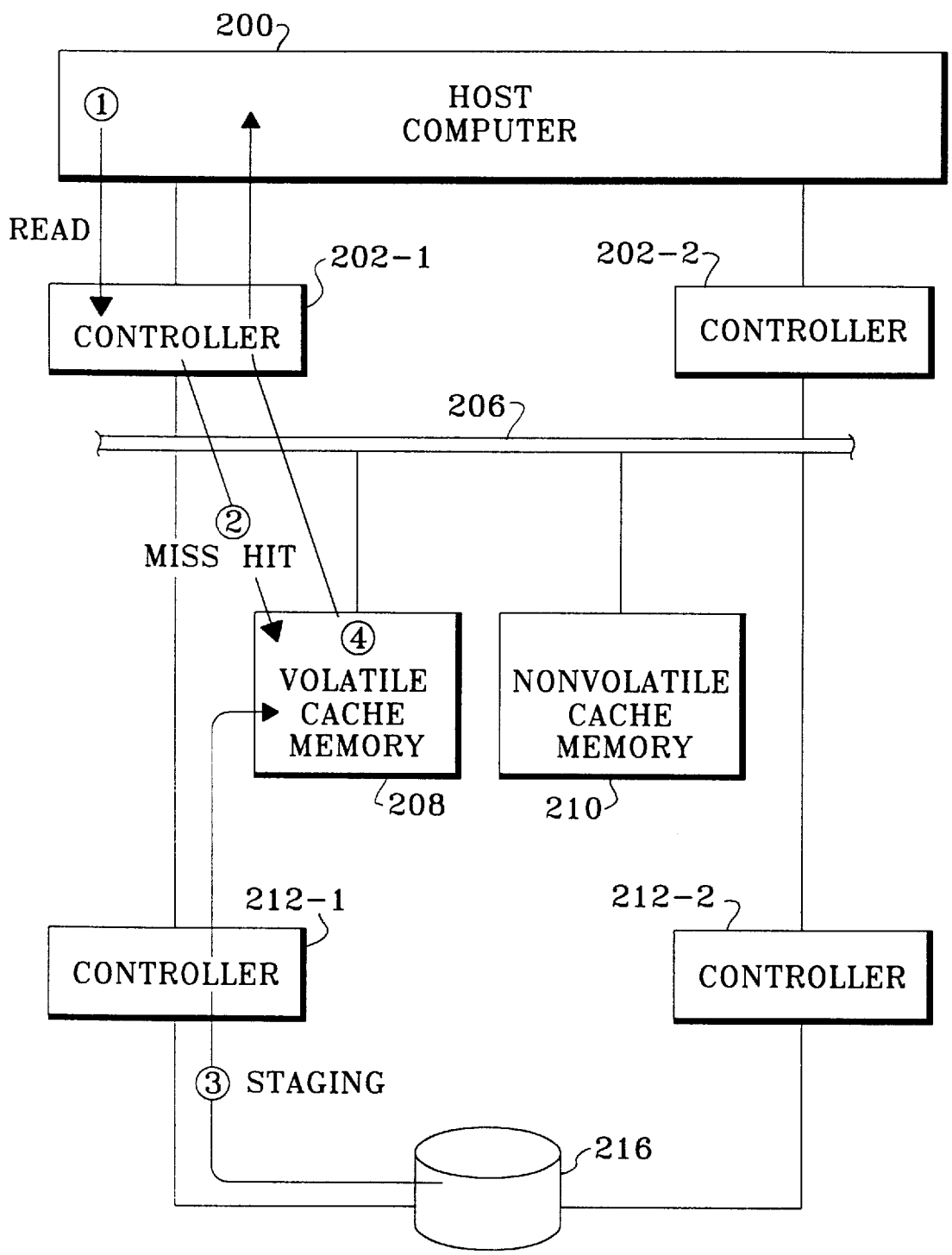
FIG. 6 is an explanatory diagram showing a reading process at the time of cache mis-hit in the conventional apparatus of FIG. 5.
Figure 7:
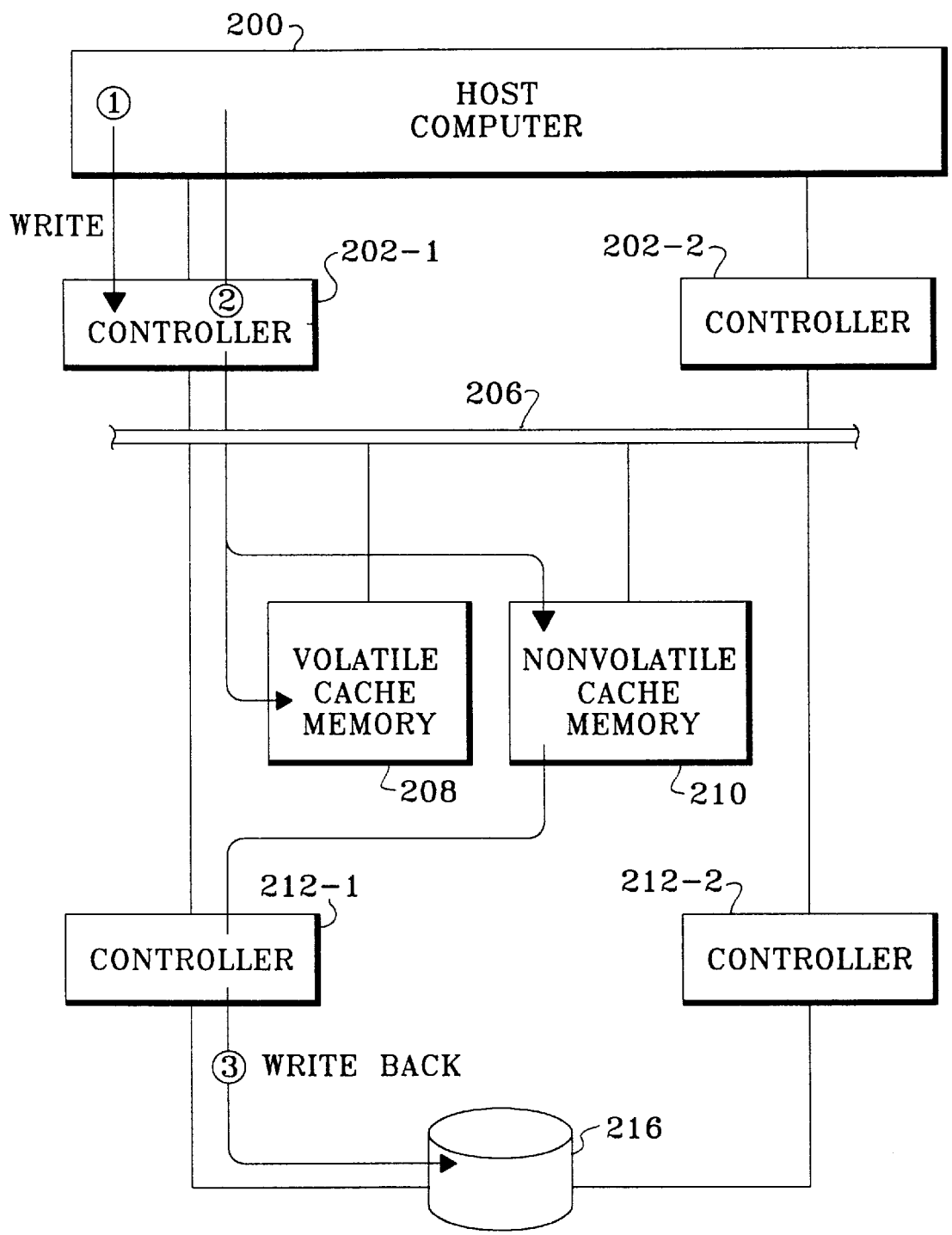
FIG. 7 is an explanatory diagram showing a writing process in the conventional apparatus of FIG. 5.
Figure 8:
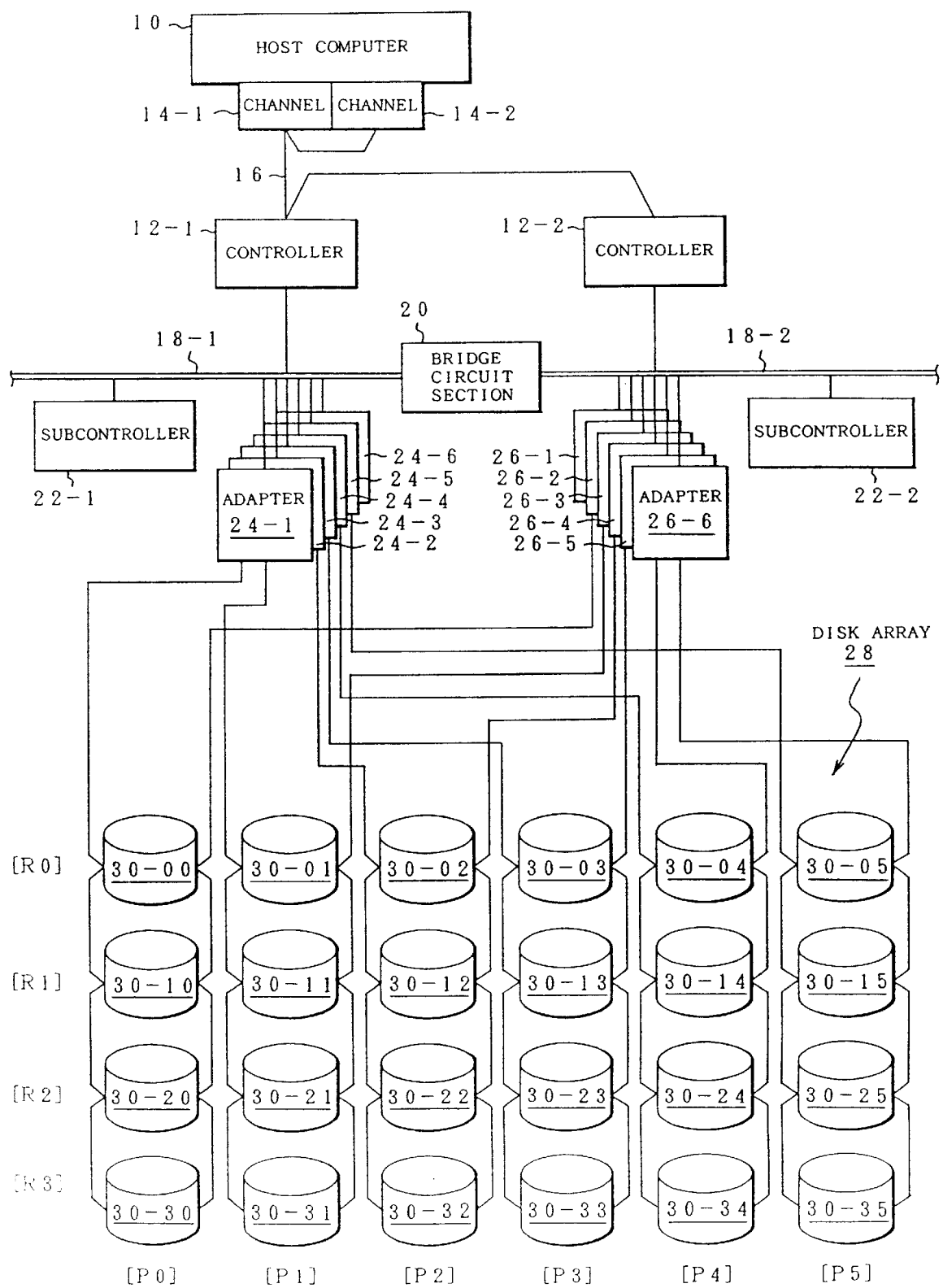
FIG. 8 is a block diagram showing a hardware construction of the invention.

FIG. 8 is a hardware construction of an input/output subsystem using disk units to which a disk cache apparatus of the present invention is applied. At least two channel devices 14-1 and 14-2 are provided for a host computer 10 as an upper order apparatus. Two controllers 12-1 and 12-2 are connected to the channel devices 14-1 and 14-2 through a channel interface 16. In the embodiment, an SCSI (Small Computer System Interface) is used as a channel interface 16. An MBC interface (Block Multiplexer Channel Interface) can be also used. Each of the controllers 12-1 and 12-2 have a function as disk control means and include a cache unit therein. The device sides of the controllers 12-1 and 12-2 are connected to common buses 18-1 and 18-2. The common buses 18-1 and 18-2 are coupled by a bridge circuit section 20. Information such as message, command, and the like and data can be communicated between the controllers 12-1 and 12-2. Further, subcontrollers 22-1 and 22-2 are connected to the common buses 18-1 and 18-2 and the processing functions of the controllers 12-1 and 12-2 are distributed, thereby reducing a load. A plurality of disk units 30-00 to 30-35 which are provided in a disk array 28 are connected to the common buses 18-1 and 18-2 through adapters 24-1 to 24-6 and 26-1 to 26-6, respectively. In the embodiment, the disk array 28 constructs a parallel disk group by six ports P0 to P5 which are accessed in parallel by the controllers 12-1 and 12-2. A plurality of such parallel disk groups with as many as four ranks shown by R0 to R3 are provided. Specifically speaking, the rank R0 is constructed by six disk units 30-00 to 30-05 corresponding to the ports P0 to P5. The rank R1 is constructed by the disk units 30-10 to 30-15 corresponding to the ports P0 to P5. The rank R2 is constructed by the disk units 30-20 to 30-25 corresponding to the ports P0 to P5. Further, the rank R3 is constructed by the disk units 30-30 to 30-35 corresponding to the ports P0 to P5. The positions of the disk units constructing such a disk array 28 are defined by the addresses of the rank number R and the port number P. For example, the disk unit 30-00 can be expressed by (R0, P0).

Figure 9:
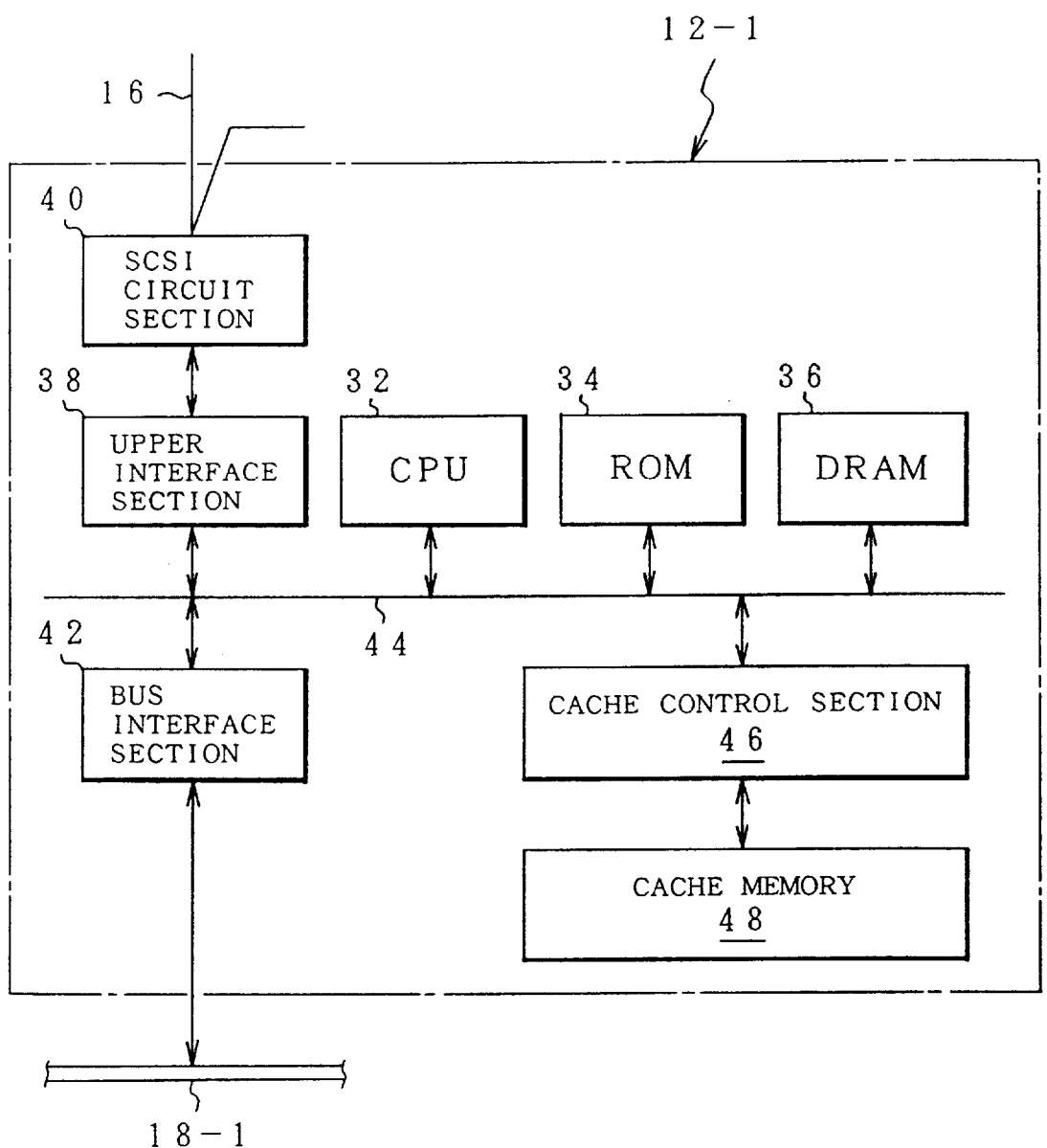
FIG. 9 is a block diagram showing a hardware construction of a controller in FIG. 8.

FIG. 9 shows a hardware construction on the controller 12-1 side in FIG. 8. A CPU 32 is provided in the controller 12-1. An upper interface section 38 to communicate with an ROM 34, a DRAM 36, and an SCSI circuit section 40 and a bus interface section 42 to communicate with the common bus 18-1 are connected to an internal bus 44 of the CPU 32. Further, a cache control section 46 and a cache memory 48 to realize a disk cache unit are provided. It is also possible to independently provide the cache control section 46 and to realize as a function of the CPU 32. In the cache control section 46, a cache management table which is used to manage the cache memory 48, specifically speaking, a cache entry table, an LRU table, and an empty space management table are developed in the DRAM 36.

[Whole Function of Cache Unit]

Figure 10:
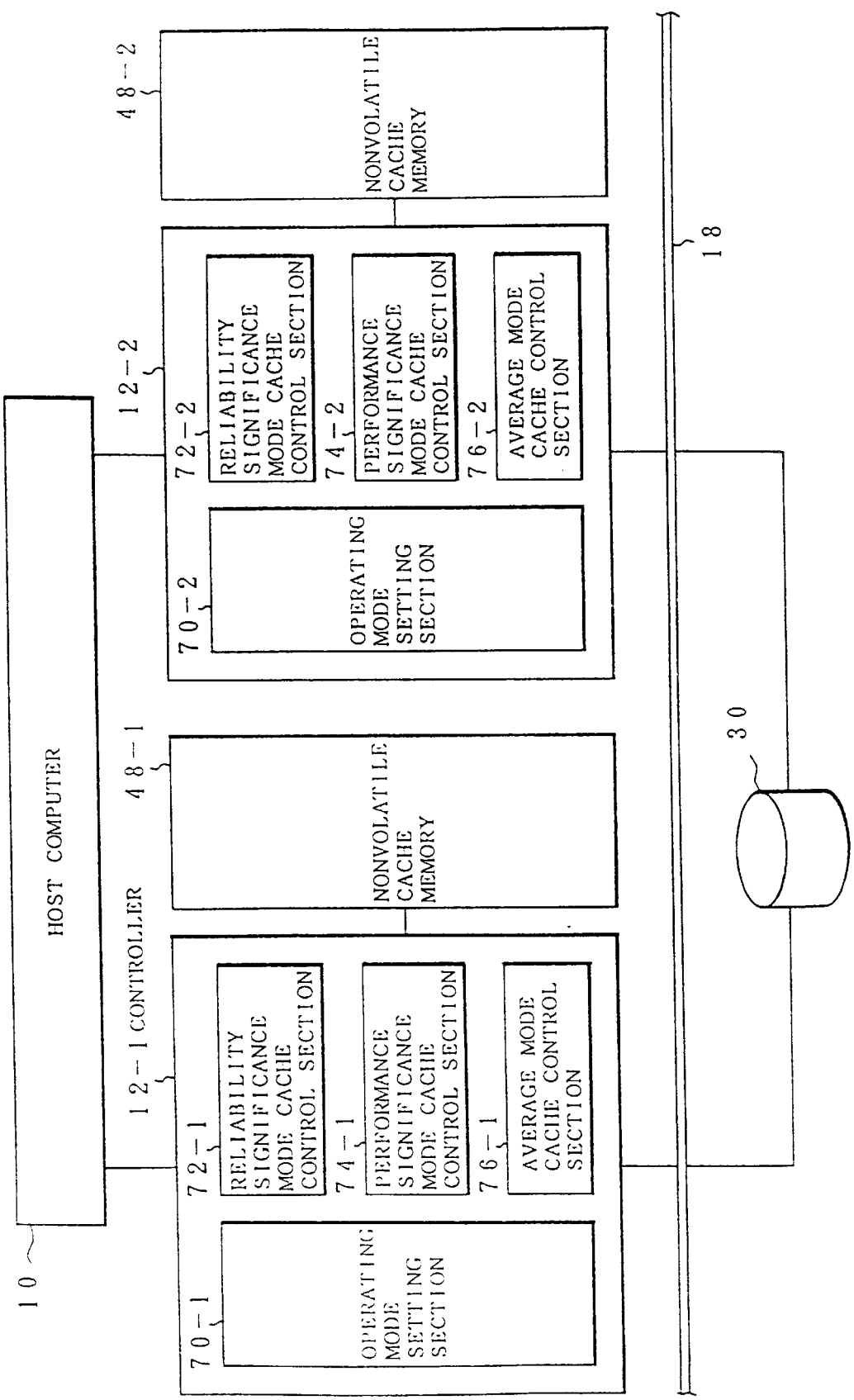
FIG. 10 is a block diagram showing a processing function of the invention.

FIG. 10 shows a processing function of the invention in which the hardware construction in FIG. 8 is set to a target. For simplicity of explanation, one disk unit 30 is shown as representative with respect to the disk array side and one common bus 18 is also shown as for the common bus. The cache memory is taken out from the controller and shown.

In FIG. 10, operating mode setting sections 70-1 and 70-2, reliability significance mode cache control sections 72-1 and 72-2, performance significance mode cache control sections 74-1 and 74-2, and average mode cache control sections 76-1 and 76-2 are provided for the controllers 12-1 and 12-2. Non-volatile cache memories 48-1 and 48-2 are used as cache memories. When explaining the controller 12-1 side, the operating mode setting section 70-1 sets either one of the reliability significance mode, performance significance mode, and average mode in accordance with a predetermined command instruction from a host computer 19, a pin setting which has been preset in the controller 12-1, or the like. On the basis of the setting by the operating mode setting sections 70-1 and 70-2, the operations of either ones of the reliability significance mode cache control sections 72-1 and 72-2, the performance significance mode cache control sections 74-1 and 74-2, and the average mode cache control sections 76-1 and 76-2 are made effective.

Since two controllers 12-1 and 12-2 are provided for the host computer 10, the controller side which received an access request from the host computer 10 is referred to as a local side and another control side which does not receive the access request is referred to as a remote side. Such a definition is a relative definition in the controllers 12-1 and 12-2. When the access request is supplied to the controller 12-1 from the host computer 10, the controller 12-1 is set to the local side and the controller 12-2 is set to the remote side. On the contrary, when the access request is supplied to the controller 12-2 from the host computer 10, the controller 12-2 is set to the local side and the controller 12-1 is set to the remote side.

[Disk Cache Control in Reliability Significance Mode]

In the reliability significance mode, the non-volatile cache memories 48-1 and 48-2 are used as both of the cache memories provided for the controllers 12-1 and 12-2 as shown in FIG. 10. In the reliability significance mode, volatile cache memories can be also used as both of those cache memories. In this case, in the performance significance mode and the average mode which will be clearly understood by the explanation hereinlater, since it is necessary to use the non-volatile cache memories for both of such cache memories. Therefore, it is necessary to use memories such that the non-volatile memories are set or the volatile memories and the non-volatile memories can be switched in accordance with the presence or absence of the power source backup.

In the reliability significance mode, the cache operation is executed so that the data in the non-volatile cache memories 48-1 and 48-2 of the controllers 12-1 and 12-2 are equal. That is, the cache memories of two systems are not independently used but by storing the same data, the data is assured as double data. Even when the data on one side is transmitted, the cache data is guaranteed and the reliability is raised. The staging at the time of mis-hit for the read request is executed to both of the non-volatile cache memories 48-1 and 48-2 from the disk unit 30. The write data in response to the write request is also written into both of the non-volatile memories 48-1 and 48-2. Further, the write back to the disk unit 30 after completion of the writing process is executed from the cache memory on the local side which received the write request.

Figure 11:
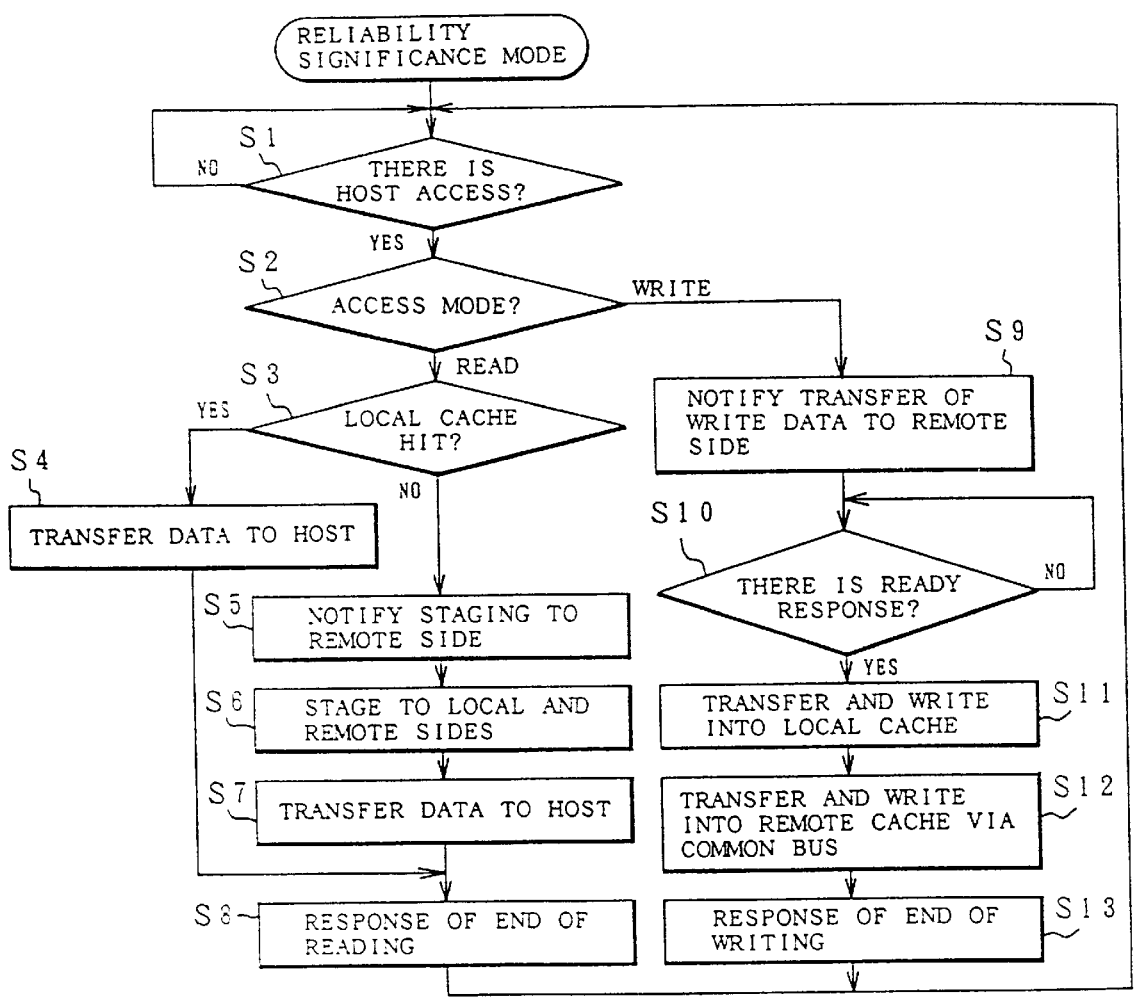
FIG. 11 is a flowchart showing the processing operation in a reliability significance mode in FIG. 10.

A flowchart of FIG. 11 shows the cache operation in the reliability significance mode. First, in step S1, the presence or absence of the access request from the host computer 10 is checked. When there is an access request, step S2 follows and a check is made to see if the access mode is the access mode of the read request or the write request. In case of the read request, in step S3, a hit judgment is performed to see if the requested data exists in the self non-volatile cache memory or the local side cache memory. When the cache hit is obtained, in step S4, the requested data is read out and transferred to the host computer 10. In case of the cache mis-hit, the staging from the disk unit 30 is executed. However, prior to staging, the staging is notified to the controller 12-1 on the remote side.

Figure 13:
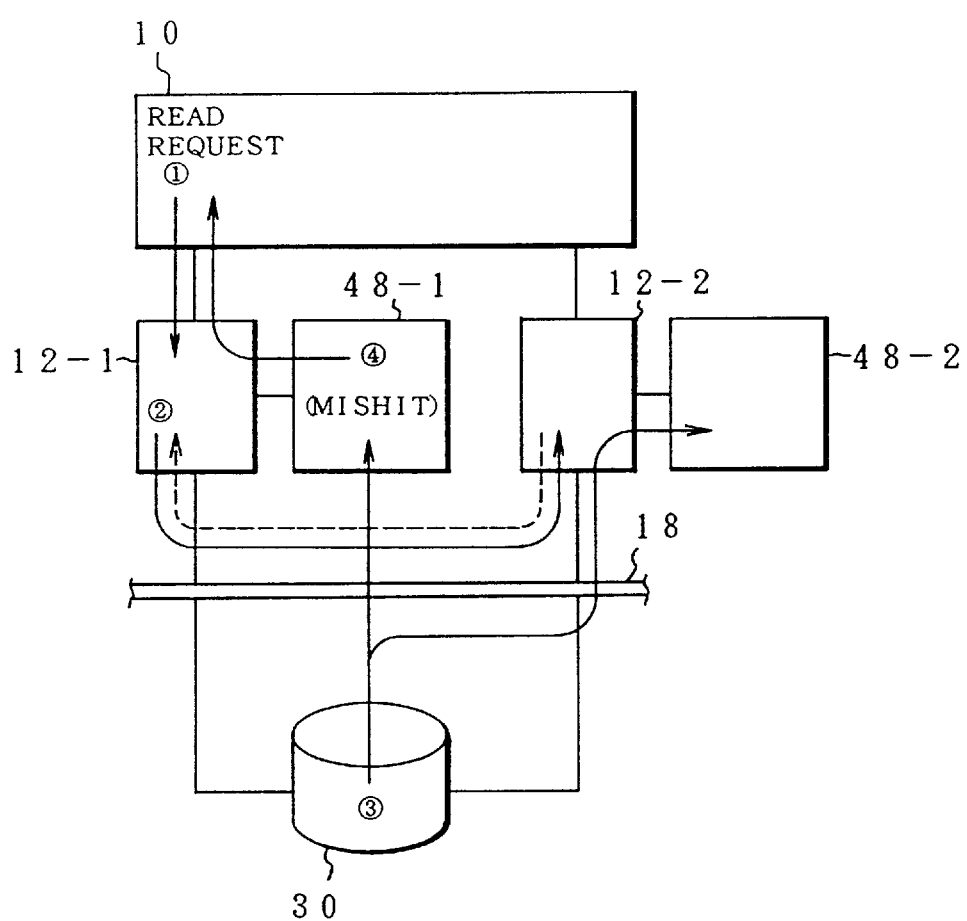
FIG. 13 is an explanatory diagram showing the operation in the case where a mis-hit occurs on the local side for a read request in the reliability significance mode.

The processing operation in step S5 is shown in FIG. 13. When the controller 12-1 which received the read request from the host computer 10 judges the mis-hit of the non-volatile cache memory 48-1, a message is sent to the controller 12-2 on the local side via a common bus 18 prior to staging from the disk unit 30. The message notifies that since the cache mis-hit has occurred, the data from the disk unit 30 is also transferred to the non-volatile cache memory 48-2 on the remote side by the staging. By receiving the message from the controller 12-1 on the local side, the controller 12-2 on the remote side updates the self cache management table and allocates a space for staging into the non-volatile cache memory 48-2. A signal indicating that the apparatus is in the standby state is returned to the controller 12-1 on the local side.

Referring again to FIG. 11, when the staging is notified to the remote side in step S5, the apparatus waits for a ready response from the remote side. In step S6, the requested data is read out from the disk unit 30 and stored into the non-volatile cache memory 48-1 on the local side. At the same time, the staging such that the data is transferred to the non-volatile cache memory 48-2 on the remote side through the common bus 18 and is written is executed. After completion of the staging to the non-volatile cache memory 48-1 on the local side, request data (4) obtained by the staging is transferred to the host computer 10. In step S8, a response indicative of the end of reading operation is performed and the series of processes for the read request are finished.

Figure 14:
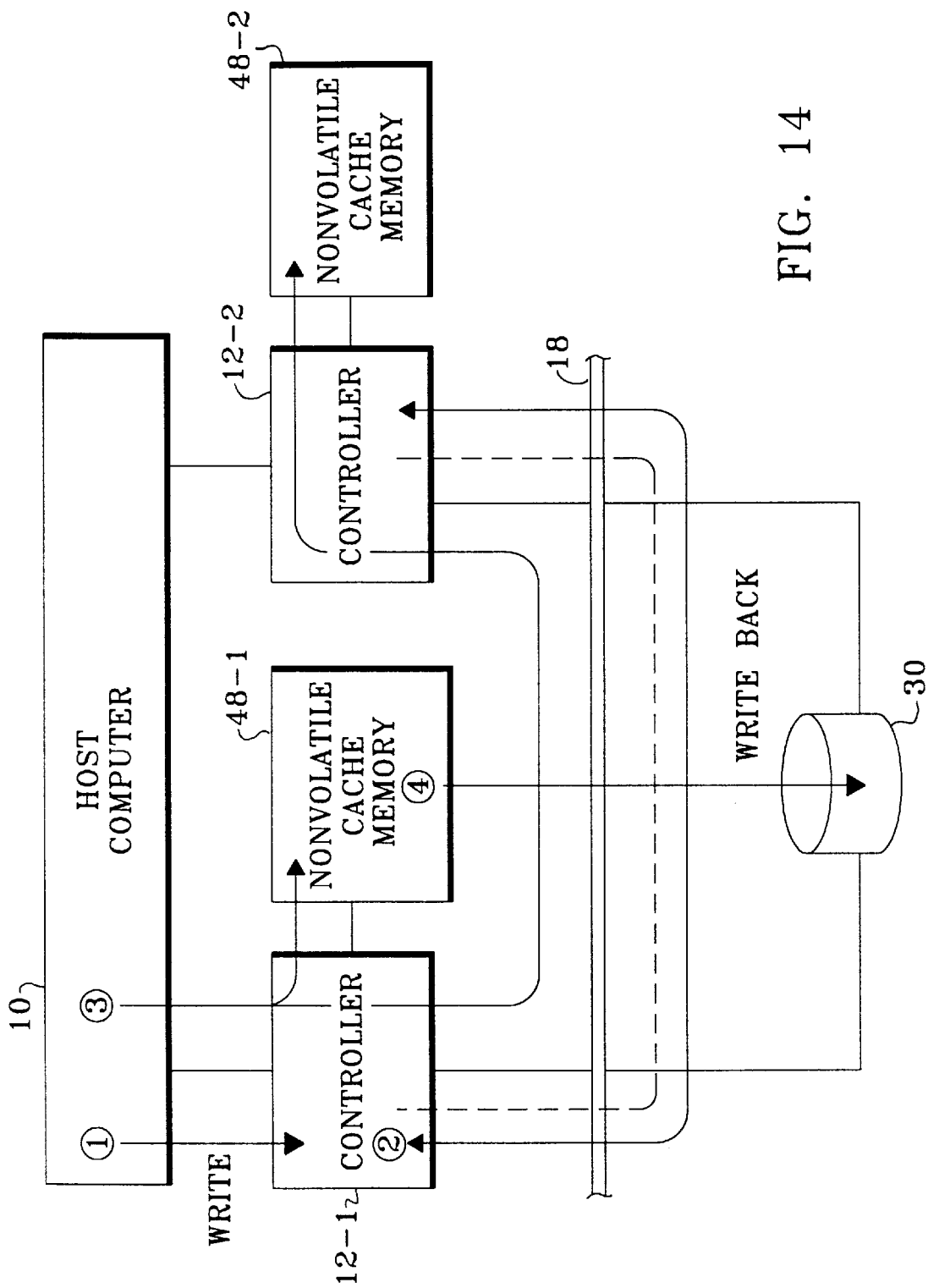
FIG. 14 is an explanatory diagram of the cache writing operation for a write request in the reliability significance mode.

In the case where the write request is judged in step S2, the controller 12-1 on the local side notifies the transfer of the write data to the controller 12-2 on the remote side through the common bus 18. For example, as shown in FIG. 14, when the controller 12-1 receives a write request (1) from the host computer 10, a message (2) is sent to the controller 12-2 on the remote side via the common bus 18. The message (2) notifies that it is necessary to update the non-volatile cache memory 48-2 by the write request and the write data is transferred to the non-volatile cache memory 48-2 on the remote side via the common bus 18. When receiving the message (2), the controller 12-2 on the remote side updates the self cache management table and allocates a space for writing into the non-volatile cache memory 48-2 and returns a ready response to the controller 12-1 on the local side. When the ready response from the controller 12-2 on the remote side is judged in step S10, the controller on the local side writes write data (3) from the host computer 10 into the self non-volatile cache memory 48-1, namely, the cache memory 48-1 on the local side. At the same time, in step S2, the write data (3) is transferred through the common bus 18 and is written into the cache memory 48-2 on the remote side. Thus, the write data is written into both of the cache memories 48-1 and 48-2 on the local and remote sides. In step S12, when the transfer and writing of the write data to the cache memories 48-2 on the local and remote sides are finished, the write back is not executed at this point in time. A response indicative of the end of the writing operation is transferred to the host computer 10 in step S13 and the series of processes for the write request are finished.

Figure 12:
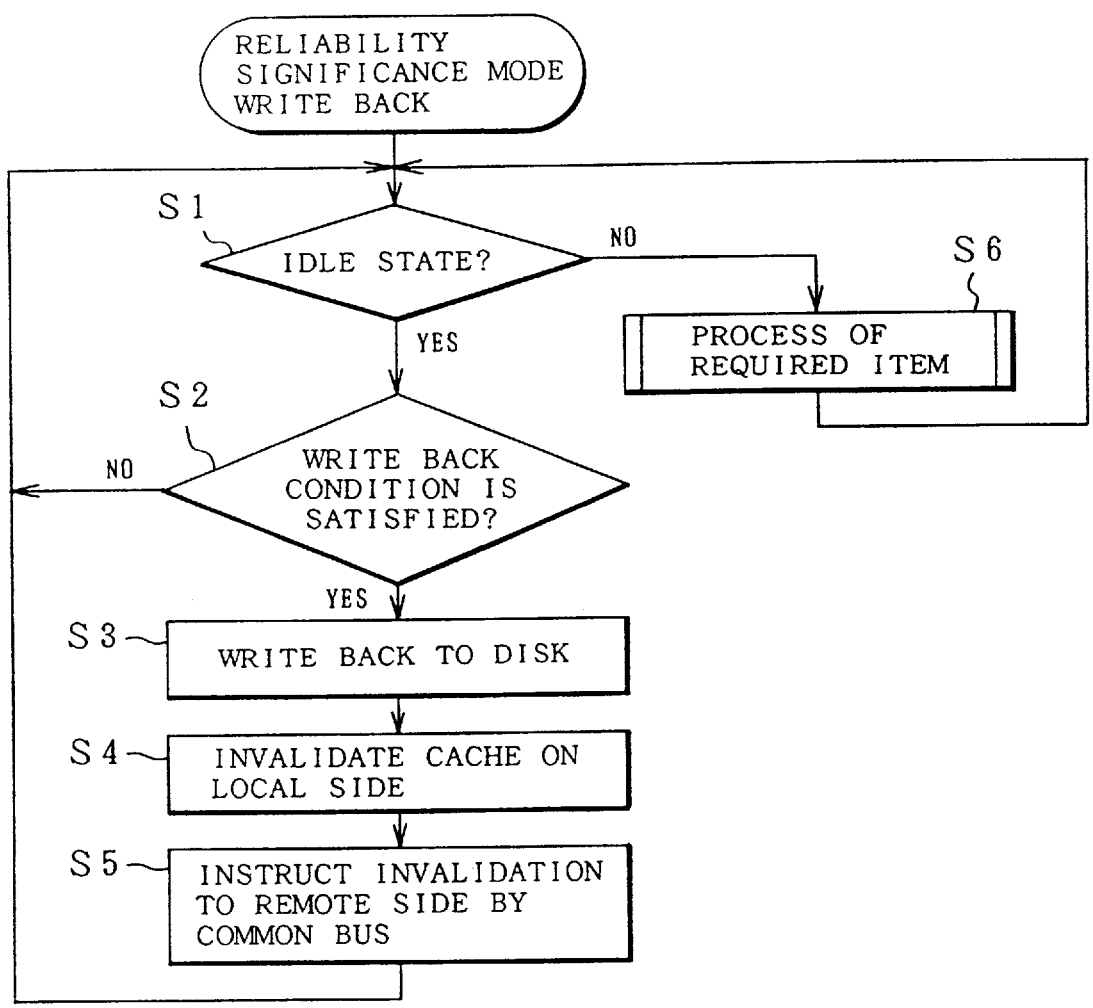
FIG. 12 is a flowchart showing a write back process in the reliability significance mode in FIG. 10.

A flowchart of FIG. 12 shows the processing operation of the write back in the reliability significance mode. As shown in the process for the write request in FIG. 11, at a time point when the write data is written into the cache memories on the local and remote sides, the writing to the disk unit, namely, what is called a write through is not performed. When predetermined write back conditions are satisfied, the write back process to write back into the disk unit is executed. In the write back process, first, in step S1, the controller 12-1 judges whether the apparatus is in an idle state or not. If NO, the process corresponding to the requested item is performed in step S6. When the apparatus enters the idle state, a check is made in step S2 to see if the write back conditions are satisfied or not. The write back conditions are such that sweep-out conditions of the cache data have been scheduled on the basis of the LRU table provided in the cache management table. That is, cache blocks such that the cache block which was latest used is set to the head block and the cache block which is not frequently used and in which a long time has elapsed from the registration is set to the last block are registered into the LRU table of the cache management table. For example, the cache invalidation is executed to the cache block at the end of the table which is not used for a predetermined time. However, with respect to the data which is not yet written into the disk unit, namely, so called dirty data, the write back is scheduled prior to invalidating. When the write back conditions are satisfied in step S2, the write back such that the cache blocks in a predetermined range from the end of the LRU table as a target of the write back are read out and written into the disk unit 30 is executed. For example, as shown in FIG. 14, in the precedent writing process, the controller 12-1 receives the write request (1) from the host computer 10 and writes the write data into the self non-volatile cache memory 48-1. When the write back conditions are satisfied in the subsequent idle state, the write back process to write the data into the disk unit 30 as shown in (4) is executed.

Referring again to FIG. 12, when the write back to the disk unit 30 is finished in step S3, the cache invalidation to delete the cache block in which the write back was finished from the hash table in the cache management table is executed in step S4. Further, the controller 12-1 on the local side sends the message to the controller 12-2 on the remote side via the common bus 18 in step S5. A deletion of the data after completion of the write back from the cache management table is instructed. The cache invalidation is also executed with respect to the remote side.

[Cache Control in Performance Significance Mode]

In the performance significance mode, the cache memories 48-1 and 48-2 provided for the two controllers 12-1 and 12-2 are set to the non-volatile memories and the data in the cache memories 48-1 and 48-2 are made independent. Therefore, the cache memory capacity can be set to a value that is at most two times as large as the capacity in the reliability significance mode in which the same data is stored in two cache memories 48-1 and 48-2. In other words, it can be said that the performance significance mode is regarded as a capacity significance mode. As for the reading process, in the case where a mis-hit occurs on the local side which received the read request, the cache process is requested to the remote side. When the cache hit occurs on the remote side, the request data is directly transferred to the host computer. In the case where mis-hit occurs on both of the local and remote sides, the staging from the disk unit is only executed to the local side from the disk unit. The writing process is only performed to the cache memory on the local side which received the write request. Further, as for the write back, the write back to write the data into the disk unit from the cache memory on the local side in which the write back conditions are satisfied is executed. Therefore, the cache invalidation to the remote side after completion of the write back in the reliability significance mode is not instructed.

Figure 15:
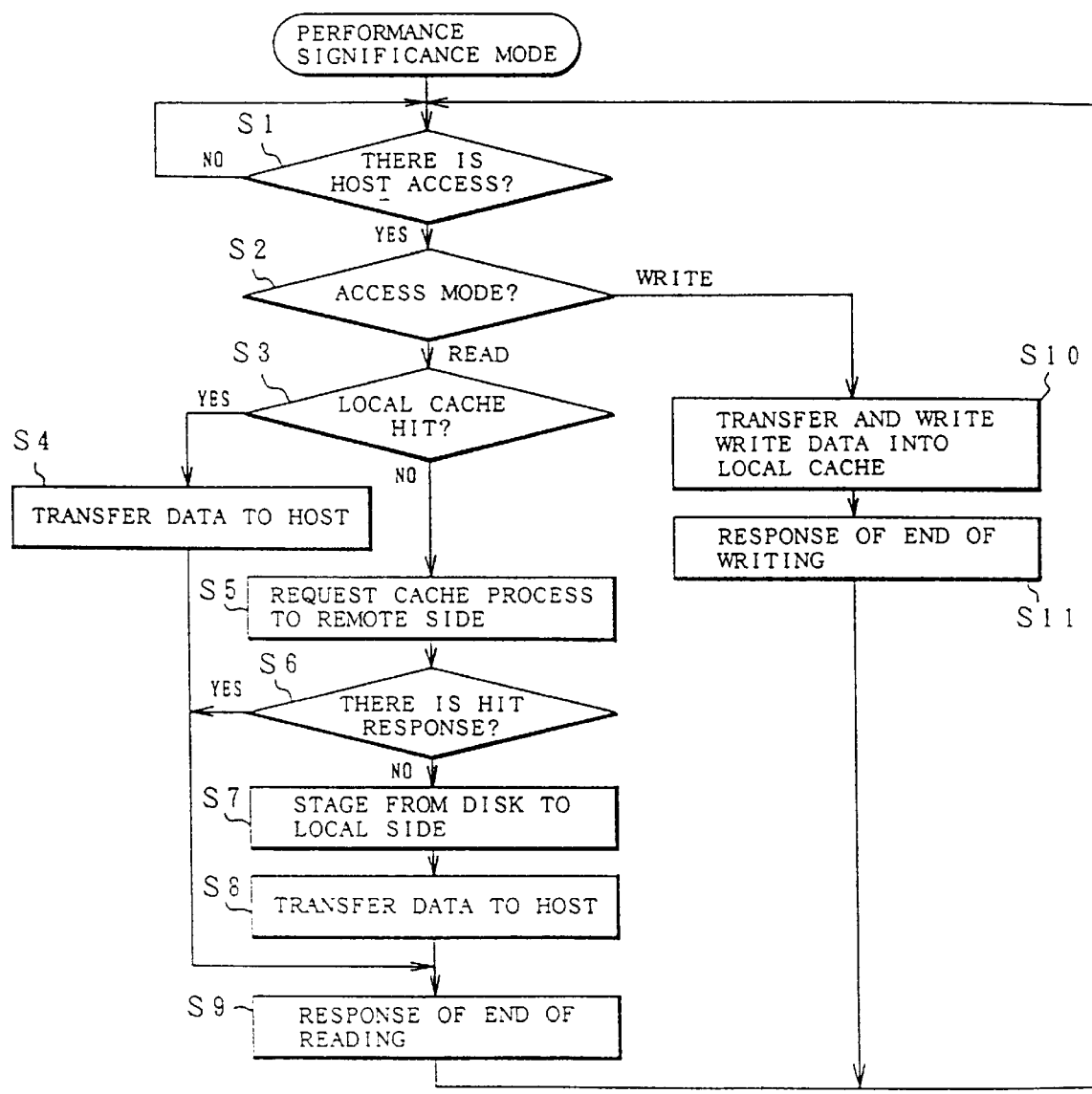
FIG. 15 is a flowchart showing the processing operation in a performance significance mode in FIG. 10.

A flowchart of FIG. 15 shows the cache operation in the performance significance mode. When there is the access request from the host computer 10 in step S1, the access mode is discriminated in step S2. In case of the read request, the presence or absence of the hit of the self cache memory 48-1, namely, local cache memory 48-1 is judged in step S3. When the hit of the local cache memory 48-1 is judged, the request data is transferred to the host computer 10 in step S4. When a mis-hit occurs in the cache memory 48-1 on the local side, the cache process is requested to the controller 12-2 on the remote side via the common bus 18. When receiving the request for the cache process from the local side, the controller 12-2 on the remote side directly transfers the request data to the host computer 10 when a cache hit occurs in the cache memory 48-2 on the remote side. The response result is notified to the controller 12-1 on the local side. On the other hand, when a mis-hit also occurs on the remote side, since no hit response is obtained from the remote side in step S6, the processing routine advances to step S7. In step S7, the staging to write the request data into the cache memory 48-1 on the local side from the disk unit 30 is executed. After completion of the staging, the data is transferred to the host computer 10 in step S8. The data which is staged after that is set into a hit possible state. After such a series of processes are finished, the controller 12-1 on the remote side returns a read end response to the host computer 10 in step S9.

Figure 17:
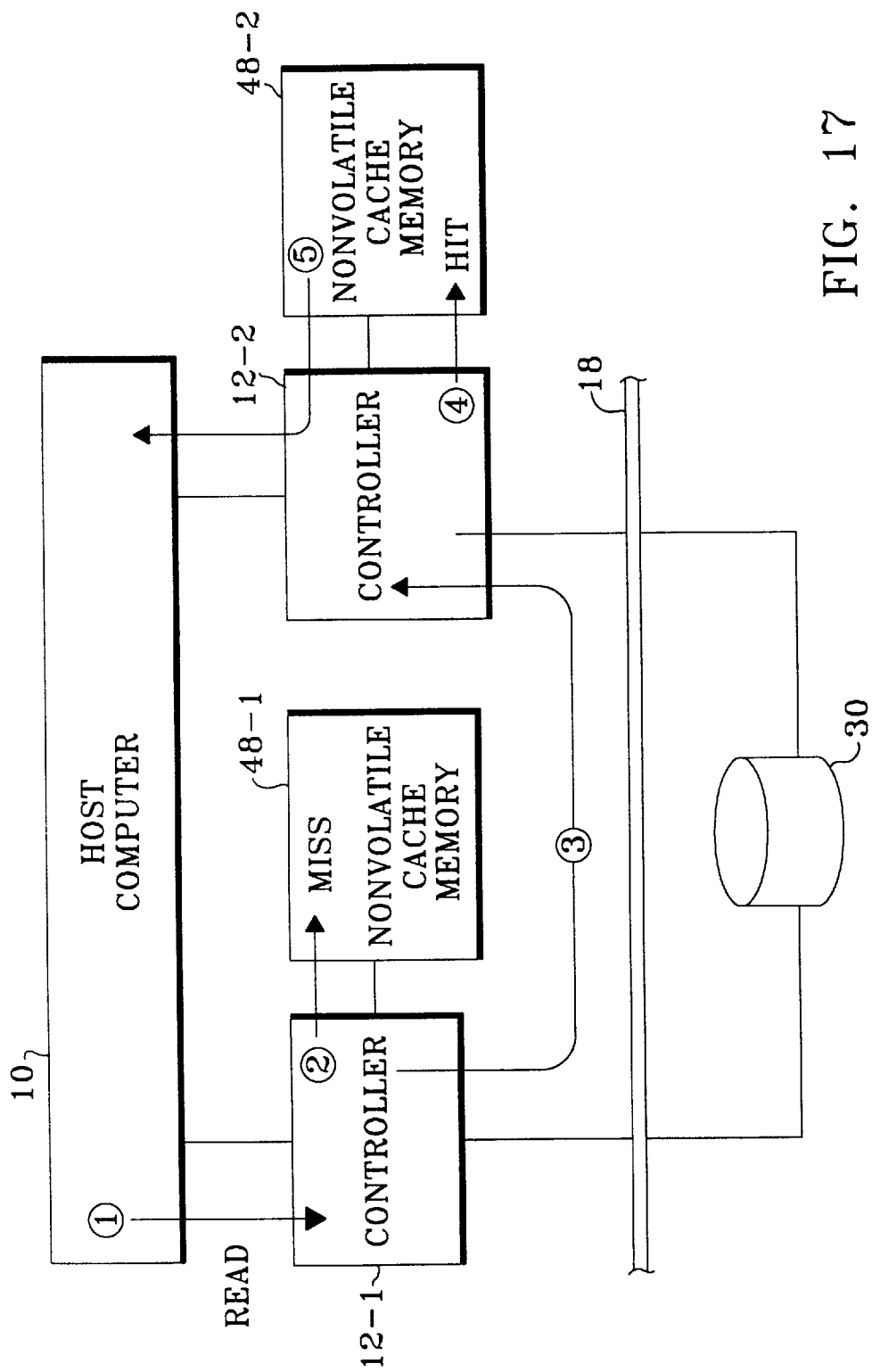
FIG. 17 is an explanatory diagram showing the operation in the case where a mis-hit occurs on the local side and a hit occurs on the remote side for a read request in the performance significance mode.

FIG. 17 shows the operations in steps S5 to S8 in FIG. 15 when the non-volatile cache memories 48-1 and 48-2 on both of the local and remote sides cause a mis-hit for the read request (1) from the host computer 10. When receiving the read request (1) from the host computer 10, the controller 12-1 on the local side sends the message to the controller 12-2 on the remote side via the common bus 18 when the mis-hit (2) of the self non-volatile cache memory 48-1 is judged. The message notifies to request for the discrimination regarding whether the request data exists in the non-volatile cache memory 48-2 on the remote side or not. The controller 12-2 on the remote side refers to the hash table in the self cache management table. If the request data exists, a hit response and the address in which the request data exists are notified to the controller 12-1 on the local side. On the basis of the notification, the controller 12-1 on the local side reads out request data (5) from the non-volatile cache memory 48-2 on the remote side and transfers to the host computer 10. In FIG. 17, the request data (5) read out from the non-volatile cache memory 48-2 on the remote side has been directly transferred from the controller 12-2 to the host computer 10. However, the data can be also transferred from the common bus 18 to the host computer 10 via the controller 12-1 on the local side. However, by directly transferring the data from the controller 12-2 on the remote side, the processes can be executed at a high speed even in consideration of a new channel coupling between the host computer 10 and the controller 12-2.

Figure 18:
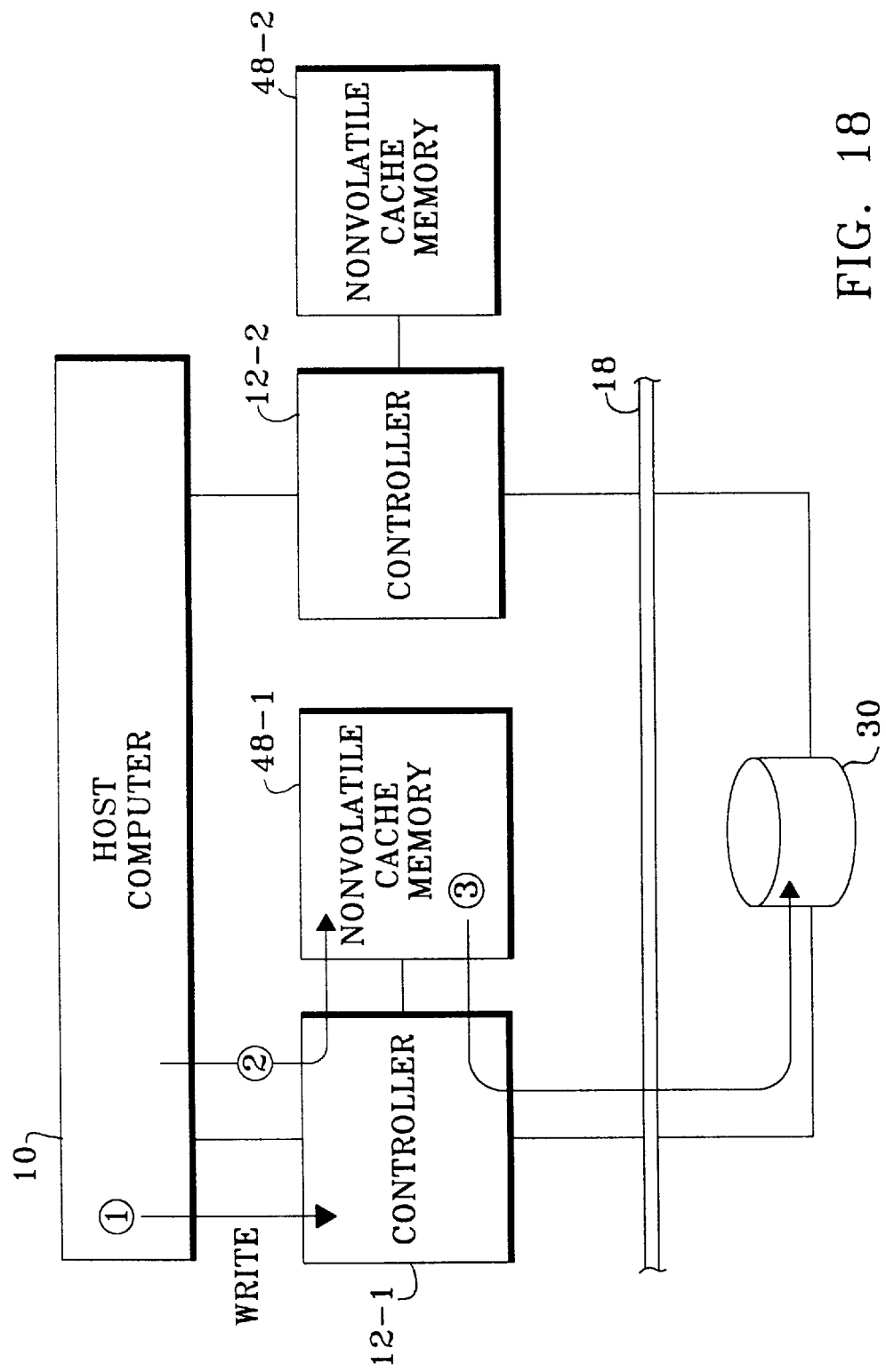
FIG. 18 is an explanatory diagram of the cache writing operation for a write request in the performance significance mode.

Referring again to FIG. 15, when the write request is judged in step S2, step S10 follows and the write data is transferred and only written into the cache memory 48-1 on the local side and a write end response is returned in step S1. For example, as shown in FIG. 18, when the write request is supplied from the host computer 10 to the controller 12-1, the self cache management table is updated and a storing region is assured. The write data (2) is transferred to the non-volatile cache memory 48-1 and written. At this stage, the data is not written into the disk unit 30 but is written by the subsequent write back process.

Figure 16:
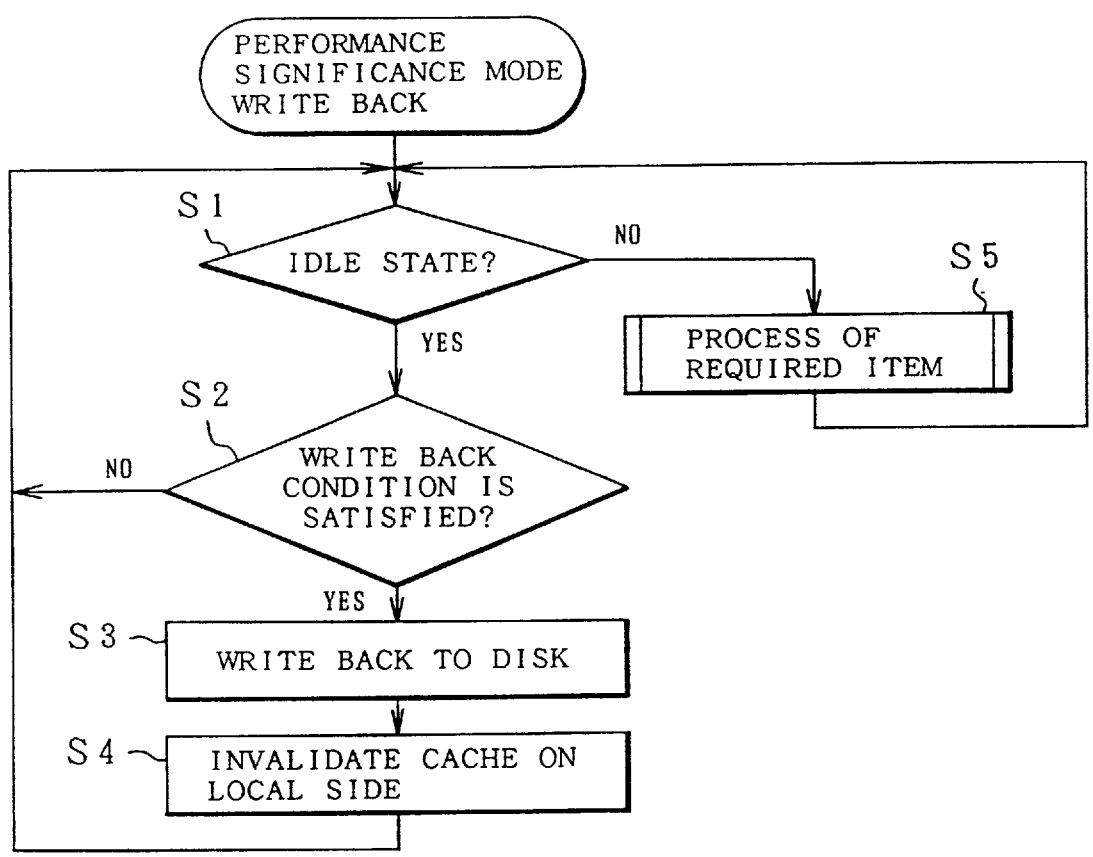
FIG. 16 is a flowchart showing a write back process in the performance significance mode in FIG. 10.

A flowchart of FIG. 16 shows a write back process in the performance significance mode. In the write back process, when the idle state is judged in step S1, a check is made in step S2 to see if the write back conditions are satisfied or not. If the write back has been scheduled and the write back conditions are satisfied, step S5 follows. As shown in (3) in FIG. 18, the write back target data is read out from the non-volatile cache memory 48-1 on the local side and is written into the disk unit 30. Subsequently, in step S4, the cache invalidation to delete the cache blocks after completion of the write back from the cache management table is executed.

[Cache Control in Average Mode]

It is necessary to use the non-volatile cache memories for the cache memories of the systems which are used in the average mode. The average mode is a mixture type in which the reliability significance mode and the performance significance mode mixedly exist. Schematically explaining, the staging at the time of mis-hit for the read request is only executed to the cache memory on the local side in a manner similar to the case of the performance significance type. The write data for the write request is written into both of the cache memories on the local and remote sides, thereby accomplishing the double data in which the same data is stored into the cache memories. This point is substantially the same as that in the performance significance mode. In such a cache control in the average mode as a mixture type of the reliability significance mode and the performance significance mode, in an environment such that the number of write requests which are generated is small and the number of read requests which are generated is large, the capacity of the cache memory is doubled because two cache memories are provided in a manner similar to the performance significance mode. On the other hand, in an environment such that the number of write requests is large and the number of read requests is small, the data can be also assured even in the transmission of the data on one side in a manner similar to the case of the reliability significance mode.

Figure 19:
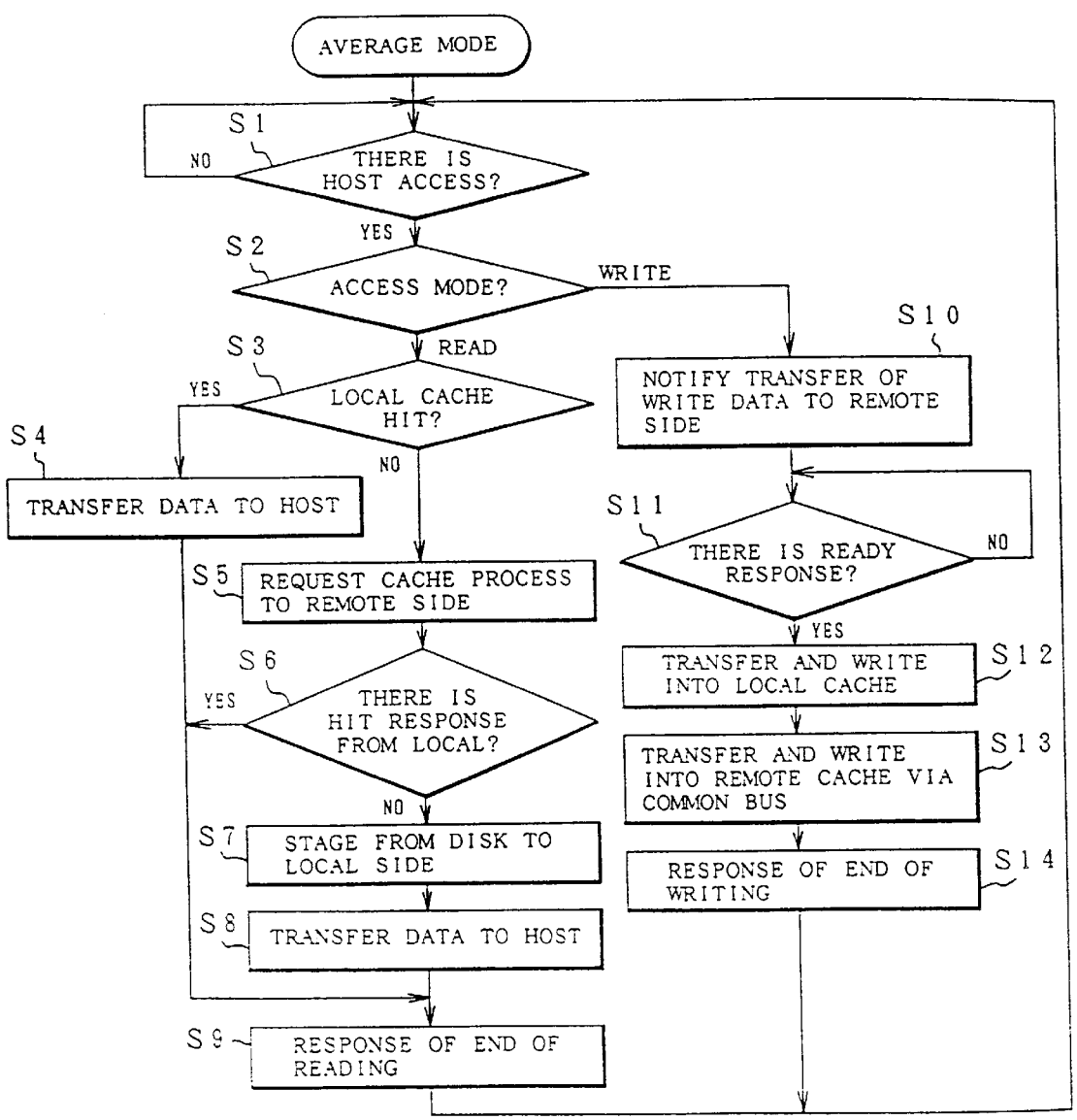
FIG. 19 is a flowchart showing the processing operation in an average mode in FIG. 10.

A flowchart of FIG. 19 shows the processing operation in the average mode. First, in step S1, when there is an access request from the host computer 10, the access mode is judged in step S2. When there is a read request, a hit check is made in step S3 to see if the request data exists in the self cache memory 48-1, namely, the cache memory 48-1 on the local side or not. When the cache hit is obtained, the request data is read out and transferred to the host computer 10 in step S4. When a mis-hit occurs in the cache memory 48-1 on the local side, in step S5, the cache process is requested to the controller 12-2 on the remote side via the common bus 18. A response indicative of the cache hit in the cache memory 48-2 on the remote side and the address of the request data is derived from the controller 12-2 on the remote side which received the request for the cache process. By receiving such a response, the controller 12-1 on the local side reads out the request data from the cache memory 48-2 on the remote side and is transferred to the host computer in step S8. On the other hand, when receiving the response of the mis-hit from the remote side in step S6, the staging to the cache memory 48-1 on the local side is executed from the disk unit 30 in step S7. After that, the data is transferred to the host computer 10 in step S8. After completion of the above series of reading processes, a read end response is returned in step S9.

On the other hand, when the controller 12-2 on the local side judges the write request in step S2, the message is sent to the controller 12-2 on the remote side via the common bus in step S10, thereby notifying the transfer of the write data. By receiving such a notification, the controller 12-2 on the remote side updates the cache management table and assures a region to write the write data and returns a ready response to the local side. When there is the ready response from the remote side in step S10, the controller 12-1 on the local side transfers and writes the write data into the self cache memory 48-1, namely, into the cache memory 48-1 on the local side in step S12. In step S3, the write data is transferred and written into the cache memory on the remote side via the common bus. Finally, when the writing to the cache memories 48-1 and 48-21 on the local and remote sides is finished, a write end response is returned in step S12. By such writing processes, the same data is written in the cache memories 48-1 and 48-2 on the local and remote sides.

A flowchart of FIG. 20 shows a write back process in the average mode which is substantially the same as the write back process in the reliability significance mode shown in FIG. 12. That is, the write back process to write the dirty data in the cache memory 48-1 on the local side serving as a write back target into the disk unit 30 is performed. After the write back is finished, the cache invalidation to delete the data after completion of the write back from the cache memory 48-1 on the local side is performed. Further, the message is sent to the remote side by the common bus 18, thereby executing the cache invalidation to delete the data after completion of the write back in the cache memory 48-2 on the remote side.

[Cache Control of Disk Array]

Figure 21:
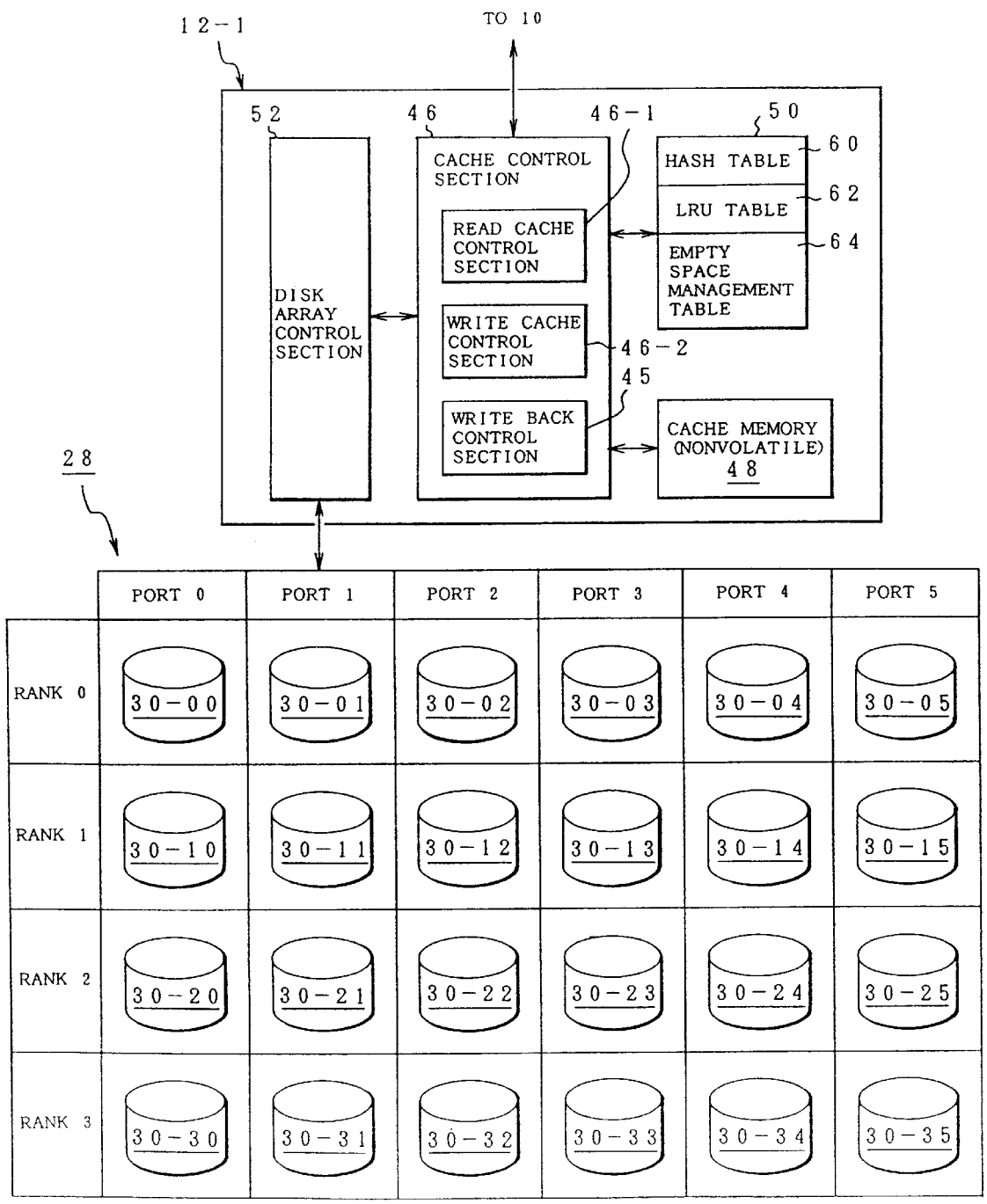
FIG. 21 is a block diagram showing a processing function of the invention in which a disk array is set to a target.

FIG. 21 shows a function of the cache control according to the present invention in which the disk array shown in FIG. 8 is set to a target. The controller 12-1 side in FIG. 8 is shown as a representative. The controller 12-1 is provided with the cache control section 46, the cache memory 48 using a non-volatile cache memory, a cache management table 50, and a disk array control section 52. Functions of a read cache control section 46-1, a write cache control section 46-2, and a write back control section 45 are provided in the cache control section 46. The cache management table 50 comprises a hash table 60, an LRU table 62, and an empty space management table 64. In the embodiment, the operating functions having forms of RAID0, RAID1, RAID3, and RAID5 have been prepared. The operation form of each RAID can be logically designated by an instruction from the host computer 10. The disk array 28 corresponds to the hardware construction shown in FIG. 8 and an arrangement in the vertical direction is called a rank and is shown by the rank numbers R0 to R3. An arrangement in the lateral direction is called a port and is shown by the port numbers P0 to P5.

Figure 22:
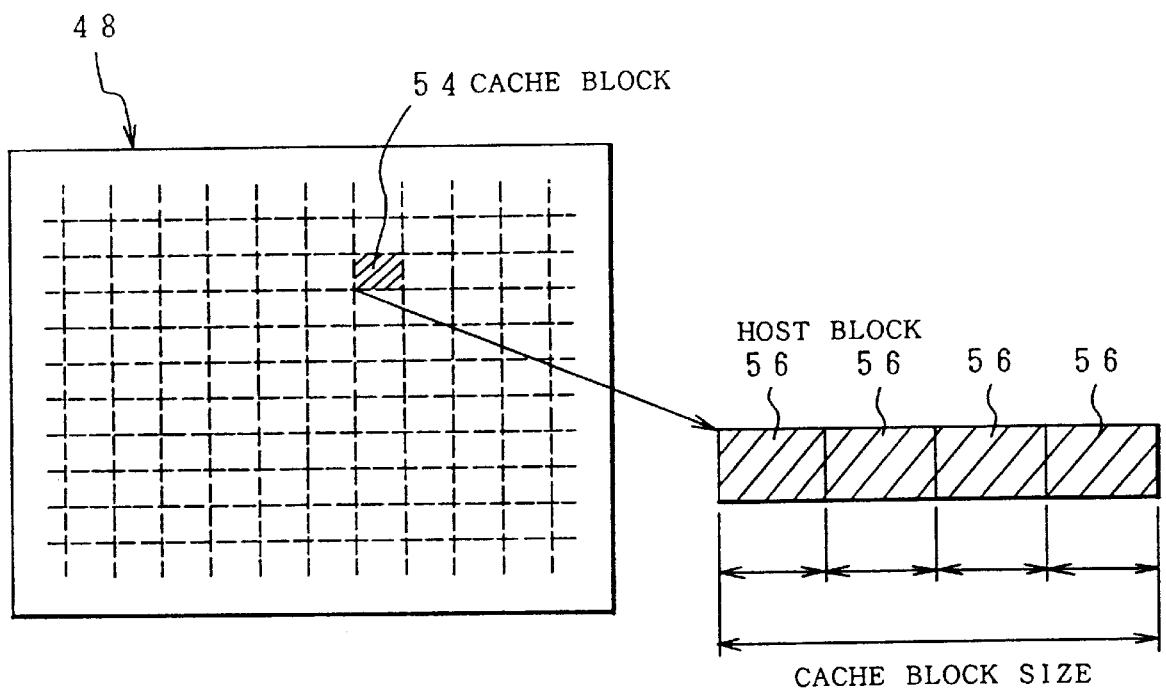
FIG. 22 is an explanatory diagram showing the relation between the block division of a cache memory and host blocks.

FIG. 22 shows a structure of the cache memory 48 in FIG. 21. The cache memory 48 is constructed by cache blocks 54 as a minimum unit of the data access. A size of cache block 54 is integer times as large as the size of host block (logical block) 56 as a minimum unit which is accessed by the host computer 10 as partially shown on the right side. FIG. 22 shows the case where the size of cache block 54 is set to a size that is four times as large as the size of host block 56. The size of cache block 54 is generally set on the system side and such a size setting is not performed by the user.

Figure 23:
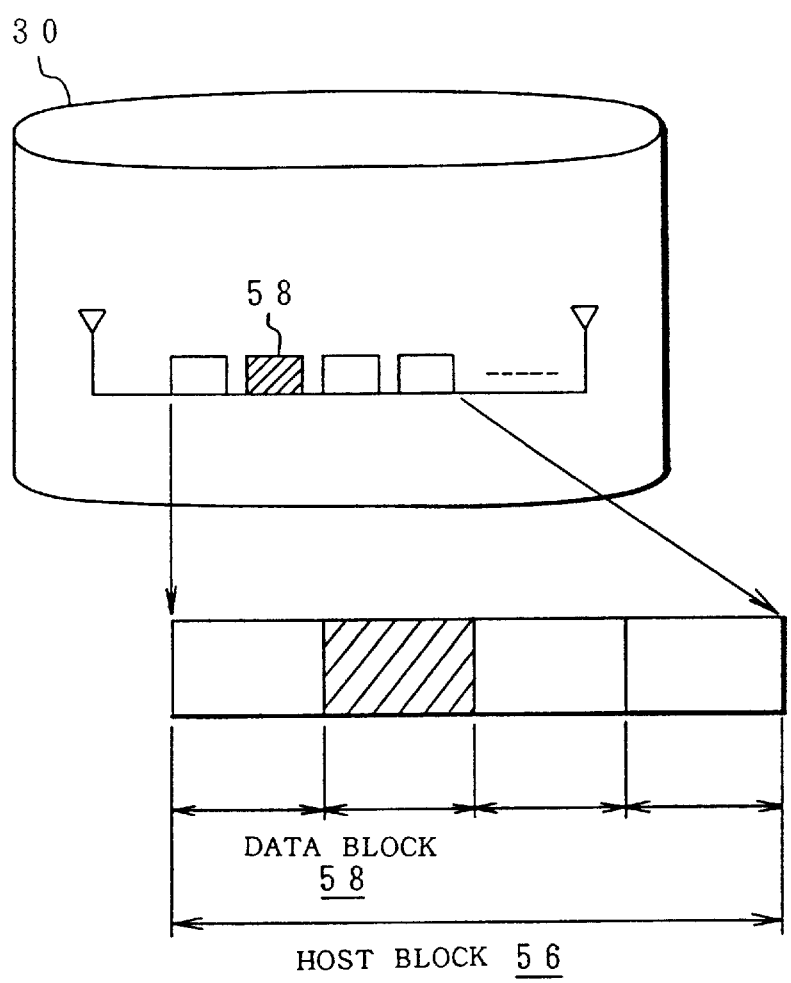
FIG. 23 is an explanatory diagram showing the relation between the host block and the data block.

FIG. 23 shows the relation with the host block to the data block in the disk unit 30. The disk unit 30 in the disk array system uses a format of a fixed length block architecture. A count key data architecture (CKD) in which a decoding length is variable is not used because the striping of data and the formation of a parity are complicated. A fixed length data block 58 constructing each sector sandwiched by indices on both sides shown in the disk unit 30 is ordinarily constructed by 512 bytes. A size of host block 56 is integer times as long as the fixed length data block 58 of the disk unit 30. In this example, since the size of host block 56 is four times as large as the data block 58, it is constructed by 2,048 bytes.

Figure 24:
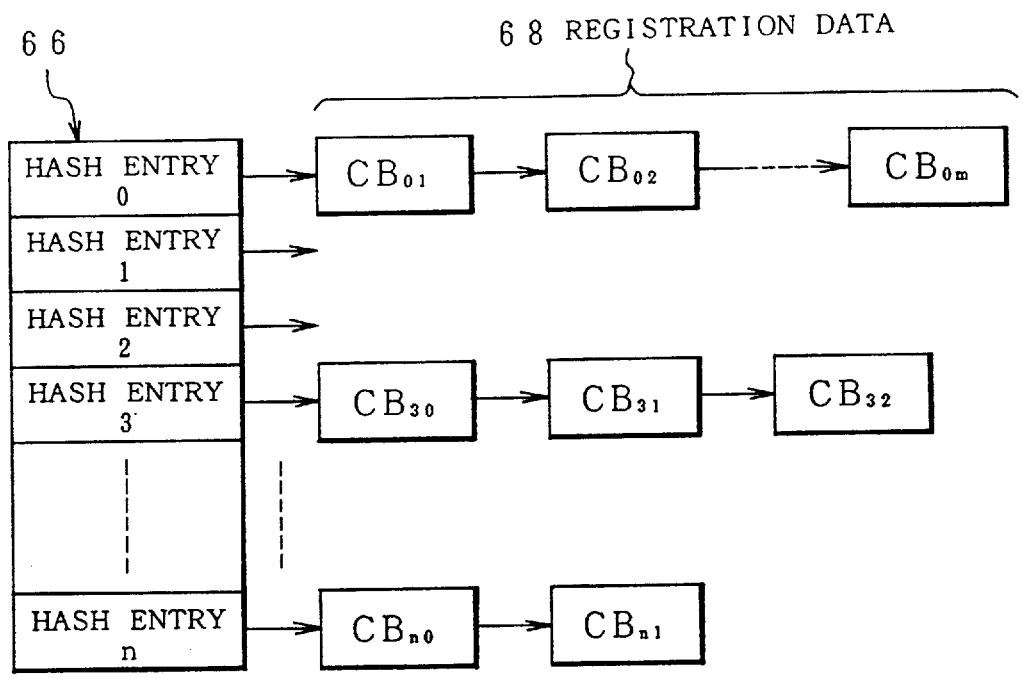
FIG. 24 is an explanatory diagram of a hash table in FIG. 21.

FIG. 24 shows a structure of the hash table 60 provided in the cache management table 50 in FIG. 21. The hash table 60 is constructed by a hash entry 66 and registration data 78 which is designated by the hash entry. The hash entry 66 is designated by an entry value (hash address) in which device information derived by an access request from the host computer 10 is calculated as a hash parameter. A registering state of a cache block $CB_{nm}$ existing on the cache memory has been registered as registration data 78 in the designated hash entry as shown in the diagram. The hash table 60 is mainly used for a judgment regarding whether the host block requested from the host computer exists in the cache memory or not, that is, a judgment about hit/mis-hit.

Figure 25:
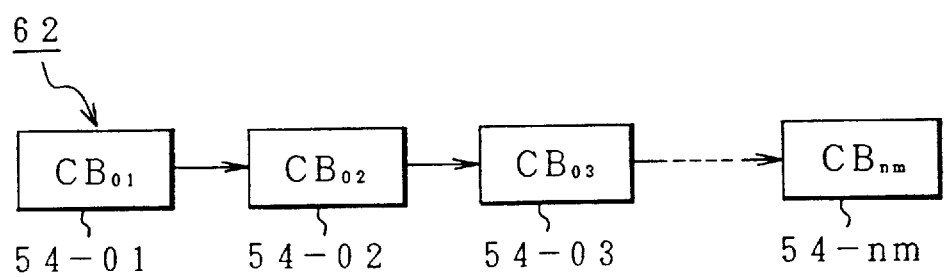
FIG. 25 is an explanatory diagram of an LRU table in FIG. 21.

FIG. 25 shows the LRU table 62 provided in the cache management table 50 in FIG. 21. In the LRU table 62, the cache blocks stored in the cache memory 48 are linked in accordance with the accessing order. For instance, when a new cache block is written, it is linked to the head of the LRU table 62 as a cache block used latest. Even in the case where an arbitrary cache block existing on the cache memory was read out in response to the read request, it is linked to the head of the LRU table 62 as a cache block used latest. Such an LRU table 62 is used in a write back control for sweeping out the data existing on the cache memory 48 and for writing the data on the cache memory into the disk unit. That is, since the cache block in which a time during which it exists on the cache memory 48 is longest and which is not accessed for a long time is linked to the end of the LRU table 62, the cache block which was linked lastly becomes a candidate of the cache block to be swept out next. In the case where the cache block as a candidate to be swept out is the dirty data which is not yet written into the disk unit, the write back process to write back to the disk unit is scheduled and the data is swept out after completion of the write back.

[Assurance of Cache Empty Space]

FIG. 26 shows an example of a use state of the cache blocks in the cache memory 48. In the cache memory 48, a cache block R indicates a block in which the same data has been stored in the disk unit by the write back. A cache block W denotes a block in which the dirty data exists such that, although the writing process was performed on the cache memory 48, the write back is not yet finished and the same data does not exist in the disk unit. The designation "empty" denotes a cache block which is not used. In the disk cache control, in the case where the read request or write request is instructed from the host computer 10 to the data which doesn't exist on the cache memory 48, a new cache block is allocated from a space that is not used. The data which was staged from the disk unit 30 in response to the read request or the write data received from the host computer is written.

Figure 27:
FIG. 27 is an explanatory diagram of an empty space management table in FIG. 21.

A space of the unused empty cache block in the cache memory 48 is managed by the empty space management table 64 shown in FIG. 27. In the empty space management table 64, the number of empty cache blocks is set to entry numbers 1, 2, 3, . . . , N and the block information of the head of the empty block which continues every entry number is registered. The table contents are shown for convenience of explanation and are not actually provided.

In FIG. 26, an address in the X direction in the cache block 48 is expressed by X=00 to 07 and an address in the Y direction is expressed by Y=00 to n. An address of the head block in the empty space management table 64 is shown by "CBXY". For example, two empty blocks of block addresses CB0103 and CB0004 in the cache memory 48 in FIG. 26 have been registered in the entry number 1 indicating that the number of empty blocks in the empty space management table 64 is equal to 1. With respect to the entry No. 2 indicative of two empty blocks, an address CB0102 of the head block in which two empty blocks continue has been registered. By providing such an empty space management table 64, cache blocks which are physically continuous for as long as possible are allocated to a request to allocate a new cache block.

Further, an empty space in the cache memory 48 which is managed by the empty space management table 64 is managed so that a predetermined amount of capacity always remains. That is, when a situation such that a remaining capacity of the empty space in the cache memory 48 is equal to or less than a specified value, a scheduling to sweep out the effective data on the cache memory is executed with reference to the LRU table 62 shown in FIG. 25. With respect to the cache block as a target to be swept out, the cache invalidation to delete the registration from the hash table 60 shown in FIG. 24 is performed to the portion of the cache block R in which the same data also exists in the disk unit. On the other hand, with respect to the portion of the cache block W of the dirty data in which no data exists in the disk unit, the write back to the disk unit is scheduled. By the process to keep the remaining capacity of the cache memory 48 to a value that is equal to or larger than the specified value, a specific empty space is always prepared on the cache memory. Therefore, in response to the read request or write request which is accompanied with the new data writing, the process can be immediately started.

[Control of RAID Operation Form]

Figure 28:
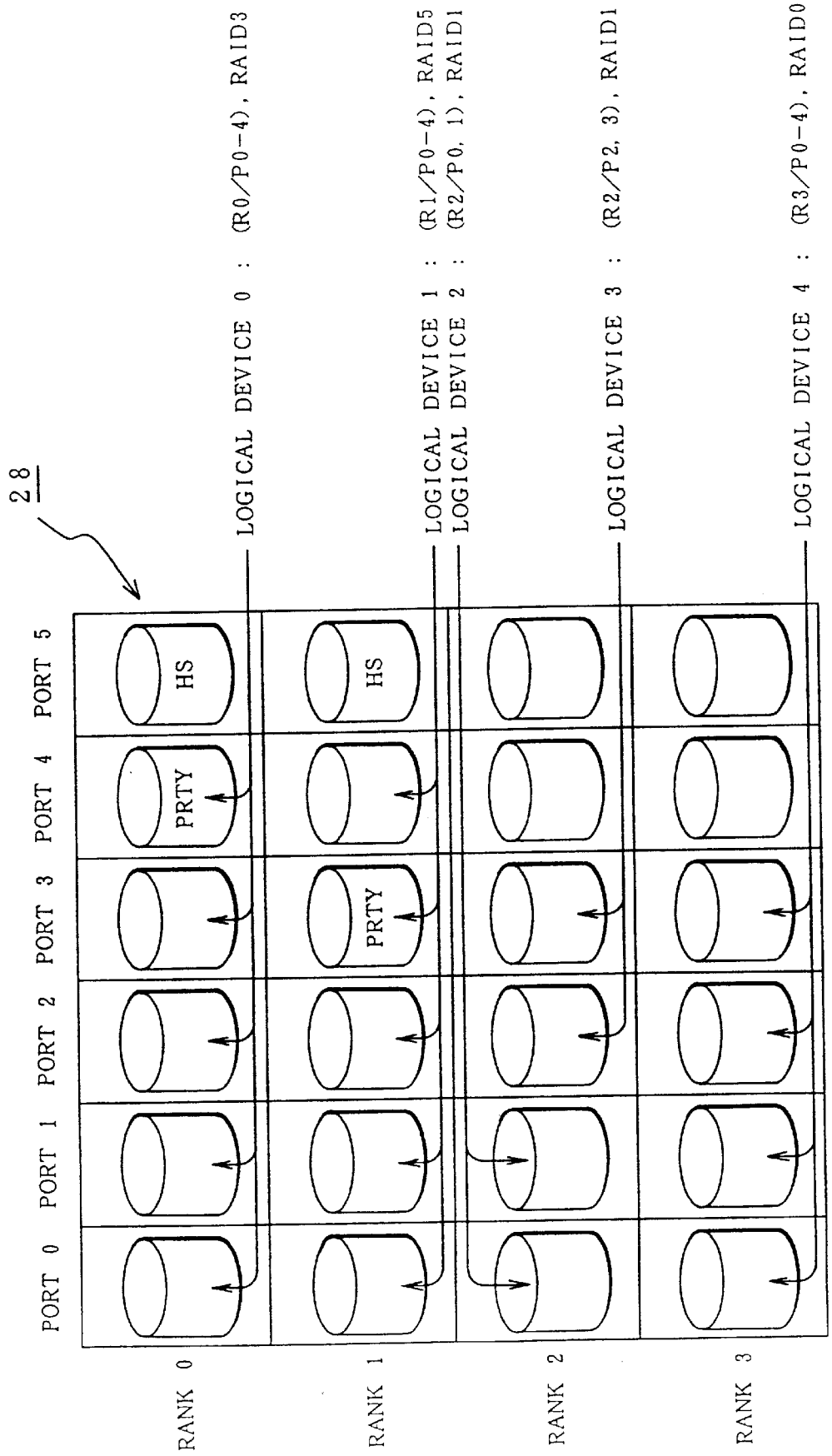
FIG. 28 is an explanatory diagram of logical devices showing a disk allocation of RAID0, RAID1, RAID3, and RAID5 for a disk array in FIG. 21.

The disk array control section 52 shown in FIG. 21 executes the accessing operation of the form of either one of RAID0, RAID1, RAID3, and RAID5 to the disk array 28 on the basis of the designation of the logical device from the host computer 10. FIG. 28 show the logical device numbers which are designated by the host computer for the disk array 28 in which the number of ranks is equal to 4 and the number of ports is equal to 6 and the forms of the disk units for the RAID operation. First, among the six disk units provided in the rank R0, five disk units of the ports P0 to P4 are designated by the logical device No. 0 in the host computer 10 and the operation form of RAID3 is obtained. Among those disk units, the disk units of the ports P0 to P3 are used for data and the disk unit of the port P4 is fixedly determined as a unit for parity. The disk unit of the port P5 at the rank R0 is allocated to a host spare HS provided as a spare unit. Five disk units of the ports P0 to P5 of the next rank R1 are designated by the logical device No. 1 in the host computer 10 and the operation form of RAID5 is obtained. In the operation form of RAID5, four disk units among the ports P0 to P4 are used as units for data and the remaining one disk unit is used as a unit for parity. The disk unit for parity is circulated each time the sector position is switched. The disk units which are provided for the ports P0 and P1 and the ports P2 and P3 of the rank R2 and in which two disk units are constructed as one set are respectively designated by the logical device Nos. 2 and 3 in the host computer 10. Those disk units have the operation form of RAID1, namely, the operation form as a mirror disk such that the same data has been stored in two disk units. Further, four disk units provided for the ports P0 to P3 of the rank R3 are designated by the logical device No. 4 in the host computer 10 and the operation form of RAID0 is obtained. That is, although the operation for striping the data and writing in parallel is substantially the same as the operation form of RAID3 of the logical device No. 0, the parity disk to assure a redundancy is not provided.

Figure 29:
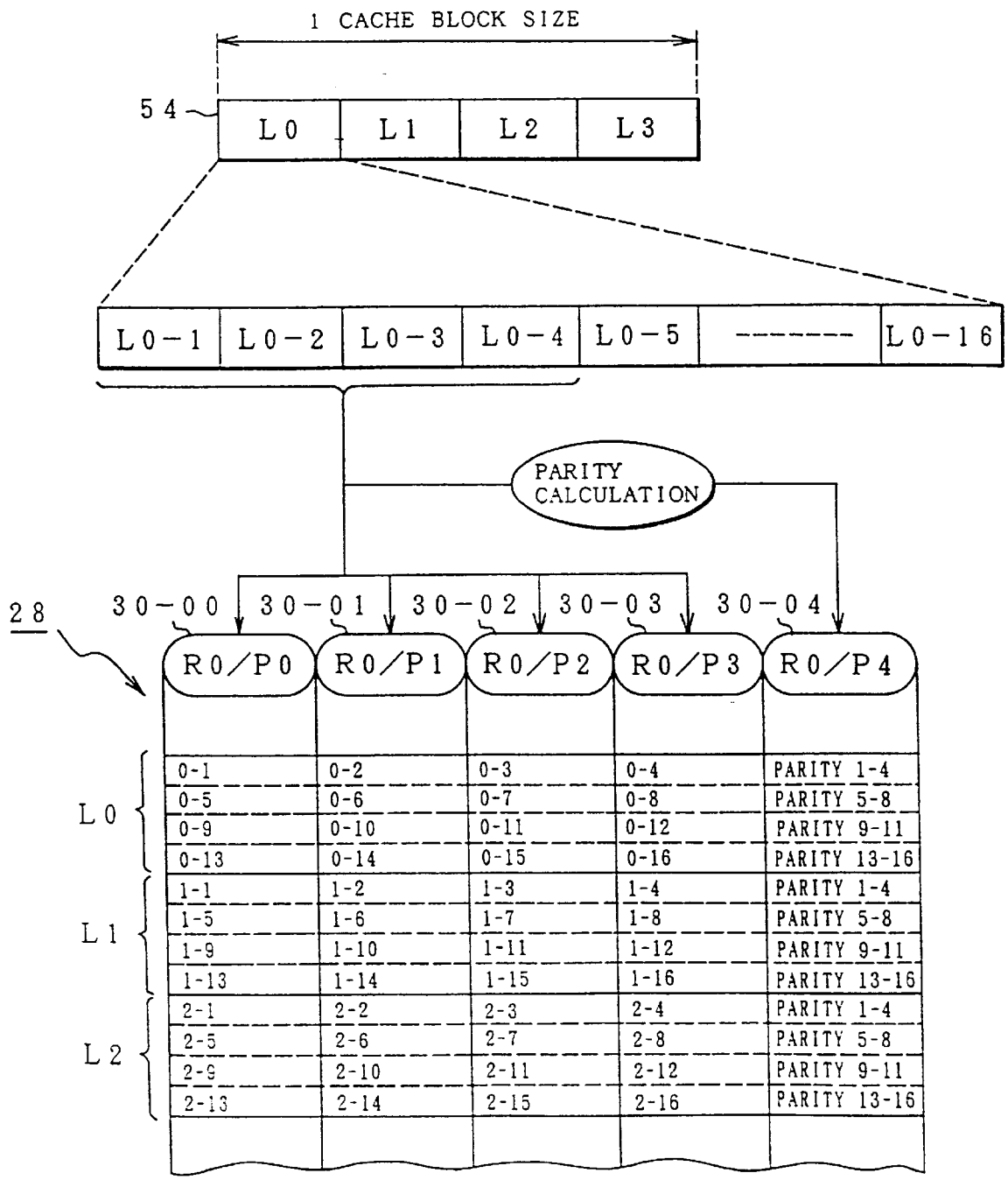
FIG. 29 is an explanatory diagram showing cache blocks, striping, and a disk storing state in RAID3.

FIG. 29 shows cache blocks, striping, and a disk storing state in the operation form of RAID3. First, the cache block 54 is constructed by four host blocks L0 to L3 in the example. In order to write the data into the disk units 30-00 to 30-04 in the operating mode of RAID3, for example, as partially shown with respect to the host block L0, it is striped into 16 byte data L0-1 to L0-16 which were divided so as to have a size of a predetermined number of fixed length data blocks. With respect to such striped data, a parity is calculated on a unit basis of the striped data as many as four disk units 30-00 to 30-03 for data. Five byte data in which the calculated parity was added to four striped data are written in parallel into five disk units 30-00 to 30-04.

Figure 30:
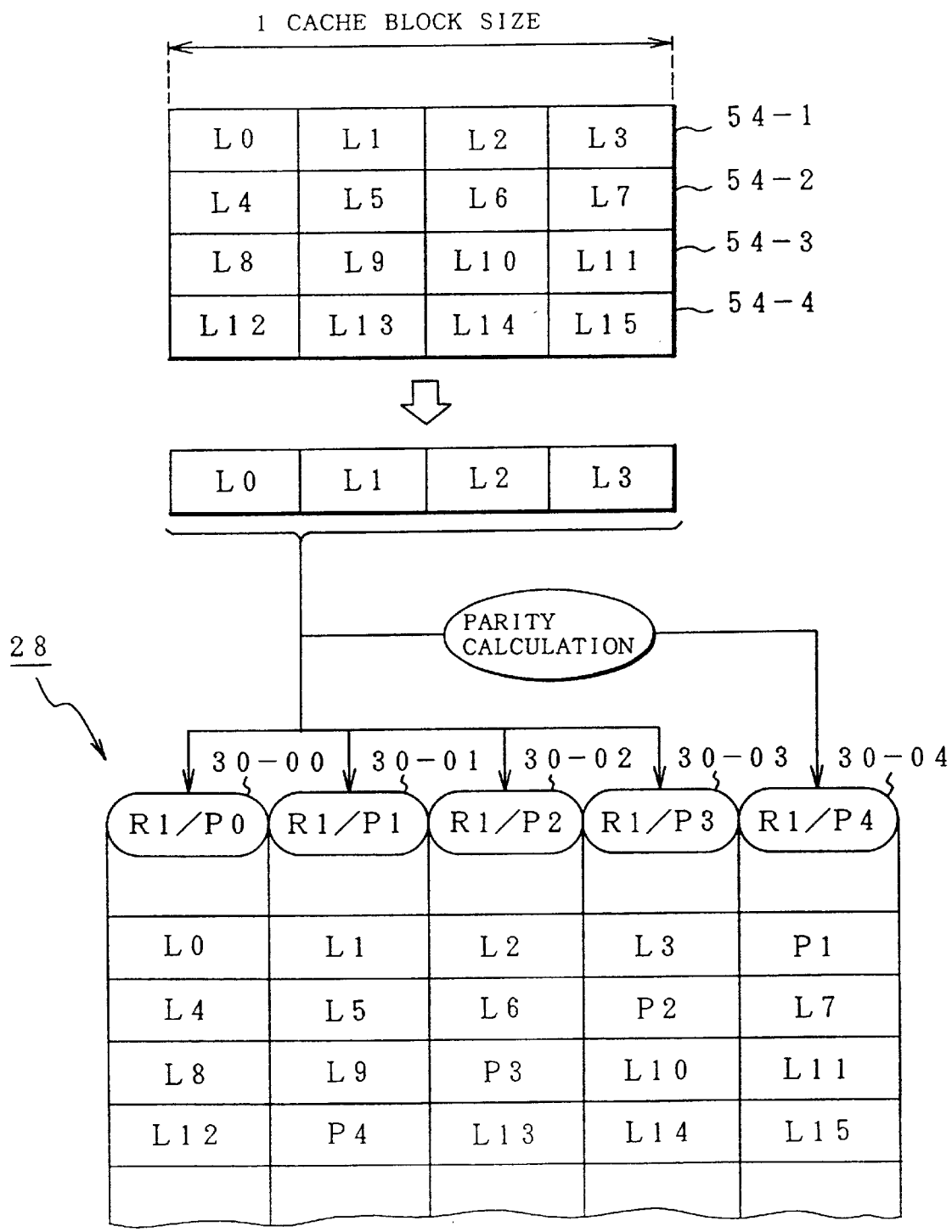
FIG. 30 is an explanatory diagram showing cache blocks, striping, and a disk storing state in RAID5.

FIG. 30 shows cache blocks, data striping, and a disk array storing state in the operation form of RAID5. In the example, for simplicity of explanation, the size of cache block is made coincident with the number of host blocks which are written in parallel in the disk array 28. Devices into which data can be written in parallel, namely, cache blocks 54-1 to 54-4 each having the size that is four times as large as the host block corresponding to the four disk units 30-00 to 30-03 are provided on the cache memory 48. It is now assumed that continuous host blocks L0 to L15 have been stored in the cache blocks 54-1 to 54-4 which are continuous as shown in the diagram. In such a case, for example, the cache block 54-1 is taken out, a parity is calculated from four host blocks L0 to L3 constructing the cache block 54-1, and five data in which the parity P1 was added to the host blocks L0 to L3 are written in parallel into the disk units 30-00 to 30-04. Generally, in the operation form of RAID5, the access is executed on a unit basis of one host block having a short data length. As for the writing in the ORDINARY operation form of RAID5, for example, in case of newly writing only the logical block L0 in a state in which the host blocks L0 to L3 and the parity P1 have been stored on the disk array 28 side as shown in the diagram, the following read modification writing operation is executed.

First, the old block L0 and the old parity P1 are read out by the disk units 30-00 and 30-04 and assume (L0)old and (P1)old. Subsequently, an intermediate parity (P1)int assumes p1 (P1)int=(P1)old+(L0)old and the exclusive OR is obtained. Subsequently, a new parity (P1)new is obtained from the intermediate parity (P1)int and a new block (L0)new as follows.

(P1)new=(P1)int+(L1)new

The new block (L0)new and the parity (P1)new obtained by the calculation are written in parallel into the disk units 30-00 and 30-04.

The writing operation of the host blocks as many as the number that is equal to or less than the number of disks into which data can be written in parallel in the operation form of RAID5 is accompanied with the reading operation of the old parity and old data. Therefore, it takes a processing time corresponding to the rotation of 2.5 times of the disk and such a drawback results in a write penalty. According to the invention, even in the operation form of RAID5, the write access to the disk array by the operation form of RAID3 is executed as much as possible, thereby reducing the write penalty.

Figure 31:
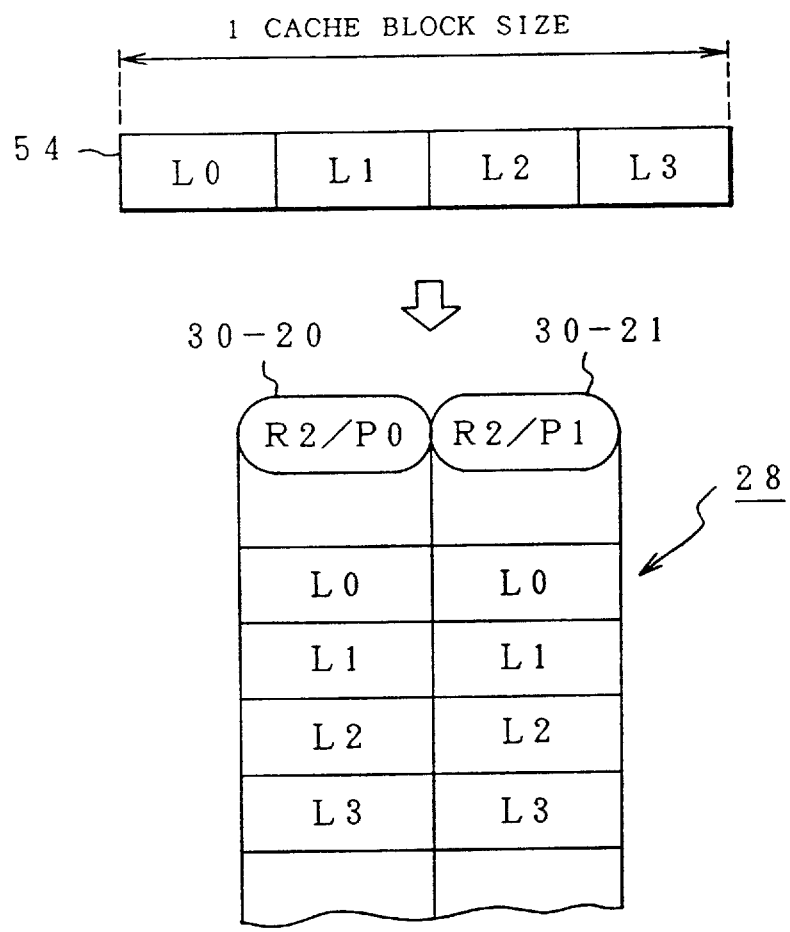
FIG. 31 is an explanatory diagram showing cache blocks and a disk storing state in RAID1.

FIG. 31 shows cache blocks and a disk storing state in the operation form of RAID1. RAID1 relates to a disk array that is used as a mirror disk in which the same data is written into two disk units 30-20 and 30-21. That is, the data is sequentially taken out from the cache block 54 every host blocks L0 to L3 and is written in parallel into the disk units 30-20 and 30-21.

Figure 32:
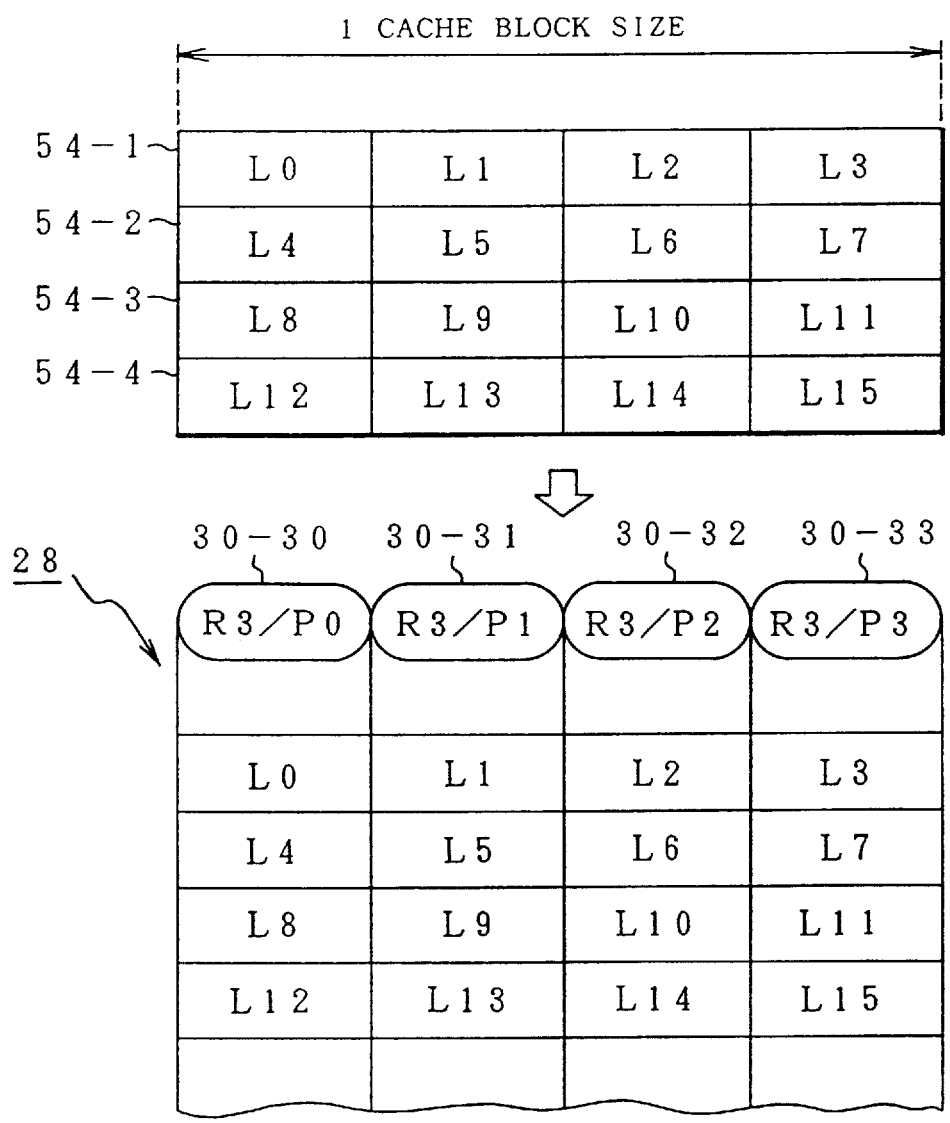
FIG. 32 is an explanatory diagram showing cache blocks and a disk storing state in RAID0.

FIG. 32 shows cache blocks, striping, and a disk storing state In the operation form of RAID0 having no parity disk. In a manner similar to the case of RAID5 of FIG. 30, for simplicity of explanation, the diagram shows the case as an example where the size of cache block is set to the size which coincides with the size of four logical blocks which are written in parallel into the four disk units 30-30 to 30-34. In the operation form of RAID0, four host blocks L0 to L3 constructing the cache block 54 are allocated to the four disk units 30-30 to 30-34 and are written in parallel. In this case, since there is no parity disk, a parity calculation is not performed.

[Realization of High Speed of Staging Process]

In the disk cache control, in the case where no request data exists on the cache memory 48 and a mis-hit occurs for the read request from the host computer 10, the staging such that the request data is read out from the disk unit and written into the cache memory is executed. In the invention, in any one of the operation forms of RAID0, RAID1, RAID3, and RAID5, the staging for the cache block of the request data is performed at a high speed by the staging by the parallel reading operations from all of the disk units which can be simultaneously accessed in the disk array 28.

Figure 33:
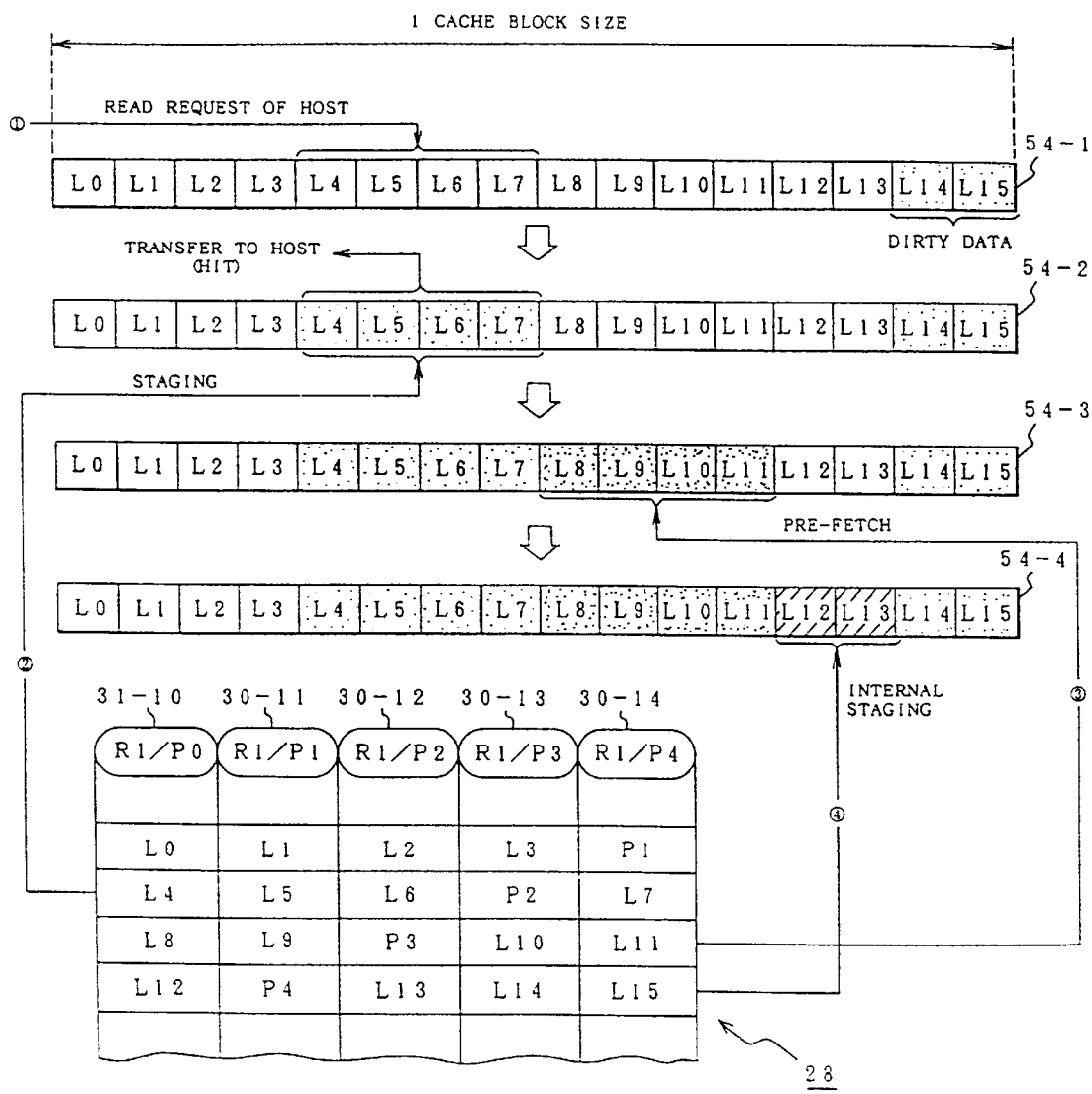
FIG. 33 is an explanatory diagram showing the prefetching operation in association with a staging process.

FIG. 33 shows the staging of the invention in the operation form of RAID5 as an example. It is now assumed that the cache block 54-1 having the size of 16 host blocks has been developed on the cache memory 48. Only the last two host blocks L14 and L15 in the cache block 54-1 are the effective data. It is assumed that the host blocks L14 and L15 are the dirty data which is not yet written into the disk unit. It is also assumed that the read request (1) which designated the logical blocks L4 to L7 was generated from the host computer 10. For the read request, since no request data exists on the cache memory, a mis-hit occurs and the staging is performed. In the staging, as shown in the cache block 54-2, four disk units 30-10 to 30-12 and 30-14 of the disk array 28 are accessed and the host blocks L4 to L7 are read and written into the cache block 54-2. After completion of the staging, a hit state is obtained. Therefore, the request data is transferred to the host computer 10. After such a staging was finished, in the invention, a prefetching operation is performed in order to improve a hit efficiency of the cache memory for the subsequent access request and to make the most of the cache effect. That is, as shown in the cache block 54-3, four host blocks L8 to L11 corresponding to four disks which can be accessed in parallel and subsequent to the host blocks L4 to L7 after completion of the staging are read out from the disk units 30-10, 30-11, 30-13, and 30-14 and prefetched. In RAID5, fundamentally, the read transfer speed is not equal to or higher than the device speed, the staging speed is slower than that in RAID3, and the reading process of a small amount of data is mainly executed. Therefore, a prefetch amount is set to a value of up to the next parity group. The parity group denotes data blocks of each disk unit in which the same parity disk is used. For example, the parity group denotes the data blocks L0 to L3, L4 to L7, etc. in FIG. 33(E). As mentioned above, in RAID5, the prefetch amount is up to the next parity group. However, when the striping is executed so as to make the cache block size coincide with the data block size of the parity group, namely, when the striping shown in FIG. 30 is executed, the data blocks of up to the last block in the cache block subsequent to the data block which was staged into the cache block is set to a prefetch amount. Such a prefetch is included in the staging and the staging like RAID3 can be performed.

On the other hand, in RAID3, as shown in FIG. 29, one host block is distributed and stored to each disk unit. In consideration of a point that the staging can be executed at a high speed and a large amount of data is often required, the data blocks of up to the last block of the cache block including the staging data to which the access was requested are prefetched.

Referring again to FIG. 33, even in a state in which the blocks L8 to L11 subsequent to the staged host blocks L4 to L7 shown in the cache block 54-3 were prefetched, the effective data on the cache block is distributed to two locations. In the case where the effective data on the cache block has been distributed in such a state after the prefetch in association with the staging, as shown in the cache block 54-4, the data blocks corresponding to the host blocks L12 and L13 are read out from the disk units 30-12 and 30-13 of the disk array 28 and internally staged, thereby setting the effective data to the continuous data on the cache block. By setting the effective data on the cache block to the continuous data, the subsequent data management on the cache block can be easily performed. For instance, assuming that the effective data has been distributed to a plurality of locations and exist on the cache block, a map management corresponding to each of the distributed host blocks is finally required. On the other hand, in the write back process when a part of the effective data was written back by setting the continuous region on the cache block to the effective data, the high speed by the parallel writing like RAID3 can be realized.

[Promotion to Sweep Out a Large Amount of Sequential Data]

In the cache control, generally, when the same data on the cache memory 48 is frequently read out, the cache effect can be utilized. On the other hand, when the host computer 10 requests to read out a large amount of data which does not exist on the cache memory 48, the large amount of requested data is staged from the disk array 28 into the cache memory 48 in association with a mis-hit and is transferred to the host computer 10. If such a large amount of data which was staged remains as it is on the cache memory 48 after that in spite of the fact that it is not referred, the cache space is not effectively used and a hit efficiency deteriorates. However, in the management of the cache memory 48 using the LRU table 62, even a large amount of data which was referred only once cannot be immediately invalidated. Therefore, in the disk cache apparatus of the invention, in the case where a large amount of data was staged in response to the read request to read out the data exceeding a predetermined amount from the host computer 10, although the cache block which was staged should inherently be registered to the head of the LRU table 62, the cache block of the large amount of staged data is registered to a position near the end side of the LRU table 62.

Figure 35:
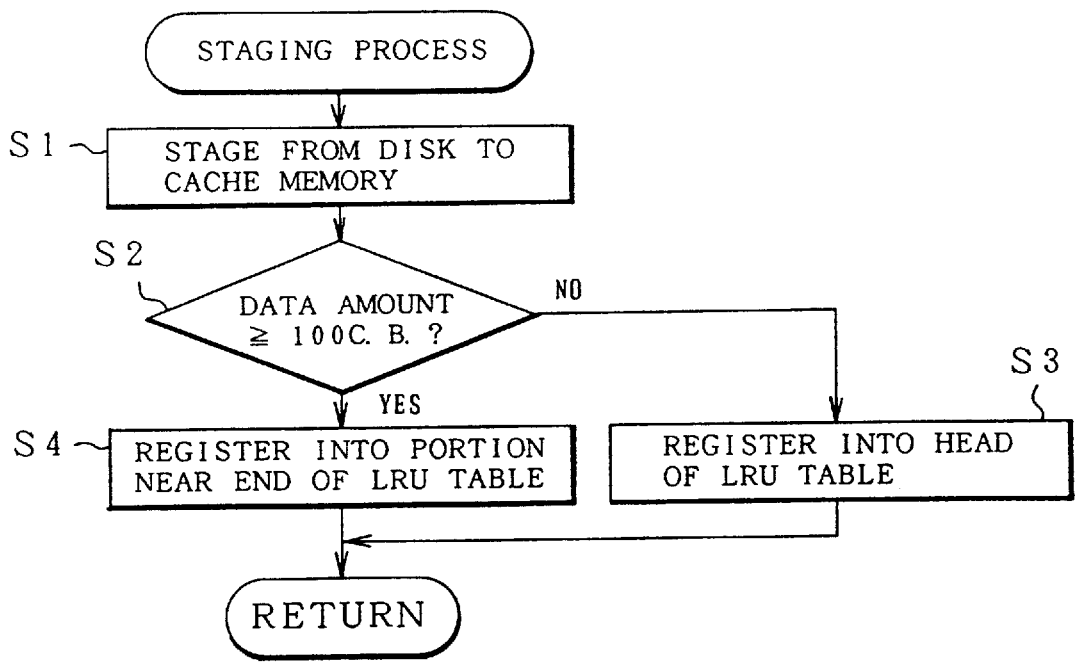
FIG. 35 is a flowchart showing a staging process of a large amount of sequential data.

A flowchart of FIG. 35 shows a staging process of a large amount of data. First, in step S1, if the staging from the disk array 28 side was performed due to the mis-hit in association with the read request from the host computer 10, a check is made in step S2 to see if an amount of staged data is equal to or larger than a predetermined value, for example, 100 cache blocks or not. If it is less than 100 cache blocks, the data is registered to the head of the LRU table 62 in step S3 in a manner similar to the ordinary method. On the other hand, when the data amount is equal to or larger than 100 cache blocks, the data is registered to a position near the end side of the LRU table 62 in step S4. By forcedly registering such a large amount of staged data to the end side of the LRU table 62, the large amount of staged data which was referred to only once is deleted and swept out from the hash table 60 after the elapse of a relatively short time. It is consequently possible to prevent the cache space from being unnecessarily occupied.

[Staging of Parity Data]

In the operating state of RAID5 in the disk cache apparatus of the invention, the parity data is not staged into the cache memory 48 in principle. In the operating state of RAID5, however, when writing to the disk array, a process to read out the old data and old parity from the disk array 28 is necessary to calculate the new parity. Therefore, the apparatus has a penalty such that a processing time is long. In another embodiment of the staging process of the invention, accordingly, parity data can be staged by an optional designation.

Figure 36:
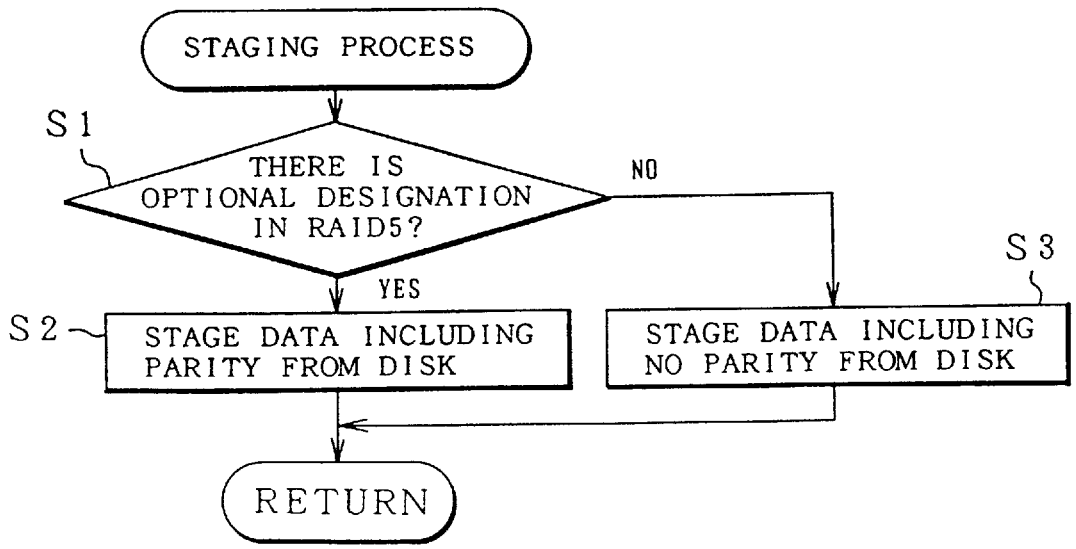
FIG. 36 is a flowchart showing a staging process including a parity.

A flowchart of FIG. 36 shows another embodiment of the staging process of the invention which enables the parity data to be staged. According to the staging process, when the staging process is activated by the mis-hit of the cache memory 48 for the read request from the host computer 10, first, in step S1, a check is made to see if the operation form is set to RAID5 and the staging of the parity data has been optionally designated or not. The optional designation to stage the parity data is set by a command from the host computer 10 or an instruction from a maintenance terminal. In step S1, when the optional designation indicative of the staging of the parity data is effective, step S2 follows and the data including the parity data is staged from the disk array 28 into the cache memory 48. When there is no optional designation in step S1, step S3 follows and the ordinary staging from the disk array 28 of the data including no parity is executed.

Figure 37A:
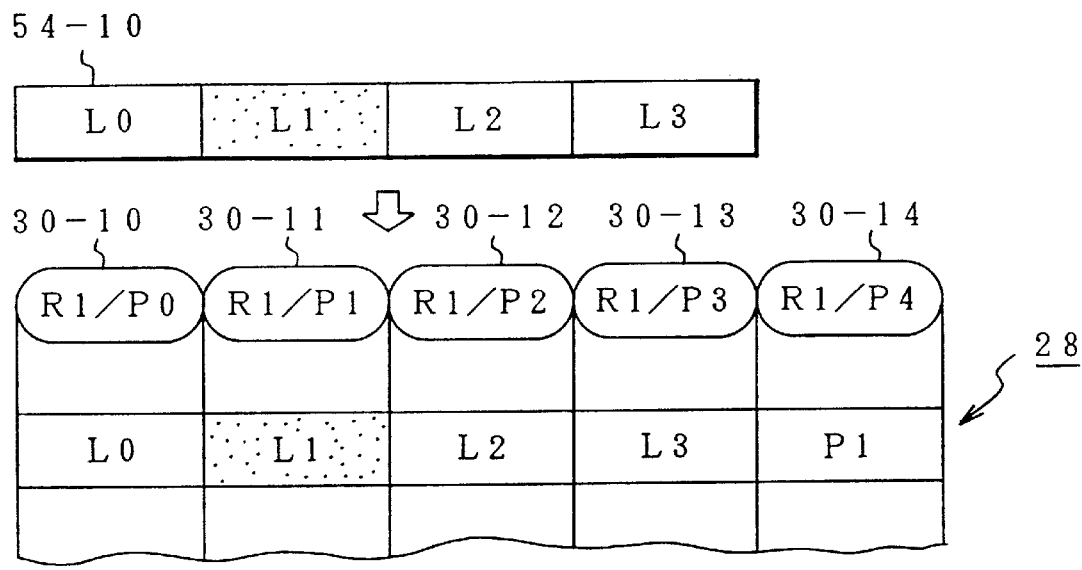
FIGS. 37A and 37B are explanatory diagrams showing a difference between the write back processes corresponding to the staging in the case where a parity is included and the case where no parity is included.

FIG. 37A shows the case where the parity data is not staged. It is now assumed that only the host block L1 of the cache block 54-10 is the effective data. In the case where the host block L1 as effective data of the cache block 54-10 is written back to the disk array 28, as shown in the disk writing in RAID5 in FIG. 30, it is necessary to execute processes such that the corresponding old data is read out from the disk unit 30-11, the old parity is read out from the disk unit 30-14, a new parity is formed from the new data after an intermediate parity was formed, and the new data and new parity are finally written to the disk units 30-11 and 30-14. Therefore, in order to write the effective block L1 on the cache block 54-10 is written to the disk array 28, a time corresponding to the rotation of 2.5 times of the disk unit is needed.

Figure 37B:
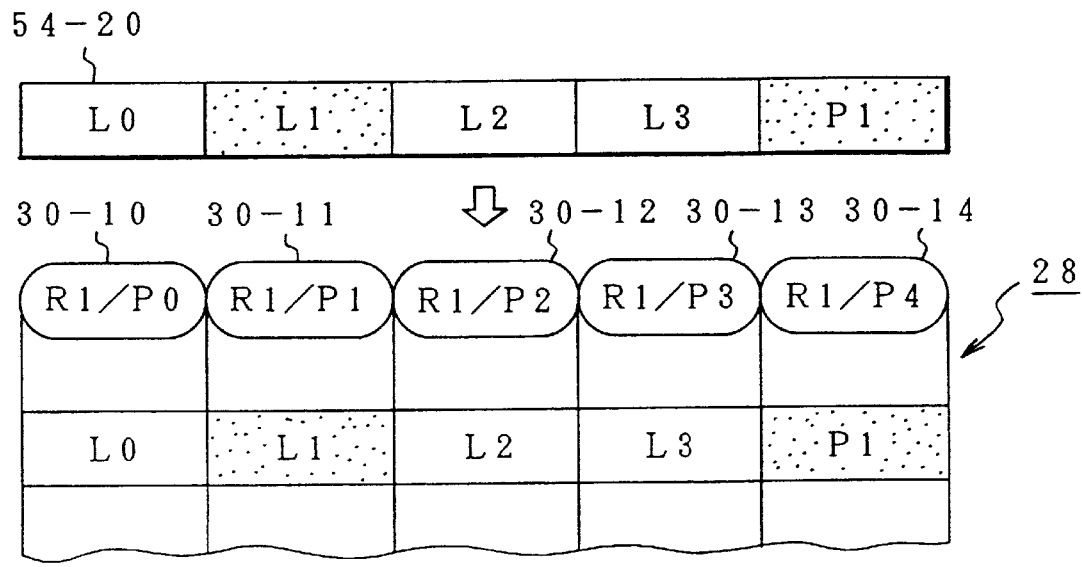

On the other hand, in the case where the parity data P1 has been staged into the cache block 54-10 as shown in FIG. 37B, at the time of updating of the effective block L1, new parity data P1 can be calculated on the cache block 54-20. The updating block L1 and new parity data P1 can be directly written into the disk unit 30-11 and 30-14 without reading and accessing the disk array 28 side. Therefore, only a time corresponding to the rotation of 1.5 times of the disk unit is required for the write back process. A write penalty in the ordinary disk writing process of RAID5 does not occur. In the case where the parity data was staged into the cache memory 48, the effective use region in the cache memory 48 is reduced by only such a staged data amount.

[Optimization By Rearrangement of Write Back Data]

As described in the empty space management table 64 in FIG. 28, when the empty space in the cache memory 48 is equal to or less than a predetermined value, the write back process (to sweep out the cache block which is not used but has been stored for the longest period of time) is scheduled with reference to the LRU table 62 shown in FIG. 25.

Figure 38:
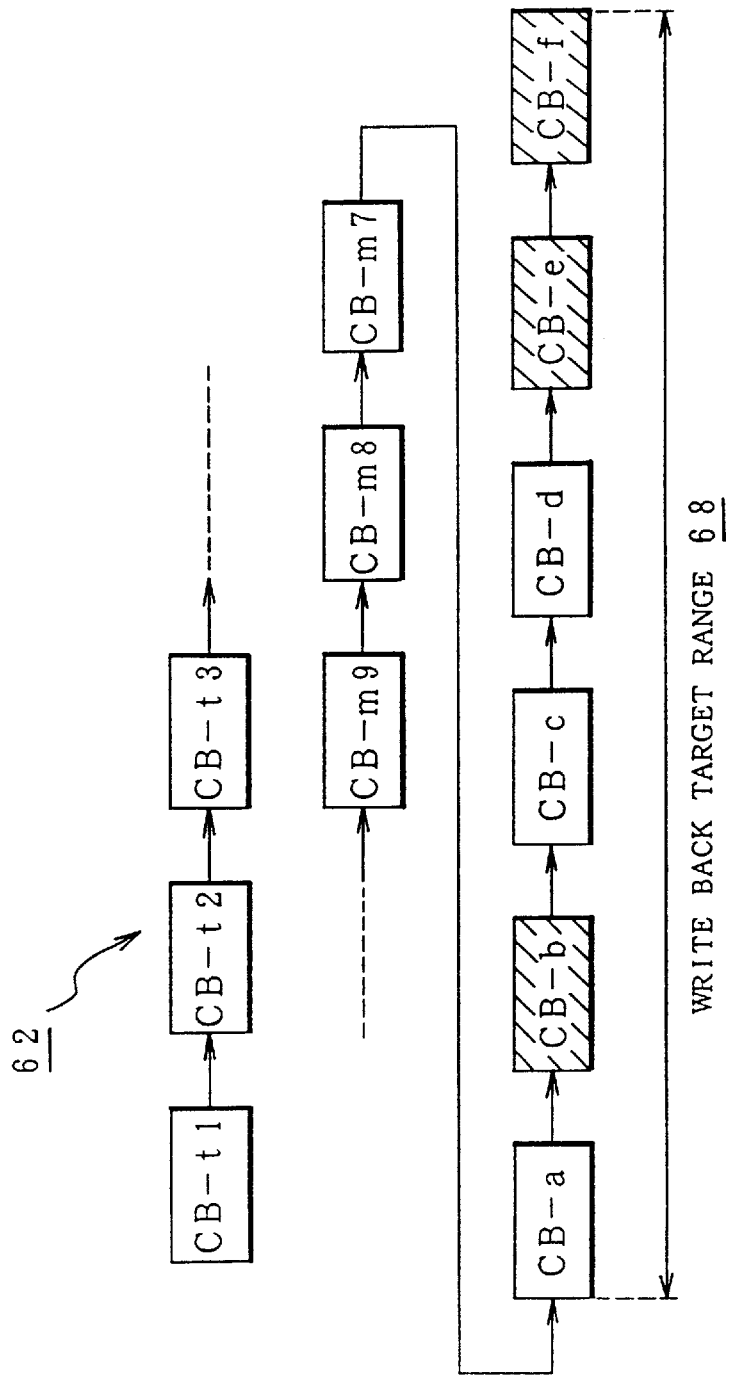
FIG. 38 is an explanatory diagram of a write back target range in an LRU table.
Figure 39:
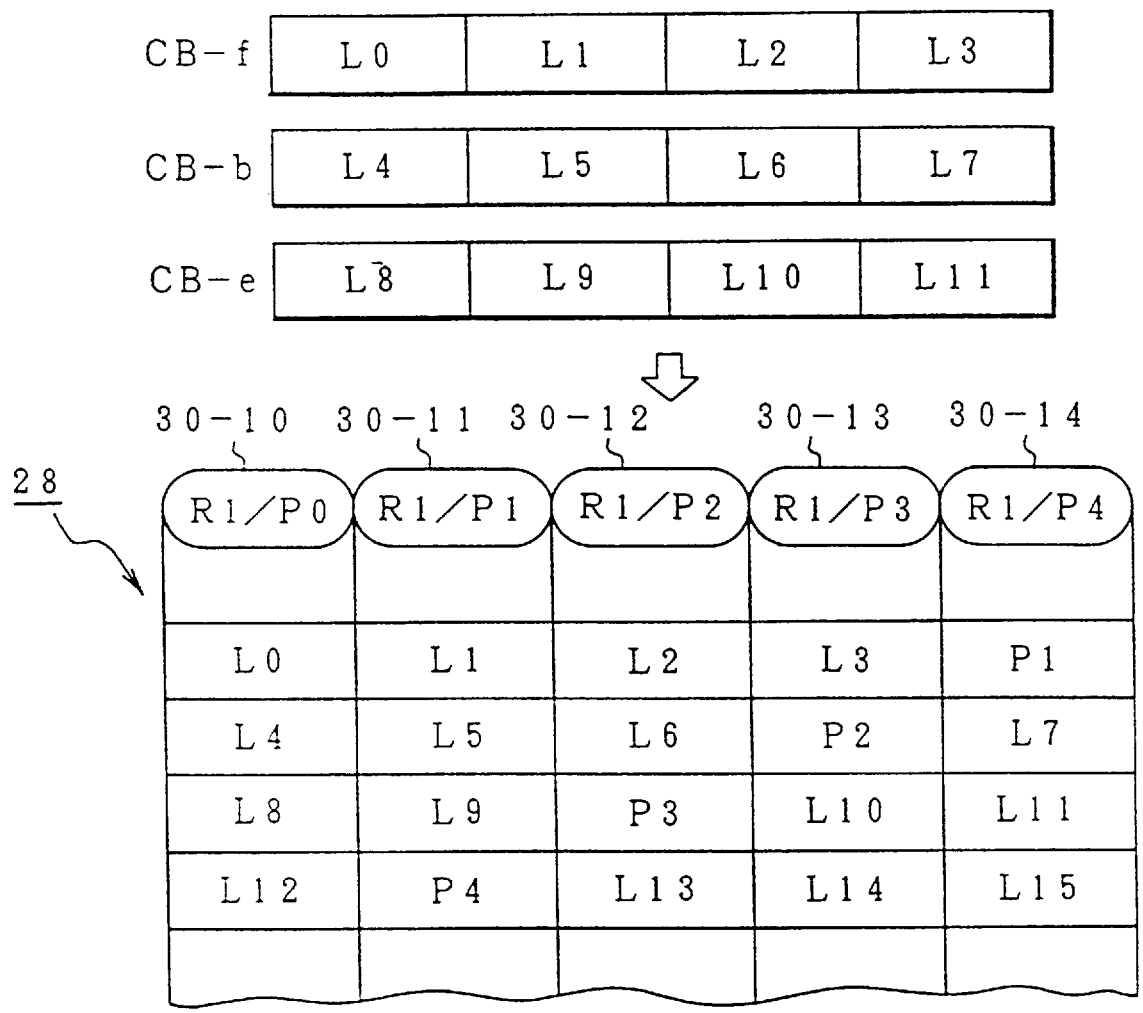
FIG. 39 is an explanatory diagram showing the cache block rearrangement in the write back target range and the write back operation.
Figure 40:
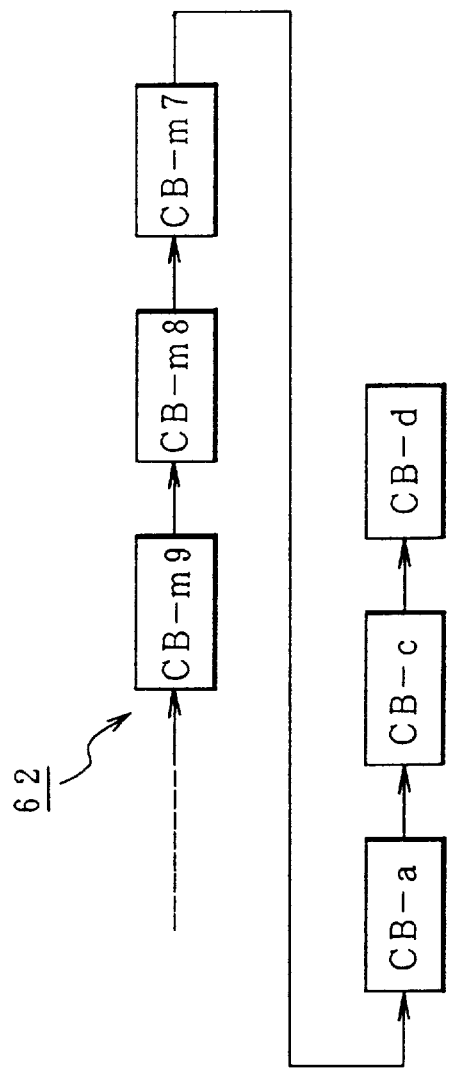
FIG. 40 is an explanatory diagram of the LRU table after completion of the write back.

FIG. 38 shows an example of the cache block 62 when the write back process is scheduled. In the ordinary cache control, the scheduling to set a cache block CB-f linked to the end of the LRU table 62 into a write back target is executed. On the other hand, in the cache control of the present invention, when the write back conditions are satisfied, namely, when the number of empty blocks in the cache memory 48 is equal to or less than a predetermined threshold value, the scheduling such that a range which is located forwardly from the last cache block of the LRU table 62 by only a predetermined number a of blocks is designated as a write back target range 68 is executed. In this case, a range is designated so that six cache blocks CB-a to CB-f are included in the write back target range 68. It is now assumed that three cache blocks CB-b, CB-e, and CB-f shown by hatched portions and included in the write back target range 68 include host blocks shown in FIG. 39. That is, it is now assumed that the cache block CB-b includes the corresponding data of the host blocks L4 to L7, the cache block CB-e includes the corresponding data of the host blocks L8 to L11, and the cache block CB-f includes the corresponding data of the host blocks L0 to L3. When seeing such host block corresponding data, by rearranging the cache blocks in accordance with the order of CB-f, CB-b, and CB-e, the corresponding data of the host blocks L0 to L11 can be set to the continuous data. In the case where the cache blocks included in the write back target range 68 in which the host block corresponding data is set to the continuous data were rearranged, when each cache block is written back to the disk array 28, the parallel writing operations like RAID3 can be executed at a high speed. That is, it is possible to accomplish the high speed write back process such that parities P1, P2, and P3 are calculated from each of the four logical block corresponding data included in the cache blocks CB-f, CB-b, and CB-e and four data and parities are continuously written in parallel into the disk units 30-11 to 30-14 of the disk array 28. After completion of the write back by the rearrangement such that the logical block corresponding data of the cache blocks included in such a write back target range 68 are continuous, the LRU table 62 shown in FIG. 38 is set into a state as shown in FIG. 40.

Figure 41:
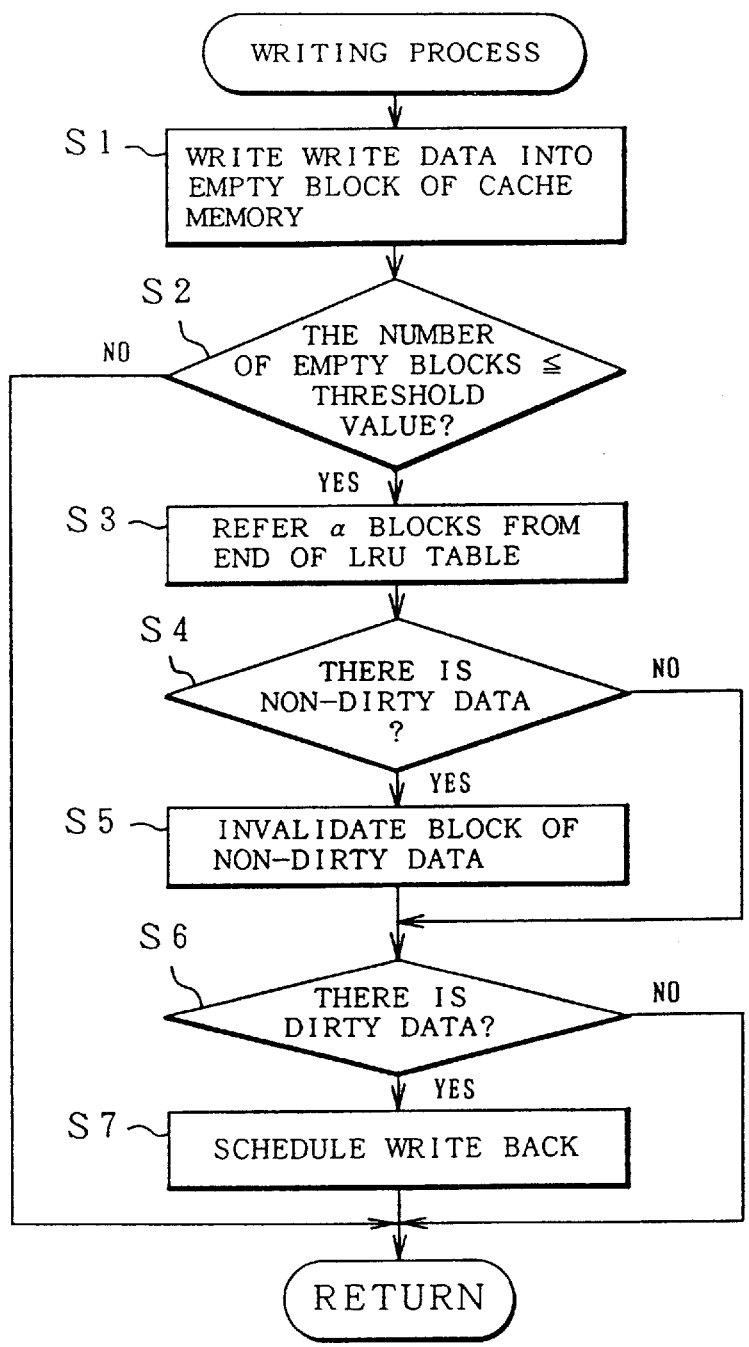
FIG. 41 is a flowchart showing the details of the writing process in FIG. 33.

A flowchart of FIG. 41 shows the writing process in which the scheduling of the write back accompanied with the rearrangement of the cache blocks is executed. FIG. 41 shows the details of the writing process shown in step S13 in FIG. 34. First, in step S1, in response to the write request from the host computer 10, the write data is written into eight blocks assured in the cache memory 48 by the write cache control section 46-2. After the write data was written, in step S2, the number of empty blocks in the cache memory 48 is obtained with reference to the empty space management table 64 shown in FIG. 28 and a check is made to see if the number of empty blocks is equal to or less than a predetermined threshold value or not. If it is equal to or less than the threshold value, step S3 follows and a range including the predetermined number a of blocks which was forwardly shifted from the end of the LRU table 62 is designated as a write back target range 68 as shown in FIG. 38. Subsequently, in step S4, a check is made to see if the cache blocks included in the write back target range 68 are dirty data as a write back target which is not yet written to the disk array 28 or non-dirty data which has already been written to the disk array 28 and is excluded from the write back target. If the cache blocks of the non-dirty data are included in the write back target range 68, in step S5, the cache blocks of the non-dirty data are deleted from the hash table 60 and the cache invalidation is executed. Subsequently, in step S6, a check is made to see if the cache blocks of the dirty data as a write back target exist or not. If the cache blocks of the dirty data exist, the write back is scheduled in step S7. In such a scheduling of the write back, as shown in FIGS. 38 and 39, with respect to, the cache blocks included in the write back target range 68, they are rearranged so that the data corresponding to the host blocks becomes the continuous data if possible and, after that, the write back is scheduled as a write back target.

Figure 34:
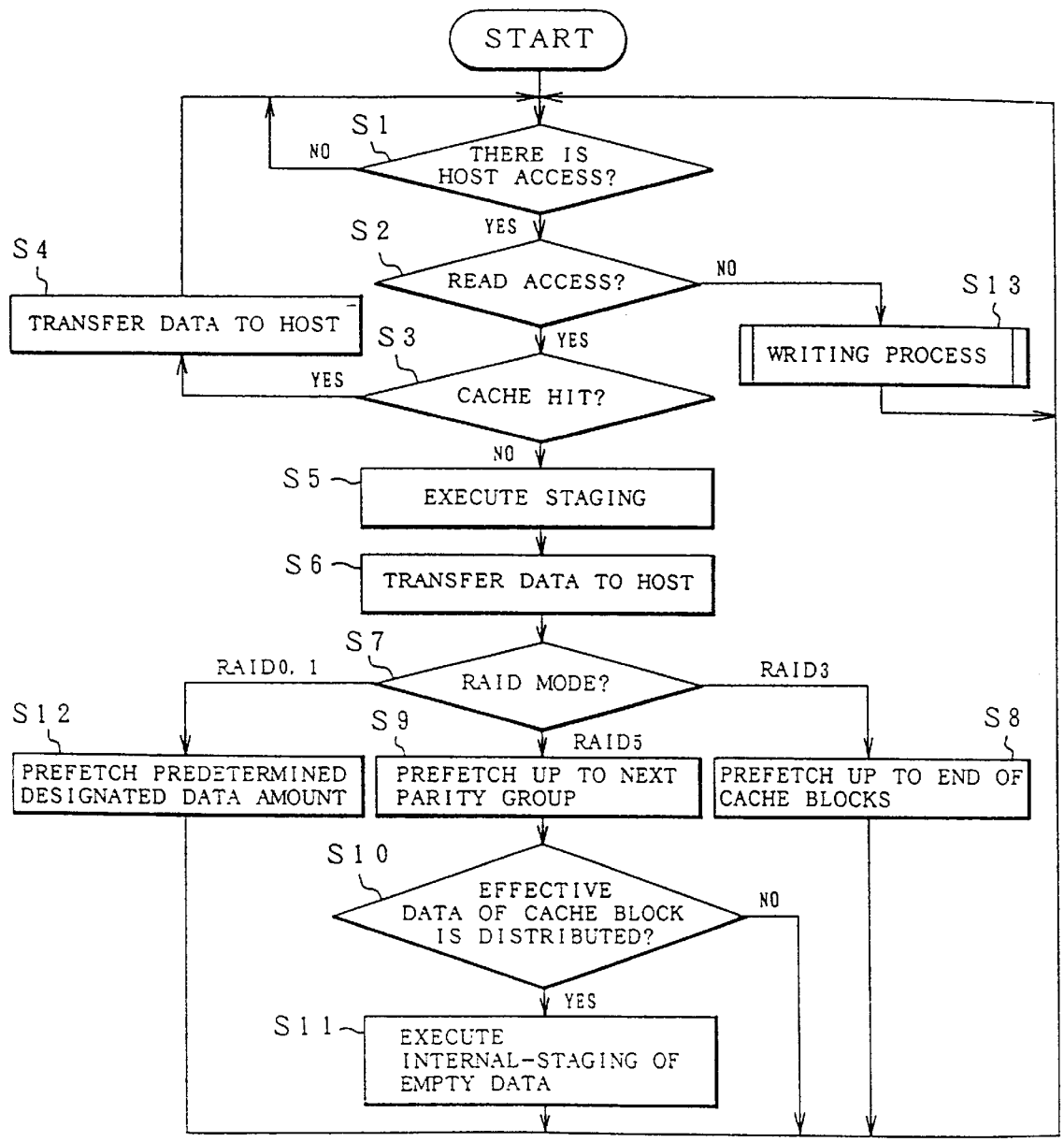
FIG. 34 is a flowchart showing a reading process in FIG. 21 including the staging of prefetch.

The write back process is scheduled at the time of completion of the writing process shown in FIG. 41 and is also similarly scheduled at the time of the end of staging from the disk array in which the cache memory caused a mis-hit by the read request shown in FIG. 34.

[Optimization of Write Back Process]

Figure 42:
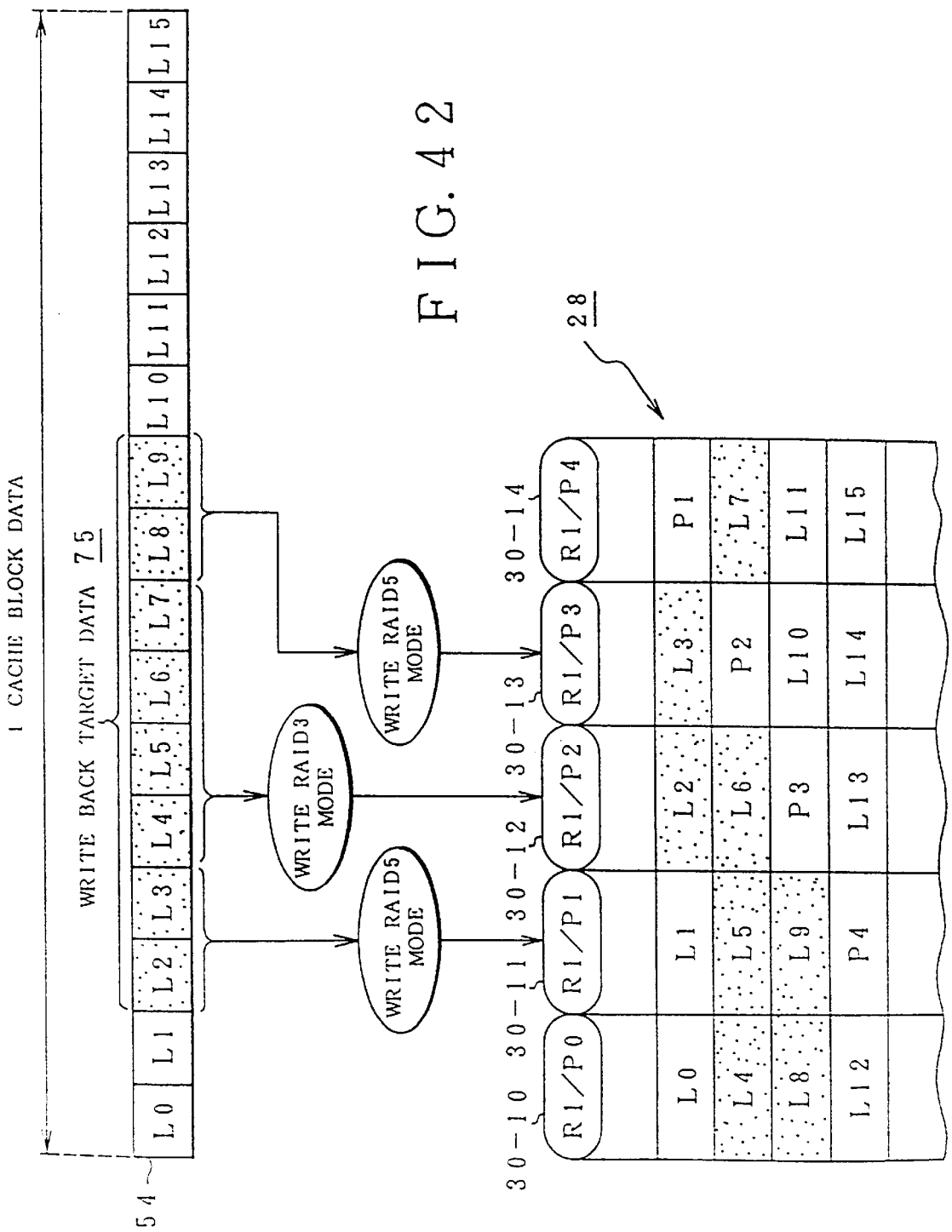
FIG. 42 is an explanatory diagram of the write back operation in RAID5.

FIG. 42 shows an example of the write back process in the operation form of RAID5. The size of cache block 54 is equal to 16 host blocks and the data corresponding to the host blocks L0 to L15 can be stored. Among them, the data corresponding to the host blocks L2 to L9 is written as effective data and becomes write back target data 75. On the other hand, data is read out from or written into each of the disk units 30-10 to 30-14 of the disk array 28 on a unit basis of the sector corresponding to the size of one host block. Four host blocks can be simultaneously accessed in parallel. The data corresponding to the host blocks L2 to L9 included in the write back target data 75 of the cache block 54 is written by the RAID5 mode in correspondence to the striping state of the disk array 28 with regard to each of the corresponding data of the head host blocks L2 and L3 and the last host blocks L8 and L9, respectively. That is, the read modification writing operation such that the corresponding old data and parity data are read out from the disk array 28, a new parity is calculated by using the new data to be written, and the new data and new parity are written in parallel after that is executed. On the other hand, the data of four continuous host blocks L4 to L7 corresponding to four disk units into which data can be written in parallel in the disk array 28 is written by the RAID3 mode. That is, the parity P2 is calculated from the data of the host blocks L4 to L7 and is directly written into the disk array 28. As for such a write back process in the RAID5 mode, in addition to the writing, by combining the high speed writing by the RAID3 mode to the ordinary RAID5 mode, the optimum write back process can be performed.

Figure 43:
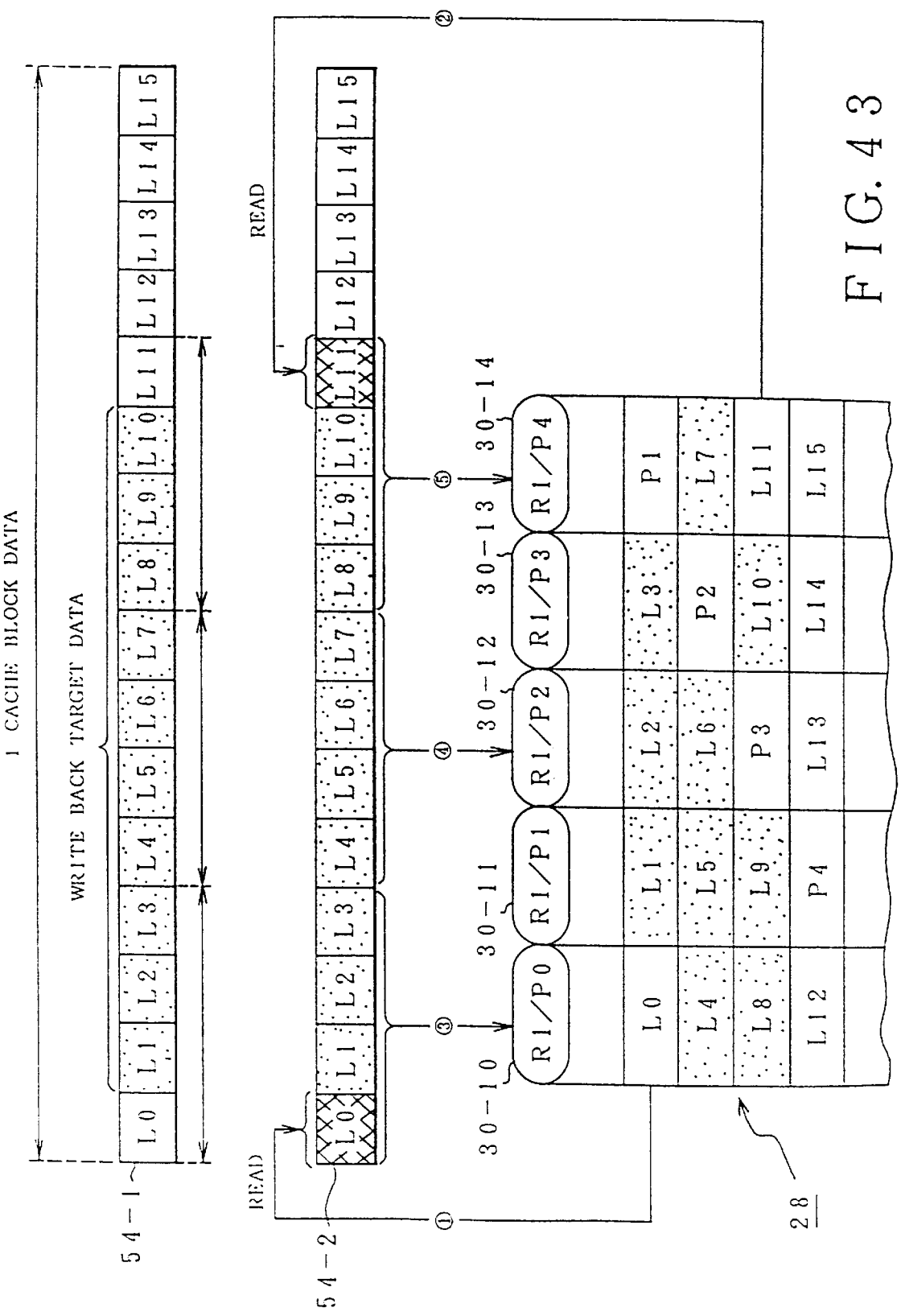
FIG. 43 is an explanatory diagram of the write back operation for staging lacking blocks into a cache block in RAID5.

FIG. 43 shows the optimizing process in the case where, in the write back process in the operating state of RAID5, the number of continuous host blocks in the write back target data 75 is slightly smaller than the number of parallel writing disks on the display array 28 side. It is now assumed that the corresponding data of the host blocks L1 to L10 has been stored in the cache block 54 as write back target data 75. With respect to four data of the central host blocks L4 to L7, the parallel access like RAID3 can be performed. On the other hand, in the corresponding data of the host blocks L1 to L3 on the left side and the corresponding data of the host blocks L8 to L11 on the right side, the number of host blocks is smaller than the number (four) of parallel access disks by one. In the write back in such a case, as shown in the cache block 54-2, the corresponding data of the host block L0 is read out as shown in (1) from the disk unit 30-10 of the disk array 28 and staged. With respect to the data corresponding to the host block L11 as well, it is read out as shown in (2) from the disk unit 30-14 of the disk array 28 and staged, thereby setting into the continuous data of the number as many as the host blocks that is integer times as large as the number of disks which can be accessed in parallel.

If the continuous corresponding data of the host blocks L0 to L11 as mentioned above is obtained on the cache block 54-2, the data is striped to every four host blocks L0 to L3, host blocks L4 to L7, and host blocks L8 to L11 and parities P1, P2, and P3 are obtained, respectively. As shown in (1), (4), and (5), by writing the data into the disk array 28 in parallel, the high speed write back process like RAID3 can be performed.

Figure 44:
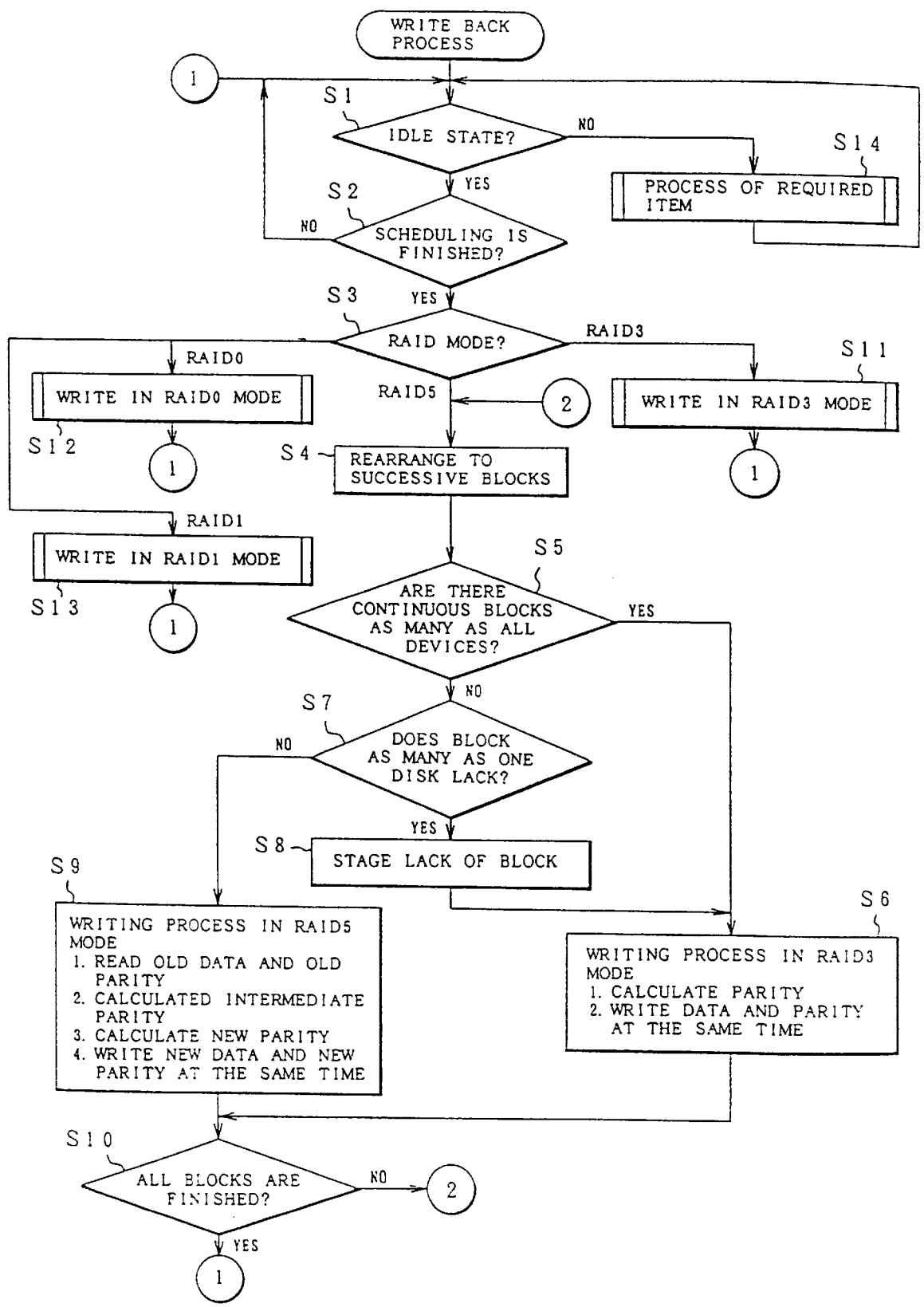
FIG. 44 is a flowchart showing a write back process which is executed after completion of the writing operation.

A flowchart of FIG. 44 shows the whole write back process in the cache control of the invention including the write back processes of RAID5 shown in FIGS. 42 and 43. First, in step S1, a check is made to see if the controller 12 is in the idle state or not. If NO, the process of the requested item, namely, the ordinary process, is performed in step S14. When the idle state is obtained, the processing routine advances to step S2 and a check is made to see if the write back process has already been scheduled or not. If the write back conditions are satisfied, step S3 follows and the RAID mode is discriminated. If it is the RAID5 mode, step S4 follows and the cache blocks in the write back target range as shown in FIGS. 38 and 39 are rearranged to continuous blocks. The rearrangement to the continuous blocks can be also performed as a scheduling at the stage of the writing process shown in FIG. 41. Subsequently, with reference to the first cache block as a write back target, a check is made to see if the host block corresponding data of the number as many as the number of all disks into which data can be written in parallel on the disk array 28 side is effective or not. If the host block corresponding data of the number as many as all of the devices is effective, step S6 follows and the writing process in the RAID3 mode is executed. That is, after the parity is calculated from the corresponding data of the number of all of the devices, the data and parity are simultaneously written in parallel. On the other hand, when the cache block corresponding data of all devices is invalid, a check is made in step S7 to see if the number of lacking data is equal to the value corresponding to one disk or not.

If YES, in step S8, the data corresponding to the lacking blocks is staged from the disk array as shown in FIG. 43. After staging, step S6 follows and the writing process in the RAID3 mode is performed. If an amount of lacking data is equal to the value corresponding to two or more disks in step S7, step S9 follows and the writing process in the RAID5 mode is executed. Namely, the old data and old parity are read and an intermediate parity is calculated. Further, a new parity is calculated from the new data. The new data and new parity are simultaneously written in parallel into the disk array. After completion of the writing process in step S6 or S9, a check is made in step S10 to see if the processes of all of the cache blocks as write back targets have been finished or not. If NO, the processing routine is returned to step S4 and the similar processes are repeated. If YES, the apparatus is again set into the standby mode in step S1. On the other hand, when the operating mode of RAID3 is judged in step S3, step S11 follows and the writing process in RAID3 for striping and writing shown in FIG. 29 is executed. When the RAID0 mode is judged in step S3, the writing operation in the RAID0 mode shown in FIG. 31 is performed in step S12. Further, in step S3, when the RAID1 mode is judged, step S13 follows and the writing in the RAID1 mode having no parity disk shown in FIG. 32 is executed.

[Automatic Setting of Cache Block Size by Statistics Process]

In a computer system having the disk cache apparatus including the present invention, a parameter which certainly needs to be set by the user is the host block size, namely, logical block size. On the other hand, the cache block size is ordinarily set on the system side. As shown in FIG. 22, the size of cache block 54 is set to the size as a block in which a plurality of host blocks 56 are collected. For the setting on the system side of the fixed cache block size in the conventional method as mentioned above, in the disk cache apparatus of the invention, when the system is first activated, the system side fixedly sets the cache block size. However, when the system is subsequently activated, the cache block size is automatically changed to the optimum cache block size in accordance with the use environment of the user.

Figure 45:
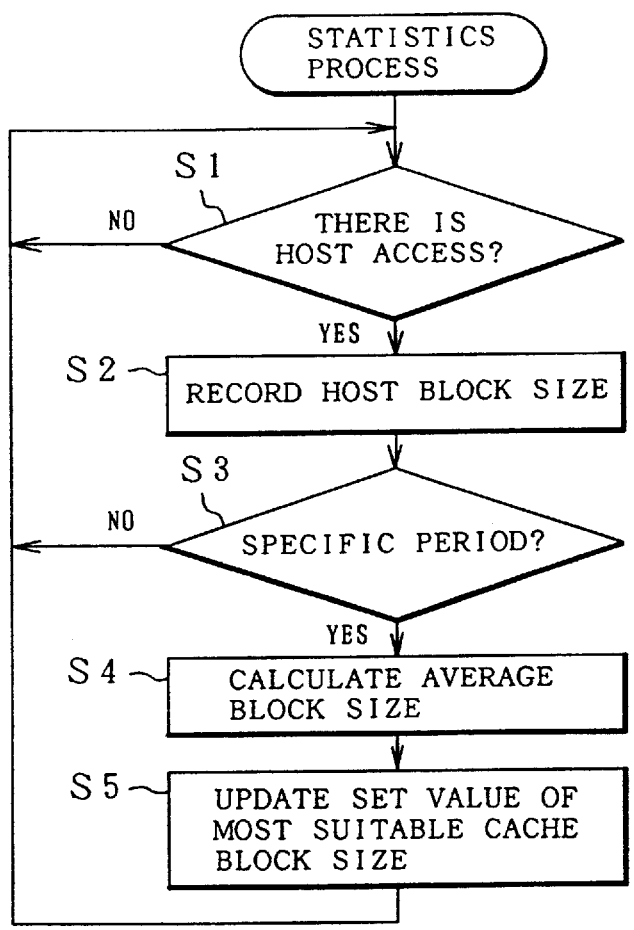
FIG. 45 is a flowchart for a statistics process for obtaining a cache block size.

A flowchart of FIG. 45 shows the statistics process to automatically set the optimum cache block size. When the system is first activated, the cache control by the cache block size which was fixedly set onto the system side is performed. In this state, when the host access is judged in step S1, the size of host block whose reading or writing operation was requested is recorded in step S2. The recording process of the host block size is repetitively executed until a time arrives at a specified period in step S5. When the time reaches the specified period, for instance, the time of about one month in step S3, step S4 follows and the average block size is calculated from the host block size recorded in step S2. In step S5, the set value of the optimum block size is updated to the average block size obtained in step S4. After the optimum cache block size was updated, the host block size recorded in step S2 is cleared from the memory and the recording at the next period is started. Thus, the cache block size obtained by the statistics process during the operation of the system is held as an optimum block size. When the operation of the system is stopped and the system is subsequently activated by turning on the power source, the cache block size is automatically changed to the optimum cache block size obtained by the statistics process in FIG. 45 and the cache control is made operative.

Figure 46:
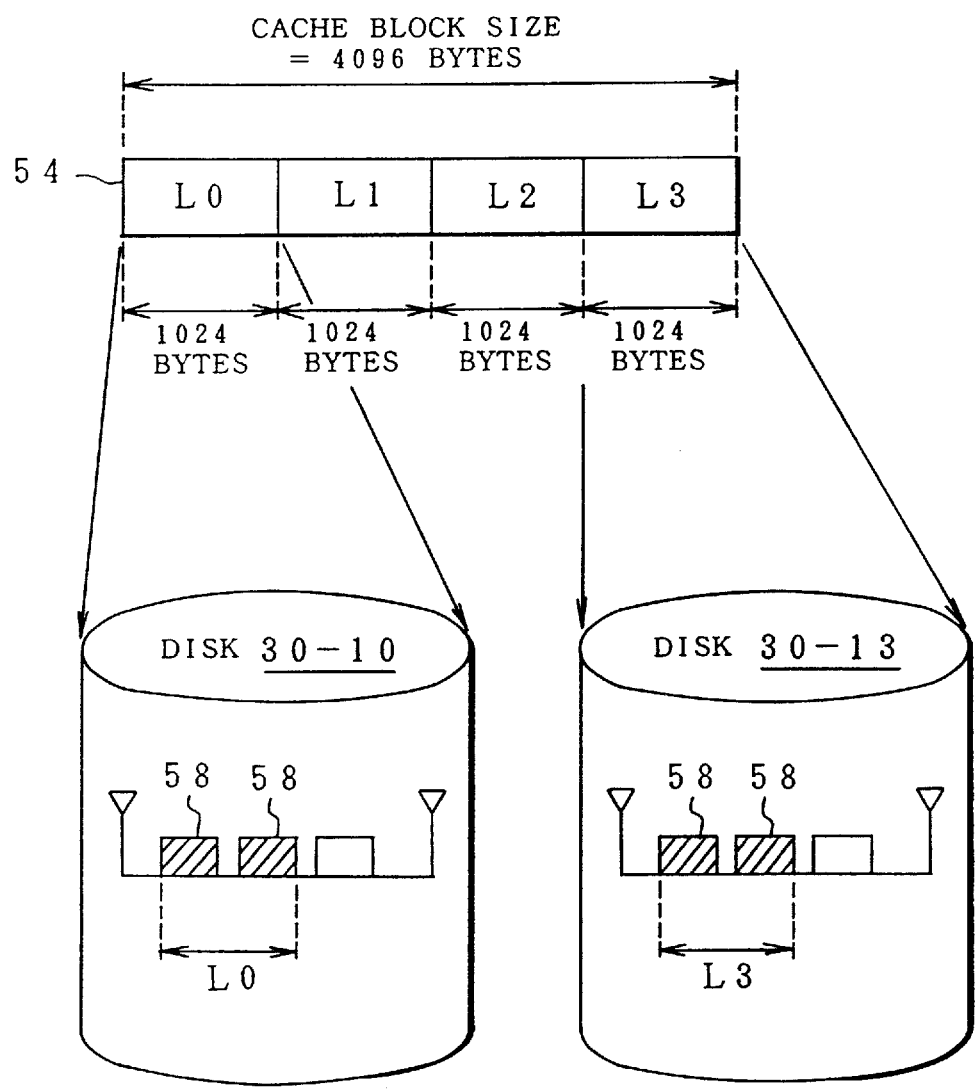
FIG. 46 is an explanatory diagram showing an example of a method of deciding the optimum cache block size.

FIG. 46 shows an example of the optimum cache block size for the host block size. It is now assumed that four disk units 30-10 to 30-13 of the disk array 28 are accessed in parallel and the data block 58 constructing one sector in each record is constructed by 512 bytes. For the data block 58 of 512 bytes, it is now assumed that the host block size is set to 1024 bytes, which number is two times as large as 512 bytes. For example, the host block L0 exists over two sectors of the corresponding disk unit 30-10. It is preferable that the cache block 54 has the size which coincides with the block data size of the four disk units 30-10 to 30-13 which can be accessed in parallel in order to enable the access like RAID3. Therefore, the cache block 54 corresponds to four host blocks L0 to L3 and one host block is constructed by 1024 bytes. It is, accordingly, proper to set the cache block size to 4096 bytes.

According to the invention as mentioned above, it is possible to selectively use a flexible operation such as improvement of the performance while maintaining the reliability of the cache memory in accordance with the necessity, improvement of the reliability while maintaining the performance, and the intermediate performance between them. The operation efficiency of the whole system having the disk cache can be improved. According to the invention, it is possible to make the most of the cache performance while utilizing the operation characteristics of what is called an RAID type in which the disk array is set to a target.

The above embodiment relates to the example of the disk array of six ports and four ranks. However, the number of ports of the disk array and the number of ranks can be properly determined as necessary. Although the embodiment of the invention has been described with respect to the disk array as an input/output device as an example, the invention can be also directly applied to an ordinary disk unit which does not have an array structure. Further, with respect to the disk array, the case where the controller having the cache memories of two systems is provided for the host computer has been described. However, it will be obviously understood that the cache memory is provided for the controller of one system. The invention, further, is not limited by the numerical values shown in the above embodiment.

What is claimed is:

1. A disk cache apparatus comprising:

disk array means provided with a plurality of disk units from/into which data is read out or written;

cache memory means for storing a part of the data stored in said disk array means;

cache management means for managing a storing state of said cache memory means on the basis of hash table means indicative of the contents of cache registration and LRU table means in which cache blocks including effective data are sequentially linked in accordance with a registration order in which the cache block used most recently is set to a leading position as a head block;

read cache control means constructed in a manner such that when a read request is received from an upper-order apparatus, in the case where the relevant data exists with reference to said cache management means, said data is read out from the cache memory means and transferred to the upper-order apparatus, and in the case where said relevant data does not exist with reference to said cache management means, said data is staged from said disk array means and, after that, said data is transferred to the upper-order apparatus;

write cache control means for registering management information to said cache management means when a write request is received from the upper-order apparatus and for writing the data into the cache memory means in accordance with said management information;

write back control means for extracting the data which is not yet stored into the disk array means from the cache memory means and writing back said data when predetermined write back conditions are satisfied; and disk array control means for controlling access to one or a plurality of disk units in accordance with a preset RAID operating mode of the disk array means when the disk array means is accessed by said read cache control means and said write cache control means.

2. An apparatus according to claim 1, wherein said disk array means constructs at least one rank by connecting a group of disk units to a plurality of input/output ports arranged in parallel.

3. An apparatus according to claim 2, wherein when a RAID operating mode corresponding to RAID0 is set, said disk array control means allocates the disk units in a specific rank to logical devices which are handled by said upper-order apparatus in a one-to-one corresponding manner and executes the reading or writing operation to each of said disk units.

4. An apparatus according to claim 2, wherein when a RAID operating mode corresponding to RAID1 is set, said disk array control means allocates two disk units in a specific rank as one set to logical device which are handled by said upper-order apparatus in a one-to-one corresponding relation and writes the same data to said two disk units and reads out the data from either one of the disk units.

5. An apparatus according to claim 2, wherein when a RAID operating mode corresponding to RAID3 is set, said disk array control means fixedly allocates (n) disk units constructing a specific rank to disk units for data and a disk unit for parity, and when a write request is supplied, the disk array control means divides write data into (n−1) data on a bit or byte unit basis and calculates parity data every division unit and writes said (n−1) divided data and said parity data to said (n) disk units in parallel.

6. An apparatus according to claim 2, wherein when a RAID operating mode corresponding to RAID5 is set, said disk array control means allocates (n) disk units constructing a specific rank as one set every access so that a parity position changes, and when a write request is supplied, the disk array control means divides write data on at least a sector unit basis of the disk unit and reads out old data and old parity data from the disk unit on the destination side to which said write data is written and from the disk unit for parity and calculates a new parity and writes said write data and said new parity data into said write destination disk unit and said disk unit for parity in parallel.

7. An apparatus according to claim 1, wherein said cache management means has empty space management table means for managing an empty state of said cache memory means, and in the case where an empty space is equal to or less than a predetermined threshold value with reference to said space management table means at the time of report of completion of a cache writing process based on said upper-order apparatus, said write cache control means invalidates the data written in said disk array means and deletes said data from the cache memory means and sets the data which is not yet written into the disk array means into a target of a write back process by said write back control means.

8. An apparatus according to claim 7, wherein in the case where continuous empty cache blocks exist on said cache memory means, said empty space management table means sets the number of empty blocks into an entry and stores position information of said head block among said continuous empty cache blocks.

9. An apparatus according to claim 1, wherein block data which is requested from said upper-order apparatus does not exist on a cache block as a storing unit of said cache memory means, said read cache control means stages new block data from said disk array means in accordance with a state of the effective block data existing in said cache block and forms a continuous data region.

10. An apparatus according to claim 9, wherein after completion of the staging, said read cache control means prefetches the effective block data subsequent to the requested block data from said disk array means to said cache block.

11. An apparatus according to claim 10, wherein when a RAID operating mode corresponding to RAID0 or RAID1 is set, said read cache control means prefetches a preset number of effective block data subsequent to said request block data from said disk array means after completion of the staging.

12. An apparatus according to claim 10, wherein when a RAID operating mode corresponding to RAID3 or RAID5 is set, said read cache control means prefetches the effective block data of up to the last block of said cache block subsequent to said requested block data from said disk array means after completion of the staging.

13. An apparatus according to claim 10, wherein when a RAID operating mode corresponding to RAID5 is set, after completion of the staging, said read cache control means prefetches the effective block data of up to the last block of a parity group including said requested block data from said array means.

14. An apparatus according to claim 1, wherein when a RAID operating mode corresponding to RAID5 is set, said read cache control means stages while including parity data into the cache memory means by an optional designation, and when said optional designation is judged, said write back means calculates a new parity by using the parity data in said cache memory means.

15. An apparatus according to claim 1, wherein in the case where a reading operation of a large amount of sequential data is requested from said upper-order apparatus, said read cache control means invalidates a part of a predetermined number of existing cache blocks from the end of said LRU table means and registers said large amount of sequential data to the end side of said LRU table without registering to the head thereof.

16. An apparatus according to claim 1, wherein when a RAID operating mode corresponding to RAID5 is set, said write back control means extracts the effective block data as a target of write back in said cache block on a parity group unit basis and calculates parity data and, after that, writes said extracted effective block data and parity data into a plurality of disk units of said disk array means in parallel.

17. An apparatus according to claim 16, wherein when predetermined write back conditions are satisfied, said write back means sets a predetermined number of cache blocks from the end in said LRU table means into a write back target and rearranges the cache blocks included in said target range so that the data is continuous.

18. An apparatus according to claim 1, wherein when a RAID operating mode corresponding to RAID5 is set, in the case where the number of block data of a parity group including the effective block data as a target of write back in said cache block is equal to or less than a predetermined number, said write back control means reads out said lacking block data from the corresponding disk unit and, after that, writes the effective block data as much as the parity group and the calculated parity data in parallel into a plurality of disk units of said disk array means.

19. An apparatus according to claim 18, wherein when predetermined write back conditions are satisfied, said write back means sets a predetermined number of cache blocks from the end in said LRU table means into a write back target and rearranges the cache blocks included in said target range so that the data is continuous.

20. An apparatus according to claim 1, further comprising statistics processing means for collecting a data block size which is used by an access request from said upper-order apparatus during the use of the apparatus as statistics information and for automatically setting the average value of said statistics information as a cache block size of said cache memory means when the apparatus is activated next.

21. An apparatus according to claim 1, wherein said disk array means is a storage apparatus having a redundancy.

22. An apparatus according to claim 1, wherein said preset RAID operating mode is selected from one of at least four operating modes, including a first RAID operating mode corresponding to RAID0, a second RAID operating mode corresponding to RAID1, a third RAID operating mode corresponding to RAID3, and a fourth RAID operating mode corresponding to RAID5.

* * * * *